(12) United States Patent
Sambe et al.

(10) Patent No.: US 8,572,164 B2
(45) Date of Patent: Oct. 29, 2013

(54) SERVER SYSTEM AND METHOD FOR CONTROLLING INFORMATION SYSTEM

(75) Inventors: Eiji Sambe, Odawara (JP); Nobuyuki Saika, Yokosuka (JP); Xiaolin Wang, Odawara (JP)

(73) Assignee: Hitachi, Ltd., Tokyo (JP)

( * ) Notice: Subject to any disclaimer, the term of this patent is extended or adjusted under 35 U.S.C. 154(b) by 114 days.

(21) Appl. No.: 13/144,760

(22) PCT Filed: Jun. 30, 2011

(86) PCT No.: PCT/JP2011/003755
§ 371 (c)(1),
(2), (4) Date: Jul. 15, 2011

(87) PCT Pub. No.: WO2013/001581
PCT Pub. Date: Jan. 3, 2013

(65) Prior Publication Data
US 2013/0007097 A1   Jan. 3, 2013

(51) Int. Cl.
*G06F 15/16* (2006.01)

(52) U.S. Cl.
USPC ........................................................ 709/203

(58) Field of Classification Search
USPC ........................................................ 709/203
See application file for complete search history.

(56) References Cited

U.S. PATENT DOCUMENTS

2004/0024796 A1*   2/2004   Takeda et al. ................. 707/205
2006/0112253 A1    5/2006   Takeda et al.

FOREIGN PATENT DOCUMENTS

| EP | 0 774 723 | | 5/1997 |
| EP | 0774723 | A2 * | 5/1997 |
| JP | 2004-070403 | A | 3/2004 |

* cited by examiner

*Primary Examiner* — Benjamin R Bruckart
*Assistant Examiner* — Sm Rahman
(74) *Attorney, Agent, or Firm* — Volpe and Koenig, P.C.

(57) ABSTRACT

The present invention concerns allocating files in storage apparatuses efficiently while satisfying requirements of the files. An information system 1 includes a first server system 3a coupled to a first storage apparatus 10a, a second server system 3b coupled to a second storage apparatus 10b, and a third server system 3c coupled to a third storage apparatus 10c. When the first server system 3a receives a data I/O not needing access to the entity of a file responds to the data I/O request using metadata of the file and when the first server system 3a receives a data I/O needing access to the entity of a file acquires the entity of the file from the second storage apparatus 10b or the third storage apparatus 10c to process the data I/O request. The first server apparatus determines the allocation target of the entity of the files on the basis of a requirement set for the files and information relating to configurations of the storage apparatuses 10.

7 Claims, 43 Drawing Sheets

Fig. 13

REPLICATION INFORMATION MANAGEMENT TABLE 331

3311 —— STUB THRESHOLD : 200GB

Fig. 14

FILE ACCESS LOG 332

| 3321 | 3322 | 3323 |
|---|---|---|
| ACCESS DATE/TIME | FILE NAME | USER ID |
| 2011/5/12 12:00:00 | /home/user01/a.txt | user01 |
| 2011/5/12 12:10:00 | /home/user02/b.txt | user02 |
| 2011/5/12 12:20:00 | /home/user01/a.txt | user03 |
| : | : | : |

Fig. 15

FILE MANAGEMENT TABLE 333

| FILE NAME | CURRENT ALLOCATION TARGET | | REQUIREMENT | | |
|---|---|---|---|---|---|
| | APPARATUS ID | LDEV_ID | CONFIDENTIALITY | RELIABILITY | PERFORMANCE |
| fileA | Storage_N1 | LDEV_N1 | LOW | RAID6 | L1 |
| fileB | Storage_G1 | LDEV_G1 | HIGH | RAID1,5 | L2 |
| fileC | Storage_C1 | LDEV_C1 | LOW | RAID1,5 | L1 |
| .. | .. | .. | .. | .. | .. |

Fig. 16

STORAGE AREA MANAGEMENT TABLE 334

| 161 | 162 APPARATUS PROPERTY | | 163 | 164 STORAGE CAPACITY | | |
|---|---|---|---|---|---|---|
| | 1621 | 1622 | 1623 | | 1641 | 1642 | 1643 |
| LDEV_ID | APPARATUS ID | CONFIDENTIALITY | PERFORMANCE | RAID LEVEL | CAPACITY IN USE | THRESHOLD | TOTAL CAPACITY |
| LDEV_N1 | Storage_N1 | HIGH | L2 | RAID6 | 30GB | 50GB | 100GB |
| LDEV_N2 | | | | RAID5 | 20GB | 50GB | 60GB |
| .. | .. | .. | .. | .. | .. | .. | .. |
| LDEV_G1 | Storage_G | HIGH | L1 | RAID6 | 30GB | 50GB | 100GB |
| LDEV_G2 | | | | RAID5 | 20GB | 50GB | 60GB |
| .. | .. | .. | .. | .. | .. | .. | .. |
| LDEV_C1 | Storage_C | LOW | L2 | RAID5 | 200GB | 500GB | 1TB |
| LDEV_C2 | | | | RAID1 | 200GB | 500GB | 1TB |
| LDEV_C3 | | | | RAID1 | 200GB | 500GB | 1TB |
| .. | .. | .. | .. | .. | .. | .. | .. |

FILE SYSTEM STRUCTURE 1900

CAPACITY SECURING PROCESSING S4700 (CONTINUED)

SERVER SYSTEM AND METHOD FOR CONTROLLING INFORMATION SYSTEM

TECHNICAL FIELD

The present invention relates to a server system and a method for controlling an information system.

BACKGROUND ART

PTL1 discloses an invention of dynamically distributing data in units of files to volumes having reliability properties and performance properties appropriate to the files in a file system and a network attached storage (NAS) system configured to distribute and store data into a plurality of volumes. In order to optimize data storage destinations and to save the trouble of setting the distribution by an operator, the invention includes: in response to a user input by or the like, creating storage requirement calculation rules in which a reliability requirement and a performance requirement are set for each type of business application; creating storage destination volume calculation rules in which a reliability requirement and a performance requirement are set for each storage destination volume attached to a group of secondary storage devices; acquiring the reliability requirement and the performance requirement by searching the storage requirement calculation rules by using the file type (business application) as a key; acquiring a storage destination volume by searching the storage destination volume calculation rules by using the acquired reliability requirement and performance requirement as keys; and storing the file in the acquired storage destination volume.

CITATION LIST

Patent Literature

[PTL 1] Japanese Patent Application Publication No. 2004-70403

SUMMARY OF INVENTION

Technical Problem

Nowadays, organizations such as companies dealing with a large amount of data perform data transfer for the purpose of reducing the operation cost of an information system, improving the efficiency of business, and achieving other objectives. In this data transfer, the data managed in a storage apparatus (hereinafter referred to as "file storage apparatus") on an edge side such as a branch office are transferred to a storage apparatus (hereinafter referred to as "archive apparatus") on a core side such as a data center or the like for providing cloud services.

In this regard, files managed on the edge side are different from each other in terms of performance and reliability requirements. For the above data transfer, the allocation targets of the files need to be determined appropriately in accordance with the requirements of the respective files. In addition, on the edge side, the file storage apparatus is operated to function as a contact apparatus for client devices while another storage apparatus (for example, an old type NAS system) is operated as a background apparatus in some cases. In these cases, the file storage apparatus needs to intervene for the transfer of files from the other storage apparatus to the archive apparatus, which in turn poses a problem of performance deterioration of the file storage apparatus.

The present invention has been made in consideration of the foregoing problem, and a main objective thereof is to provide a server system and a method for controlling an information system which are capable of efficiently allocating data in files into storage areas of an information system while fulfilling the requirements of each file.

Solution to Problem

As one aspect of the present invention achieving the above objective, provided is a first server system in an information system configured to include the first server system capable of receiving a data I/O request for a file from a client device and performing data I/O on a first storage apparatus, a second server system that is communicatively coupled to the first server system and capable of performing data I/O on a second storage apparatus, and a third server system that is communicatively coupled to the first server system and capable of performing data I/O on a third storage apparatus, wherein the first server system allocates an entity of the file in any one of the first storage apparatus, the second storage apparatus and the third storage apparatus, and allocates metadata of the file in the first storage apparatus; upon reception, from the client device, of the data I/O request not needing access to the entity of the file, responds to the data I/O request using the metadata of the file; upon reception, from the client device, of the data I/O request needing access to the entity of the file, when an entity corresponding to the metadata of the file exists in the first storage apparatus responds to the data I/O request using the entity, and when an entity corresponding to the metadata of the file exists in the second storage apparatus or the third storage apparatus acquires an entity corresponding to the metadata of the file from any one of the second storage apparatus and the third storage apparatus, and responds to the data I/O request using the acquired entity; stores a requirement set for a file stored in at least any one of the first storage apparatus, the second storage apparatus and the third storage apparatus; stores information relating to configurations of at least two of the first storage apparatus, the second storage apparatus and the third storage apparatus; determines an allocation target of the entity of the file on the basis of the requirement and the information on the configurations; and executes processing for allocating the entity of the file in the determined allocation target.

Other problems disclosed in the present application and methods for solving the problems will be made clear by the descriptions in the section of Description of Embodiments, the drawings and others.

Advantageous Effects of Invention

According to the present invention, data in files can be efficiently allocated into storage areas of storage apparatuses while fulfilling the requirements of each file.

BRIEF DESCRIPTION OF DRAWINGS

FIG. 3 shows a hardware configuration of first server system 3a.

FIG. 12 shows primary functions of the first server system 3a and primary information (data) managed by the first server system 3a.

FIG. 13 shows an exemplary replication information management table 331.

FIG. 14 shows an exemplary file access log 332.

FIG. 15 shows an exemplary file management table 333.

FIG. 16 shows an exemplary storage area management table 334.

DESCRIPTION OF EMBODIMENTS

An Embodiment of the present invention will be described below with reference to the drawings.

Figure 1:
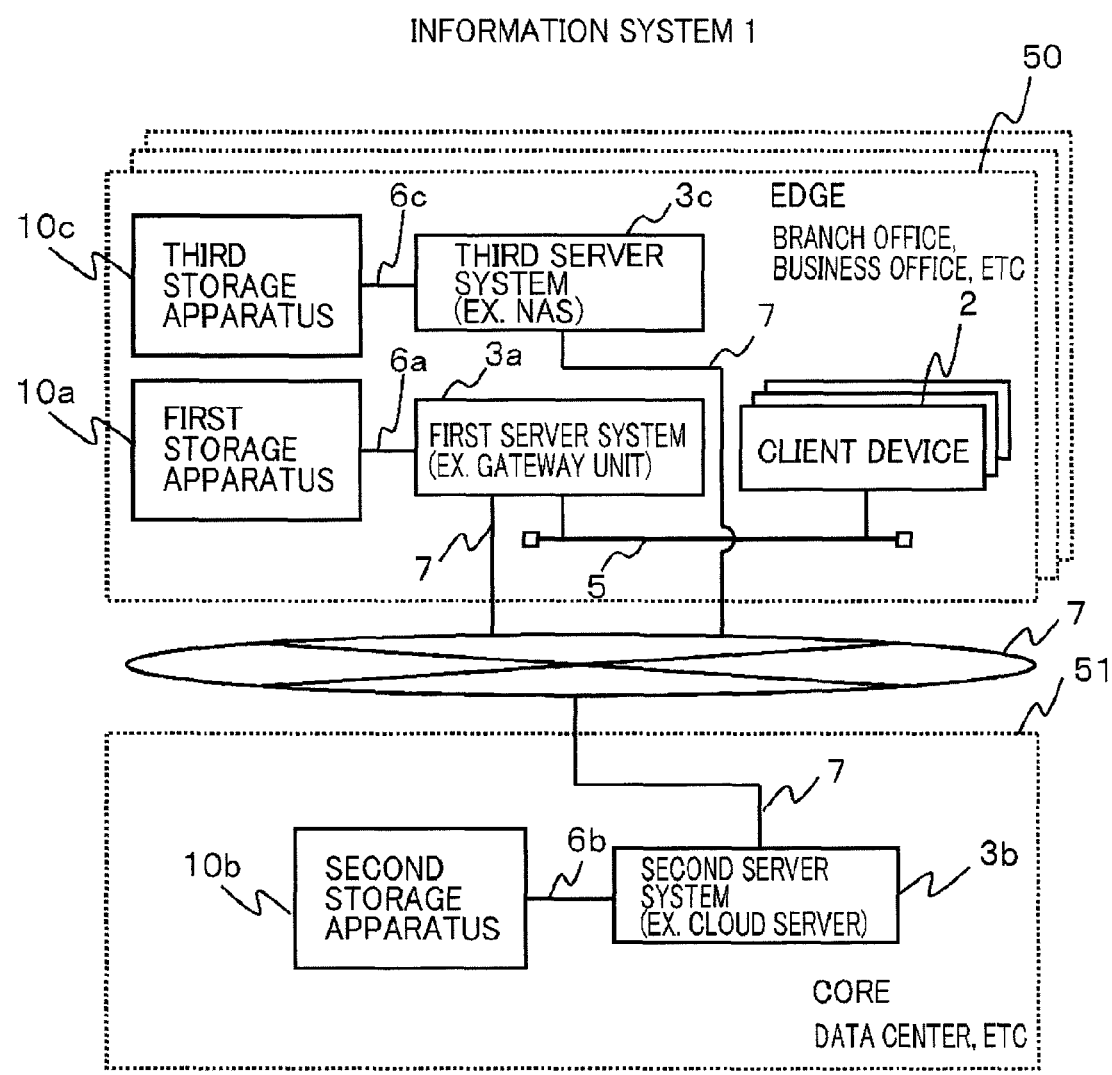
FIG. 1 shows an overall configuration of information system 1

FIG. 1 shows an overall configuration of information system 1 to be described as an embodiment. As shown in FIG. 1, information system 1 includes hardware installed in a site (hereinafter, referred to as "edge 50") where users actually conduct business, such as a branch office or a business institution of a company such as a trading company or an electronics manufacturer, and hardware installed at a site (hereinafter, referred to as "core 51") such as a data center, in which information facilities (application server/storage system and the like) are managed and from which cloud services are provided.

As shown in FIG. 1, there is a first server system 3a, a third server system 3c, a first storage apparatus 10a, a third storage apparatus 10c, and a client device 2 (external apparatus) in the edge 50. Whereas, there is a second server system 3b and a second storage apparatus 10b in the core 51.

The first server system 3a is a file storage apparatus including a file system configured to provide the client device 2 with a data management function on a file unit basis. In addition, the first server system 3a is a gateway apparatus configured to function as a contact apparatus for cloud services implemented at the core 51. The first server system 3a may be implemented as a virtual machine using a virtualization control mechanism (host-OS type, hypervisor type, or the like).

The third server system 3c accesses, in response to a request sent from the first server system 3a, data stored in the third storage apparatus 10c. For example, the third server system 3c is a network attached storage (NAS) system. The third server system 3c may be implemented as a virtual machine using a virtualization control mechanism.

The storage system including the third server system 3c and the third storage apparatus 10c is a system (hereinafter, referred to as "old system") which is used to offer services directly to the client device 2 until the storage system including the first server system 3a and the first storage apparatus 10a (hereinafter, referred to as "new system") was installed in the edge 50. The old system is, for example, a storage system with old specifications, a storage system having different specifications, standards and performance from the new system, and a storage system made by a different manufacturer or the like.

The second server system 3b functions, for example, as a data archive (archive apparatus) for the first storage apparatus 10a in the edge 50. The second server system 3b is implemented by utilizing resources provided, for example, by cloud services. The second server system 3b may be implemented as a virtual machine using a virtualization control mechanism.

The client device 2 and the first server system 3a are communicatively coupled together via a first communication network 5. The first server system 3a is communicatively coupled to the first storage apparatus 10a in the edge 50 via a first storage network 6a.

The first server system 3a is communicatively coupled to the second server system 3b in the core 51 via a second communication network 7. In the core 51, the second server system 3b is communicatively coupled to the second storage apparatus 10b via a second storage network 6b.

In the edge 50, the third server system 3c and the third storage apparatus 10c are communicatively coupled together via a third storage network 6c. The first server system 3a and the third server system 3c are communicatively coupled together via the second communication network 7. In addition, the third server system 3c and the second server system 3b are communicatively coupled together via the second communication network 7.

The first communication network 5 and the second communication network 7 are, for example, wired or wireless LAN (Local Area Network), WAN (Wide Area Network), the Internet, public lines or special purpose lines.

The first storage network 6a, the second storage network 6b and the third storage network 6c are, for example, LAN, WAN, SAN (Storage Area Network), the Internet, public lines or special purpose lines.

Communications via the first communication network 5, the second communication network 7, the first storage network 6a, the second storage network 6b and the third storage network 6c are performed, for example, in conformity with protocols such as TCP/IP, iSCSI (Internet Small Computer System Interface), Fibre Channel Protocol, FICON (Fibre Connection) (Registered Trademark) and ESCON (Enterprise System Connection) (Registered Trademark).

The client device 2 is an information apparatus (computer) that uses storage areas provided by the first storage apparatus 10a via the first server system 3a. The client device 2 is, for example, a personal computer, office computer, notebook computer, tablet-type mobile terminal or the like. The client device 2 runs an operating system, applications and the like that are implemented by software modules (file system, kernel, driver, and the like).

Figure 2:
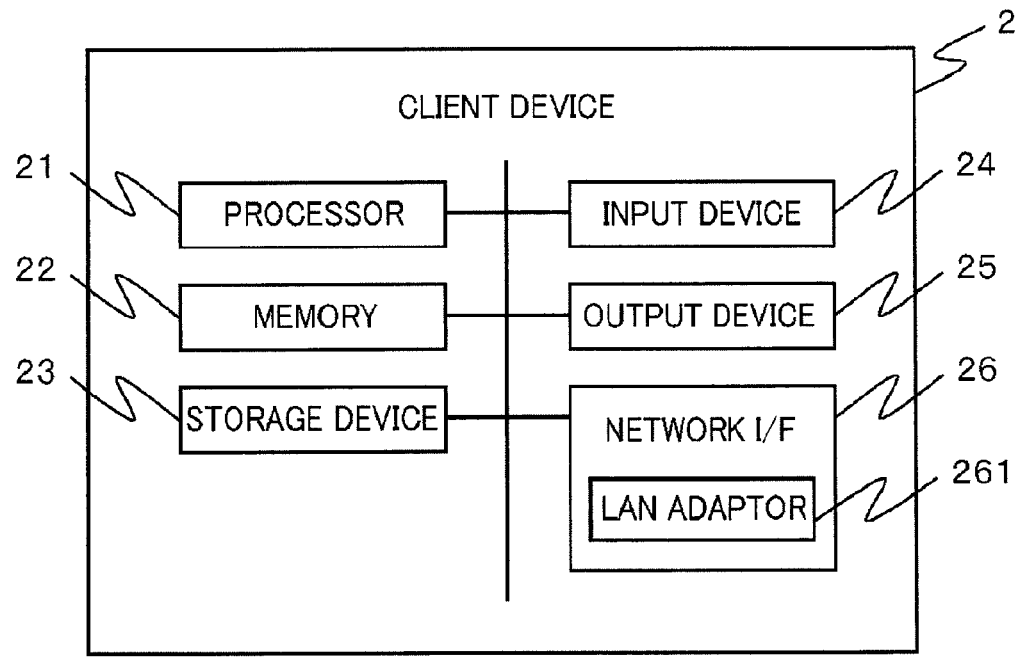
FIG. 2 shows a hardware configuration of client device 2.

FIG. 2 shows a hardware configuration of the client device 2. As shown in FIG. 2, the client device 2 includes a processor 21, a volatile or non-volatile memory 22 (RAM (Random Access Memory)), a ROM (Read Only Memory), an NVRAM (Non Volatile RAM), or the like), a storage device 23 (HDD (Hard Disk Drive), semiconductor storage device (SSD (Solid State Drive) or the like)), an input device 24 (keyboard, mouse, touch panel and the like), an output device 25 (liquid crystal monitor, printer, and the like), and a network interface (referred to as "network I/F 26") such as an NIC (Network Interface Card) (hereinafter, referred to as "LAN adapter 261").

The first server system 3a is an information apparatus that offers services to the client device 2 by using as data storage locations the storage areas provide by the first storage apparatus 10a. The first server system 3a includes, for example, a computer such as a personal computer, a mainframe or an office computer.

When accessing a storage area provided by the first storage apparatus 10a, the first server system 3a sends a data frame (hereinafter, simply referred to as "frame"), including a data I/O request (data write request, data read request or the like), to the first storage apparatus 10a via the first storage network 6a. The frame is, for example, a fibre channel frame (FC frame (FC: Fibre Channel)).

The second server system 3b is an information apparatus that offers services by using the storage areas provided by the second storage apparatus 10b. The second server system 3b includes a personal computer, a main frame, an office computer or the like. When accessing a storage area provided by the second storage apparatus 10b, the second server system 3b sends a frame including a data I/O frame to the second storage apparatus 10b via the second storage network 6b.

Figure 3:
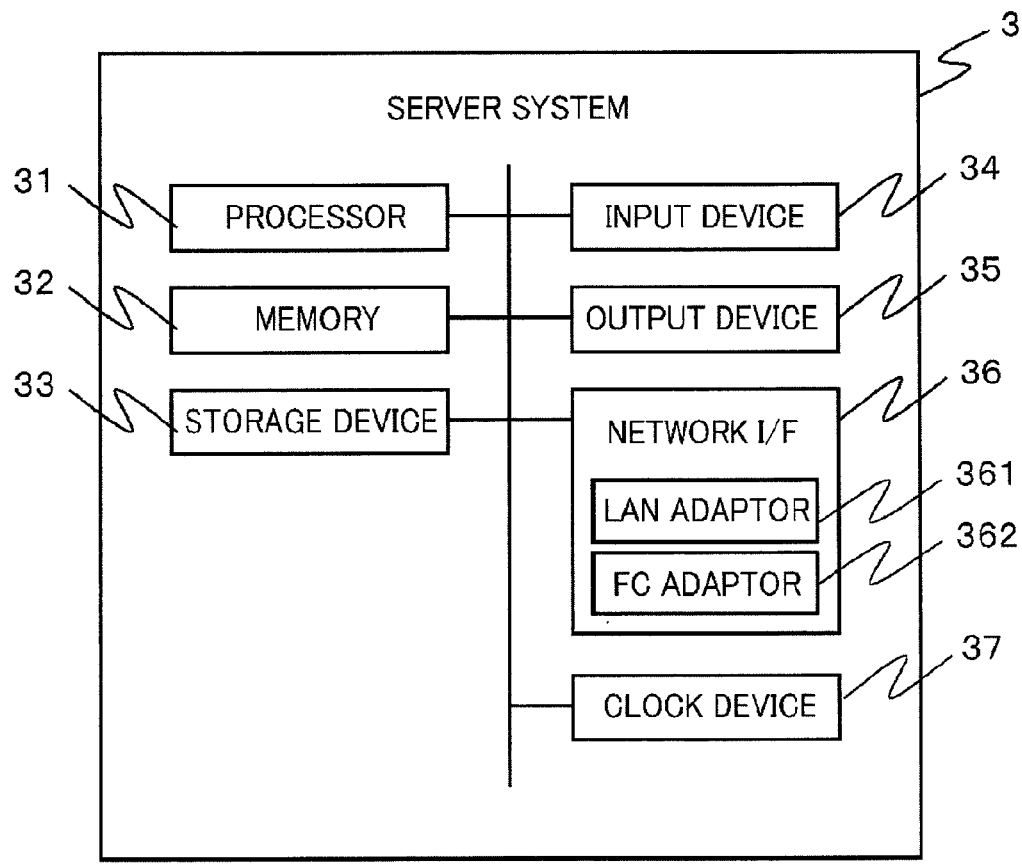

FIG. 3 shows a hardware configuration of the first server system 3a. The second server system 3b and the third server system 3c have the same or similar hardware configuration as the first server system 3a.

As shown in FIG. 3, the first server system 3a includes a processing unit 31, a volatile or nonvolatile memory 32 (RAM, ROM, NVRAM or the like), a storage device 33 (HDD, semiconductor storage device or the like), an input device 34 (keyboard, mouse and the like), an output device 35 (liquid crystal monitor, printer and the like), a network interface (hereinafter, referred to as "network I/F 36") (NIC (hereinafter, referred to as "LAN adapter 361"), an HBA (Host Bus Adapter) (hereinafter, referred to as "FC adapter 362") or the like), and a clock device 37 including a timer circuit, an RTC and the like.

Figure 4:
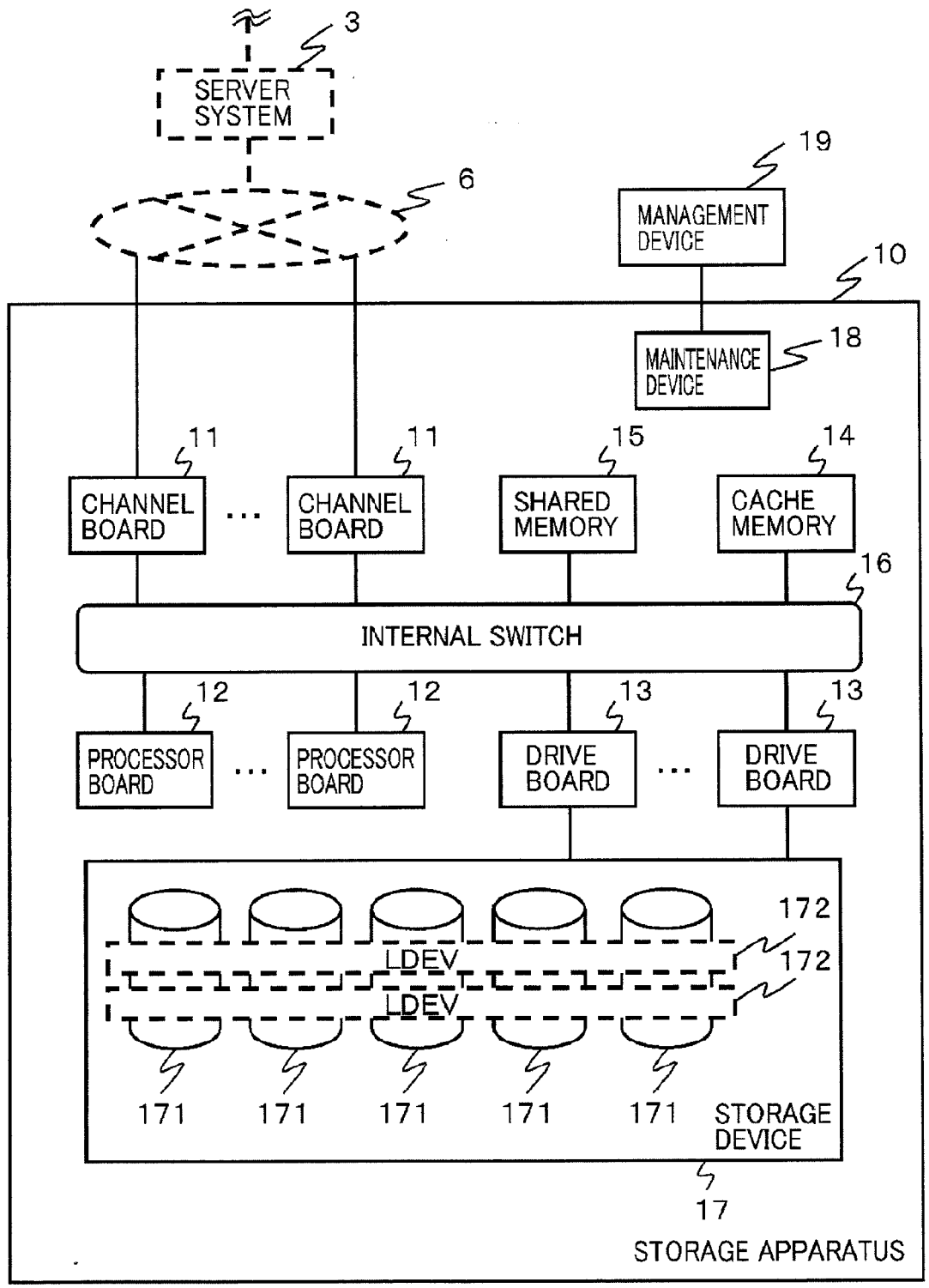
FIG. 4 shows a hardware configuration of storage apparatus 10.

FIG. 4 shows an exemplary hardware configuration of a storage apparatus 10 (the first storage apparatus 10a, the second storage apparatus 10b and the third storage apparatus 10c). The storage apparatus 10 receives a data I/O request sent from a server system 3 (the first server system 3a, the second server system 3b and the third server system 3c), accesses a storage medium in accordance with the received data 110 request, and then sends data or a response to the server system 3. The storage apparatus 10 is, for example, a disk-array apparatus.

As shown in FIG. 4, the storage apparatus 10 includes one or more channel boards 11, one or more processor boards 12 (Micro Processors), one or more drive boards 13, a cache memory 14, a shared memory 15, an internal switch 16, a storage device 17 and a maintenance device 18 (SVP: SerVice Processor). The channel boards 11, the processor boards 12, the drive boards 13, the cache memory 14 and the shared memory 15 are communicatively coupled to each other via the internal switch 16.

The channel board 11 receives a frame sent from the server system 3 and sends the server system 3 a frame including a response of processing (data I/O) for the data I/O request included in the received frame (e.g., read data, a read completion report, a write completion report).

In response to the data I/O request in the frame received by the channel board 11, the processor board 12 performs processing relating to data transfer (high-speed and large-volume data transfer using a DMA (Direct Memory Access) or the like) to and from the channel board 11, the drive board 13 and the cache memory 14. The processor board 12 performs, for example, transfer (i.e., delivering) of data (data read from the storage device 17, and data to be written to the storage device 17) between the channel board 11 and the drive board 13 via the cache memory 14, staging of data to be stored in the cache memory 14(reading data from the storage device 17), and destaging of data stored in the cache memory 14 (writing data to the storage device 17).

The cache memory 14 includes a RAM (Random Access Memory) that can be accessed at high speed. The cache memory 14 stores therein data to be written in the storage device 17 (hereinafter, referred to as "write data"), data read from the storage device 17 (hereinafter, referred to as "read data") and the like. The shared memory 15 stores therein various kinds of information used to control the storage apparatus 10.

The drive board 13 performs communications with the storage device 17 in an event where data is read from the storage device 17 or data is written to the storage device 17. The internal switch 16 includes a high-speed cross bar switch, for example. Communications via the internal switch 16 are performed, for example, in conformity with protocols such as fibre channel, iSCSI and TCP/IP.

The storage device 17 includes multiple storage drives 171. Each of the storage drives 171 is, for example, a hard disk drive or a semiconductor storage device (SSD) supporting SAS (Serial Attached SCSI), SATA (Serial ATA), FC (Fibre Channel), PATA (Parallel ATA) or the like.

The storage device 17 provides the server system 3 with storage areas of the storage device 17 in units of logical storage areas that are provided by managing the storage drives 171 according to, for example, a method such as RAID (Redundant Arrays of Inexpensive (or Independent) Disks). The logical storage areas are, for example, storage areas of logical devices (LDEVs 172 (LDEV: Logical Device)) configured with a RAID group (Parity Group). Each of the LDEVs 172 is assigned an identifier (hereinafter, referred to as "LDEV ID ") for identifying the LDEV 172.

The storage apparatus 10 provides the server system 3 with logical storage areas (hereinafter, referred to as "LU" (Logical Unit or Logical Volume)) using the LDEVs 172. Each of the LUs is assigned an identifier (hereinafter, referred to as "LUN"). The storage apparatus 10 manages associations (correspondences) between the LUs and LDEVs 172. On the basis of these associations, the storage apparatus 10 identifies an LDEV 172 corresponding to an LU or identifies an LU corresponding to an LDEV 172. Note that, the first storage apparatus 10a may have a function to provide the server system 3 with another type of LU virtualized based on Thin Provisioning (hereinafter, referred to as "virtual LU"), in addition to the above type of LU.

Figure 5:
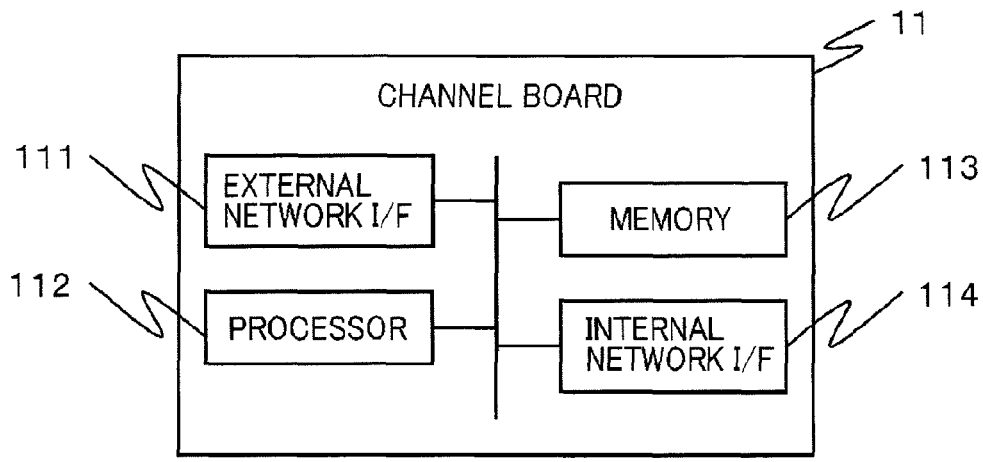
FIG. 5 shows a hardware configuration of channel board 11.

FIG. 5 shows a hardware configuration of the channel board 11. As shown in FIG. 5, the channel board 11 includes: an external network interface (hereinafter, referred to as "external network I/F 111") including a port (i.e., network port) for communicating with the server system 3; a processor 112 (including a frame processing chip and a frame transfer chip); a memory 113, an internal network interface (hereinafter, referred to as "internal network I/F 114") including a port (i.e., network port for communicating with the processor boards 12); and the like.

The external I/F 111 includes an NIC (Network Interface Card), an HBA (Host Bus Adaptor) and the like. The processor 112 includes a CPU (Central Processing Unit), an MPU (Micro Processing Unit) and the like. The memory 113 is a RAM (Random Access Memory) or a ROM (Read Only Memory). The memory 113 stores therein micro programs. The processor 112 reads the micro programs from the memory 113 and executes the programs, whereby various kinds of functions provided by the channel board 11 are implemented. The internal network I/F 114 communicates with the processor boards 12, the drive boards 13, the cache memory 14 and the shared memory 15 via the internal switch 16.

Figure 6:
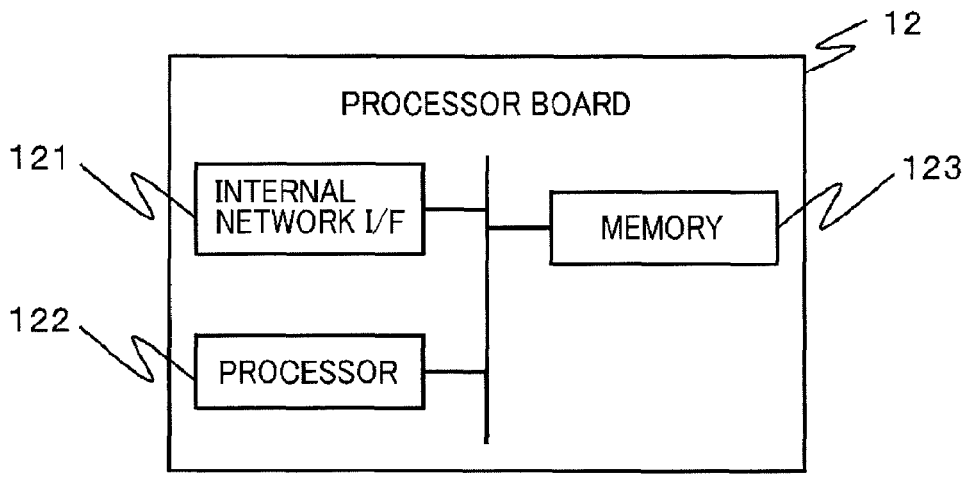
FIG. 6 shows a hardware configuration of processor board 12.

FIG. 6 shows a hardware configuration of the processor board 12. The processor board 12 includes an internal network interface (hereinafter, referred to as "internal network I/F 121"), a processor 122, and a memory 123 (local memory) that has higher access performance (can be accessed at high speed) from the processor 122 than the shared memory 15. The memory 123 stores therein micro programs. The processor 122 reads the micro programs from the memory 123 and executes the programs, whereby various kinds of functions provided by the processor board 12 are implemented.

The internal network I/F 121 communicates with the channel boards 11, the drive boards 13, the cache memory 14 and the shared memory 15 via the internal switch 16. The processor 122 includes a CPU, an MPU, a DMA (Direct Memory Access) or the like. The memory 123 is a RAM or a ROM. The processor 122 can access both the memory 123 and the shared memory 15.

Figure 7:
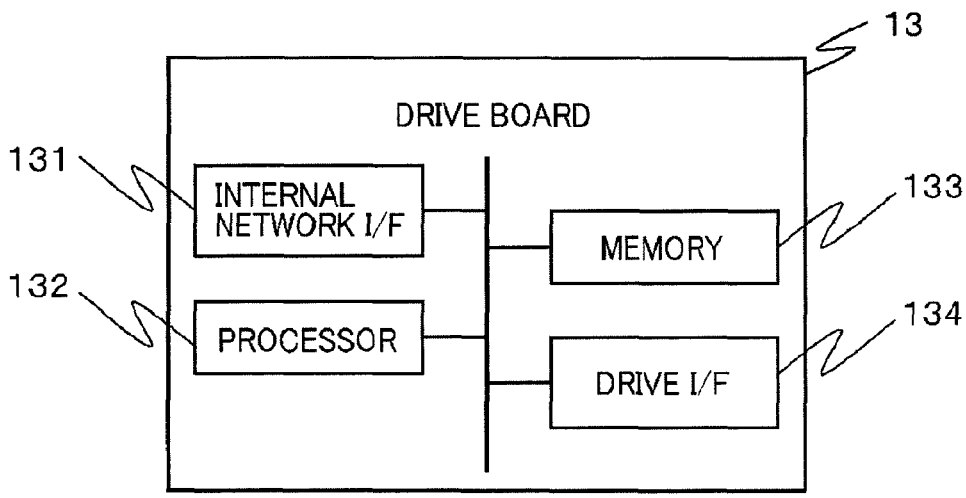
FIG. 7 shows a hardware configuration of drive board 13.

FIG. 7 shows a hardware configuration of the drive board 13. The drive board 13 includes an internal network interface (hereinafter, referred to as "internal network I/F 131"), a processor 132, a memory 133 and a drive interface (hereinafter, referred to as "drive I/F 134").

The memory 133 stores micro programs therein. The processor 132 reads the micro programs from the memory 133 and executes the programs, whereby various kinds of functions provided by the drive board 13 are implemented.

The internal network I/F 131 communicates with the channel boards 11, the processor boards 12, the cache memory 14 and the shared memory 15 via the internal switch 16. The processor 132 includes a CPU, an MPU or the like. The memory 133 is, for example, a RAM or a ROM. The drive I/F 134 communicates with the storage device 17.

The maintenance device 18 shown in FIG. 4 performs setting, controlling and state monitoring of the components of each of the storage apparatuses 10. The maintenance device 18 is implemented by using an information apparatus such as a personal computer or an office computer. The maintenance device 18 communicates, whenever necessary, with the components of the storage apparatus 10 such as the channel boards 11, the processor boards 12, the drive boards 13, the cache memory 14, the shared memory 15 and the internal switch 16 via the internal switch 16 and dedicatedly-prepared communication means such as a LAN, thereby acquires configuration information, operational information and the like from the components and then provides the acquired information to the management device 19. Furthermore, the maintenance device 18 performs setting, controlling and maintenance (including installation and update of software) on the basis of control information sent from the management device 19.

The management device 19 shown in FIG. 4 is a computer communicatively coupled to the maintenance device 18 via the LAN or the like. The management device 19 is implemented, for example, by use of a personal computer, an office computer or the like. The management device 19 includes interfaces (GUI (Graphical User Interface), CLI (Command Line Interface), and the like) used by users to control and monitor the storage apparatus 10.

Figure 8:
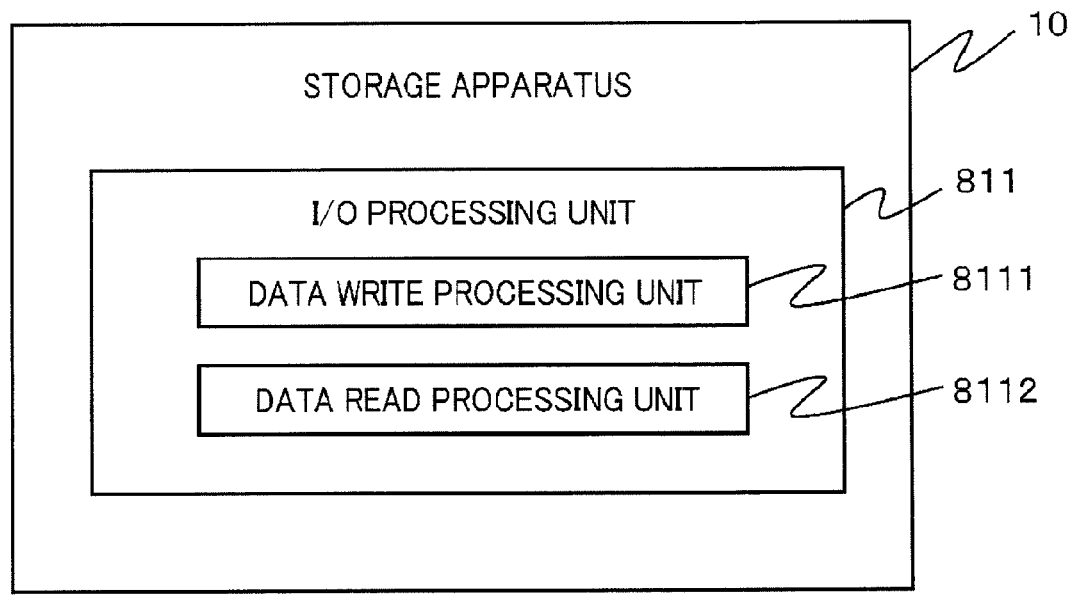
FIG. 8 shows basic functions provided by storage apparatus 10.

FIG. 8 shows basic functions of the storage apparatus 10. The storage apparatus 10 includes an I/O processing unit 811. As shown in FIG. 8, the I/O processing unit 811 includes a data write processing unit 8111 to perform processing relating to writing data to the storage device 17 and a data read processing unit 8112 to perform processing relating to reading data from the storage device 17. The I/O processing unit 811 is implemented by the hardware included in the channel board 11, the processor board 12 or the drive board 13 or implemented by the processor 112, the processor 122 or the processor 132 reading and executing the micro programs stored in the memory 113, the memory 123 or the memory 133.

Figure 9:
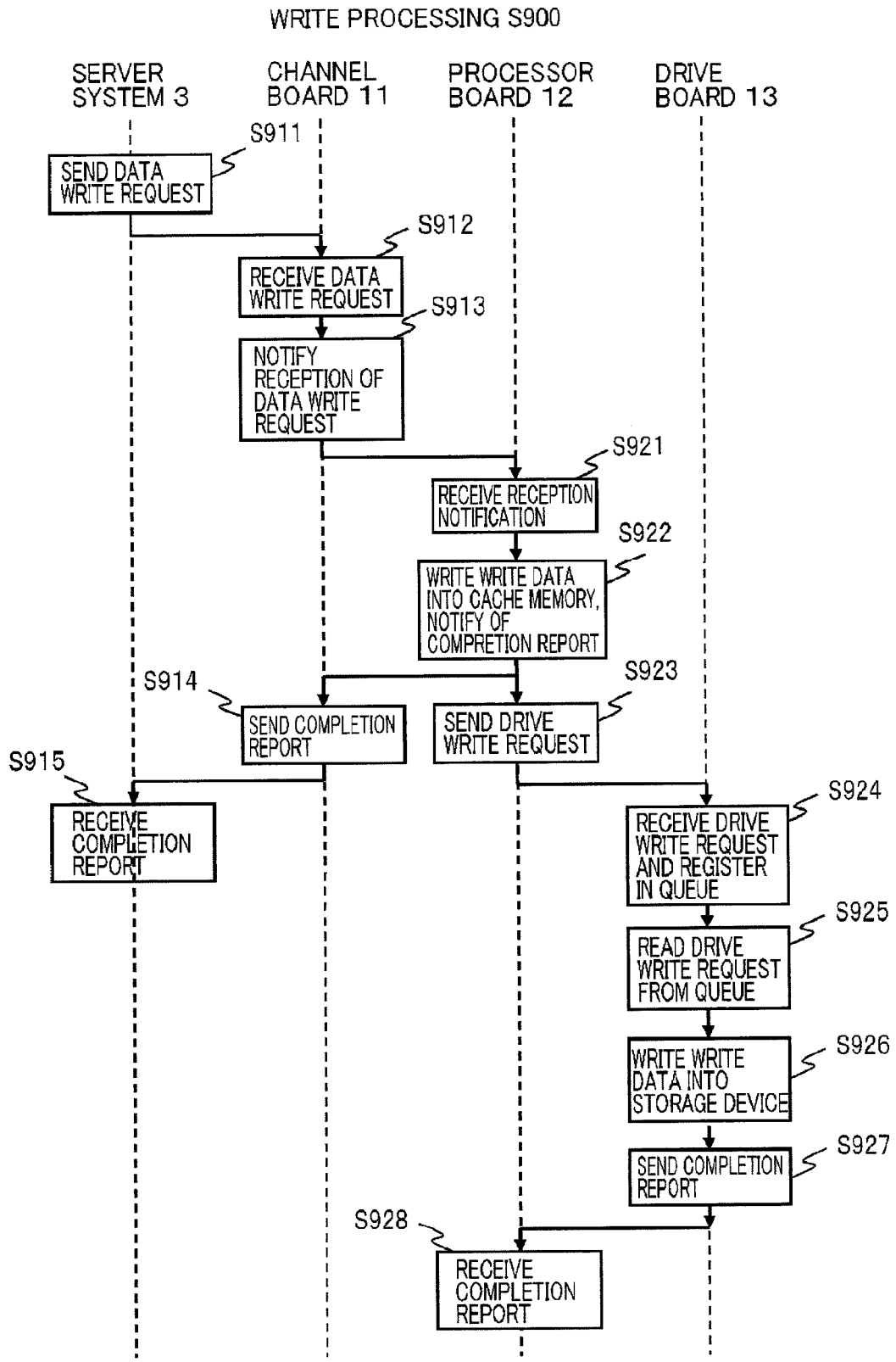
FIG. 9 shows a flowchart explaining write processing S900.

FIG. 9 shows a flowchart explaining basic processing (hereinafter, referred to as "write processing S900") performed by the data write processing unit 8111 of the I/O processing unit 811 in the case where the storage apparatus 10 receives a frame including a data write request from the server system 3. The following describes the write processing S900 with reference to FIG. 9. The character "S" attached to numerals stands for Step in the following description.

As shown in FIG. 9, the channel board 11 of the storage apparatus 10 receives a frame of a data write request sent from the server system 3 (S911 and S912).

When the channel board 11 receives the frame including the data write request from the server system 3, the channel board 11 sends a notification of this reception to the processor board 12 (S913).

When the processor board 12 receives the notification from the channel board 11 (S921), the processor board 12 generates a drive write request based on the data write request of the frame, stores the write data into the cache memory 14, and notifies the channel board 11 of a data write completion report (S922). The processor board 12 sends the generated drive write request to the drive board 13 (S923).

Upon receiving the notification from the processor board 12, the channel board 11 sends a completion report to the server system 3 (S914). Accordingly, the server system 3 receives the completion report from the channel board 11 (S915).

Upon receiving the drive write request from the processor board 12, the drive board 13 registers the received drive write request in a write processing queue (S924).

The drive board 13 reads, whenever necessary, the drive write request from the write processing queue (S925), reads the write data, specified by the read drive write request, from the cache memory 14 and then writes the read write data to the storage device (storage drive 171) (S926). The drive board 13 notifies the processor board 12 a report indicating the completion (completion report) of the writing of the write data for the drive write request (S927).

The processor board 12 receives the completion report sent from the drive board 13 (S928).

Figure 10:
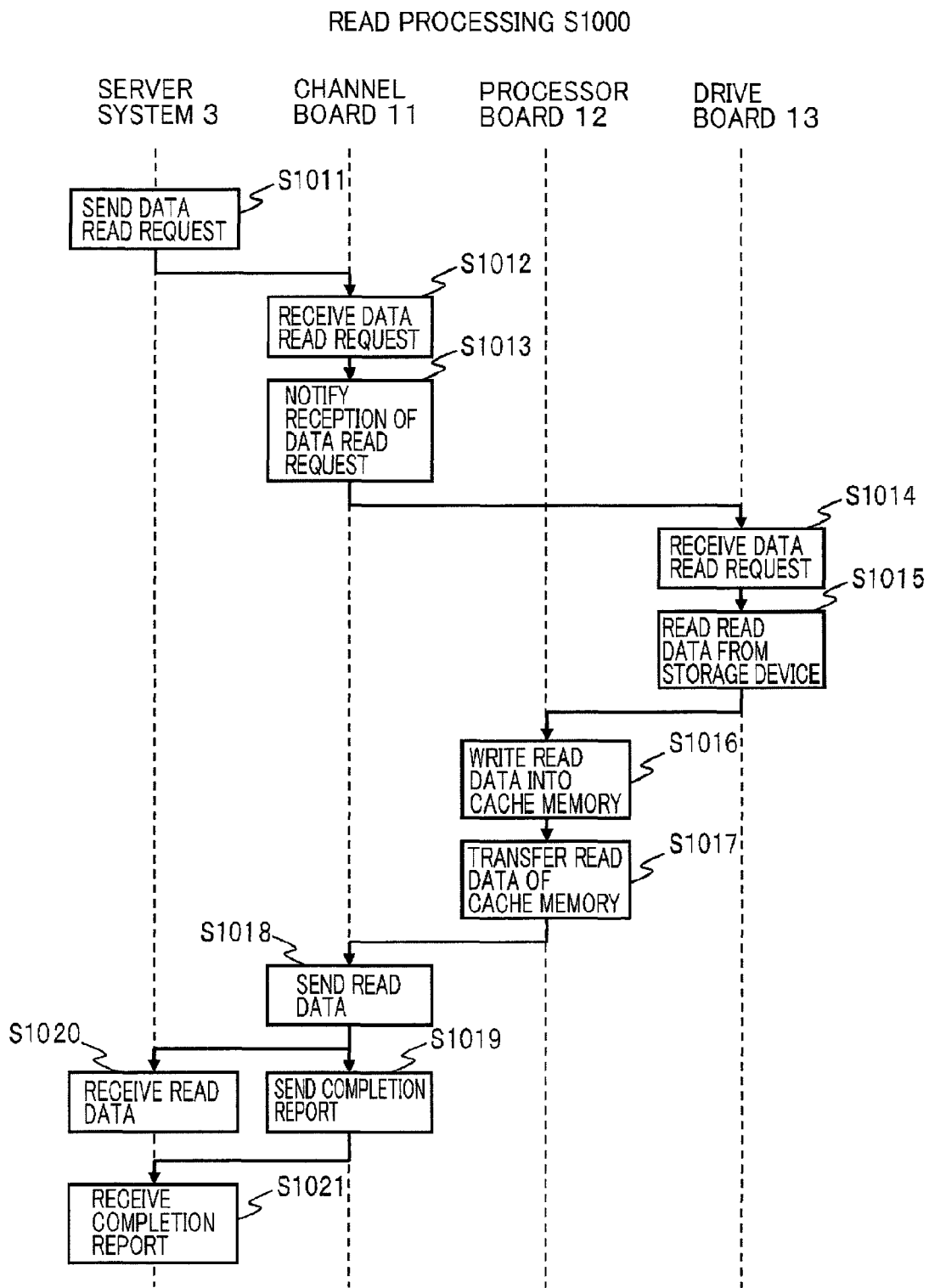
FIG. 10 shows a flowchart explaining read processing S1000.

FIG. 10 shows a flowchart explaining the I/O processing (hereinafter, referred to as "read processing S1000") performed by the read processing unit 8112 of the I/O processing unit 811 in the storage apparatus 10 in the case where the storage apparatus 10 receives a frame including a data read request from the server system 3. The following describes the read processing S1000 with reference to FIG. 10.

As shown in FIG. 10, at first, the channel board 11 of the storage apparatus 10 receives a frame sent from the server system 3 (S1011, S1012).

Upon receiving the frame including a data read request from the server system 3, the channel board 11 sends a notification of the reception to the drive board 13 (S1013).

Upon receiving the notification from the channel board 11 (S1014), the drive board 13 reads the data, specified by the data read request (e.g., specified by an LBA (Logical Block Address)) included in the frame, from the storage device 17 (S1015). Here, if the read data exists in the cache memory 14 (i.e., in the case of a cache hit), the read processing from the storage device 17 (S1015, S1016) is omitted.

The processor board 12 writes the data read by the drive board 13 to the cache memory 14 (S1016). The processor board 12 transfers, whenever necessary, the data written in the cache memory 14 to the channel board 11 (S1017).

While receiving the read data sent from the processor board 12 whenever necessary, the channel board 11 sequentially sends the read data to the server system 3 (S1018). After completing sending the read data, the channel board 11 sends a completion report to the server system 3 (S1019). The server system 3 receives the read data and the completion report (S1020, S1021).

Figure 11:
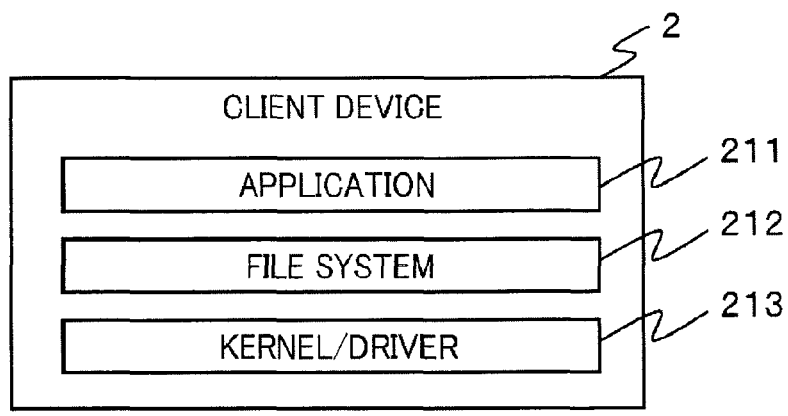
FIG. 11 shows primary functions of the client device 2.

FIG. 11 shows primary functions of the client device 2. As shown in FIG. 11, the client device 2 has functions of an application 211, a file system 212, and a kernel/driver 213. These functions are implemented by the processor 21 of the client device 2 reading and executing the programs stored in the memory 22 or the storage device 23.

The file system 212 implements an I/O function to the logical volumes (LUs) in units of files or units of directories for the client device 2. The file system 212 is, for example, FAT (File Allocation Table), NTFS, HFS (Hierarchical File System), ext2 (second extended file system), ext3 (third extended file system), ext4 (fourth extended file system), UDF (Universal Disk Format), HPFS (High Performance File system), JFS (Journaled File System), UFS (Unix File System), VTOC (Volume Table of Contents), XFS or the like.

The kernel/driver 213 is implemented by the execution of a kernel module and a driver module included in software of an operating system. The kernel module includes programs for implementing basic functions of the operating system such as process management, process scheduling, storage area management, handling of an interruption request from hardware, for software executed by the client device 2. The driver module includes programs for allowing a kernel module to communicate with the hardware of the client device 2 or peripheral devices used by being coupled to the client device 2.

Figure 12:
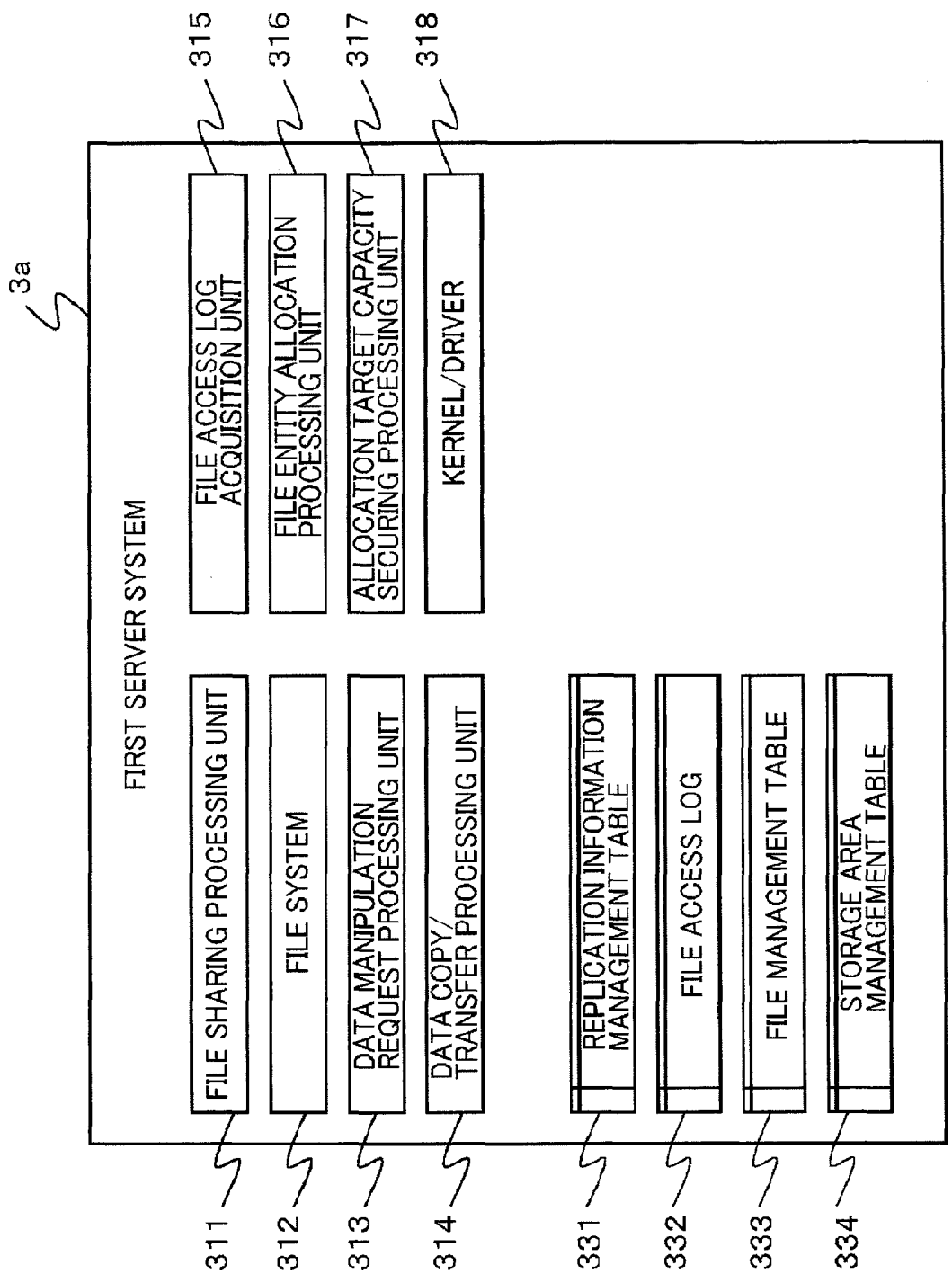

FIG. 12 shows primary functions of the first server system 3a and primary information (data) managed by the first server system 3a. As shown in FIG. 12, the first server system 3a has functions of a file sharing processing unit 311, the file system 312, a data manipulation request processing unit 313, a data copy/transfer processing unit 314, a file access log acquisition unit 315, a file entity allocation processing unit 316, an allocation target capacity securing processing unit 317 and a kernel/driver 318.

These functions are implemented by the hardware included in the first server system 3a or are implemented by the processing unit 31 of the first server system 3a reading and executing the programs stored in the memory 32. Further, the functions of the data manipulation request processing unit 313, the data copy/transfer processing unit 314, the file access log acquisition unit 315, the file entity allocation processing unit 316 and the allocation target capacity securing processing unit 317 may be implemented as functions of the file system 312 or may be implemented as functions independent of the file system 312. Moreover, at least one of the maintenance device 18 and the management device 19 may mainly act to implement part of the functions of the file entity allocation processing unit 316 and the allocation target capacity securing processing unit 317.

As shown in FIG. 12, the first server system 3a manages (stores) information (data) such as a replication information management table 331, a file access log 332, a file management table 333, and a storage area management table 334. These information are, for example, stored in the memory 32 or the storage device 33 of the first server system 3a.

Among the functions shown in FIG. 12, the file sharing processing unit 311 provides a file sharing environment to the client device 2. The file sharing processing unit 311 provides functions in conformity with a protocol such as for example NFS (Network File System), CIFS (Common Internet File System), or AFS (Andrew File System).

The file system 312 provides the client device 2 with an I/O function for files (or directories) managed in the logical volumes (LUs) provided by the first storage apparatus 10a. The file system 312 is of FAT, NTFS, HFS, ext2,ext3,ext4, UDF, HPFS, JFS, UFS, VTOC, or XFS, for example.

The data manipulation request processing unit 313 receives a request for manipulating data (hereinafter, referred to as "data manipulation request") sent from the client device 2. The data manipulation request includes a replication start request, a replication file update request, a replication file reference request, a synchronization request, a metadata access request, a file entity reference request, a recall request, an update request for an entity of a stub file, and the like.

Here, stubbing means that metadata of data in a file (or directory) is managed (stored) in the first storage apparatus 10a while the entity of the data in the file (or directory) is not managed (stored) in the first storage apparatus 10a but is managed (stored) only in another storage apparatus (e.g., the second storage apparatus 10b). A stub indicates metadata that remains in the first storage apparatus 10a in the stubbing. When the first server system 3a receives a data I/O request that requires the entity of a stubbed file (or directory), the entity of the file (or directory) is sent from another storage apparatus 10 to the first storage apparatus 10a (hereinafter, referred to as "recall").

The data copy/transfer processing unit 314 sends and receives data (including metadata and entity of a file) and control information (including flags and tables) to and from another server system 3 (the second server system 3b and the third server system 3c) or the storage apparatus 10 (the first storage apparatus 10a, the second storage apparatus 10b and the third storage apparatus 10c), and manages various kinds of tables.

When there is an access to a file (file update (Write, Update), file read (Read), file open (Open), file close (Close) or the like) stored in a logical volume (LU or virtual LU) of the storage apparatus 10, the file access log acquisition unit 315 appends a time stamp based on the date/time information acquired from the clock device 37 to information (hereinafter, referred to as "access log") indicating data (history) of the access and stores the information as a file access log 332.

The file entity allocation processing unit 316 determines which one of the first storage apparatus 10a coupled to the first server system 3a, the second storage apparatus 10b coupled to the second server system 3b, and the third storage apparatus 10c couple to the third server system 3c to use to allocate (store) the entity of a file provided to the client device 2 by the first server system 3a, on the basis of a requirement set for the file (confidentiality requirement, reliability requirement or performance requirement). In addition, when the entity of a file is present in a allocation target different from the determined allocation target, the file entity allocation processing unit 316 executes processing for allocating the entity of the file to the determined allocation target.

If a free area cannot be secured in the determined allocation target when the file entity allocation processing unit 316 is about to allocate (transfer) the entity of the file into the allocation target, the allocation target capacity securing processing unit 317 executes processing for securing necessary free area.

The kernel/driver 318 is implemented by executing a kernel module and a driver module included in the software of an operating system. The kernel module includes programs for implementing basic functions of the operating system such as process management, process scheduling, storage area management, handling of an interruption request from the hardware, for software executed by the first server system 3a. The driver module includes programs for allowing the kernel module to communicate with the hardware included in the first server system 3a or peripheral devices used by being coupled to the first server system 3a.

FIG. 13 shows an exemplary replication information management table 331. As shown in FIG. 13, a threshold 3311 used for determining whether to perform stubbing or not (hereinafter, referred to as "stub threshold") is set in the replication information management table 3311.

FIG. 14 shows an exemplary file access log 332. As shown in FIG. 14, the file access log 332 records an access log formed of one or more records each including an access date/time 3321, a file name 3322 and a user ID 3323.

Among these data, the access date/time 3321 has set therein the date and time the file (or directory) had been accessed. The file name 3322 has set therein a file name (or directory name) of a file (or directory) that has been targeted for an access. The user ID 3323 has set therein a user ID of a user who accessed the file (or directory).

FIG. 15 shows an exemplary file management table 333. In the file management table 333, information relating to files to be provided to the client device 2 by the first server system 3a is managed. The contents of the file management table 333 are set by a user using the maintenance device 18 or the management device 19 or by the first server system 3a, for example.

As shown in FIG. 15, the file management table 333 includes records each including items of file name 151, current allocation target 152 (apparatus ID 1521 and LDEV_ID 1522), and requirement 153 (confidentiality 1531, reliability 1532 and performance 1533).

The file name 151 has set therein an identifier of a file (file path name, file name or the like).

The current allocation target 152 (the apparatus ID 1521 and the LDEV_ID 1522) has set therein information indicating location (current allocation target (stored location)) of the target file. The apparatus ID 1521 has set therein identifiers (hereinafter, referred to as "apparatus ID") of the storage apparatuses 10 (the first storage apparatus 10a, the second storage apparatus 10b, and the third storage apparatus 10c). Here, in the present embodiment, the first storage apparatuses 10a are given identifiers of "Storage G1 to G1 (1 denotes the total number of the first storage apparatuses 10a)," the second storage apparatuses 10b are given identifiers of "Storage C1 to Cm (m denotes the total number of the second storage apparatuses 10b)," and the third storage apparatuses 10c are given identifiers of "Storage N1 to Nn (n denotes the total number of the third storage apparatuses 10c)." The LDEV_ID 1522 has set therein an LDEV_ID.

The requirement 153 (the confidentiality 1531, the reliability 1532 and the performance 1533) are set to have the aforementioned requirements set for the target file. The content of the requirement 153 is set by, for example, the user (owner) of the file.

The confidentiality 1531 has set therein a requirement relating to the confidentiality of the target file. In the present embodiment, if the target file requires confidentiality (e.g., a file to be treated with its content kept private), the confidentiality 1531 is set at "high" (first confidentiality). In contrast, if the target file does not require confidentiality (e.g., a file not requiring its content to be kept private), the confidentiality 1531 is set at "low" (second confidentiality).

The present embodiment describes a case where the confidentiality requirement is settable to either of the two levels of "high" and "low," but the levels of the confidentiality requirement are not limited to the two. Three or more levels of confidentiality requirement may be set. In addition, any one of the first server system 3a, the second server system 3b, the third server system 3c, the storage apparatus 10, and the management device 19 may automatically set the confidentiality requirement (the confidentiality 1531) of a file according to the type or content of the file, such as the name and extension of the file, the content of the file entity, or the owner 2212 and access right 2213 of the file for example. Further, the confidentiality requirement may be set according to the setting operation by the owner of the file.

The reliability 1532 has set therein reliability requirement relating to a target file. In the present embodiment, a RAID level corresponding to the reliability of the target file is set. For example, the reliability 1532 for a file requiring high reliability is set at "RAID6" and the reliability 1532 for a file not requiring high reliability very much is set at "RAID1, 5."

The present embodiment describes a case where the reliability requirement settable to either of the two levels of "RAID 6" (first reliability) and "RAID 1, 5" (second reliability) but the levels of the reliability requirement are not limited to the two. Three or more levels of reliability requirement may be set.

Moreover, the reliability requirement is not limited to the RAID level, but may be another type of requirement such as the type of hardware (for example, type of storage drive 171 supporting SSD, SAS, SATA and the like), hardware redundancy or communication environment redundancy, and failure-resistance (for example, performing or not performing local copy or performing or not performing remote copy), or may be a requirement having combined one or more of the above-mentioned requirements. In addition, any one of the first server system 3a, the second server system 3b, the third server system 3c, the storage apparatus 10, and the management device 19 may automatically set the reliability requirement (the reliability 1532) of a file according to the type or content of the file, such as the name and extension of the file, the content of the file entity, or the owner 2212 and access right 2213 of the file for example. Further, the reliability requirement may be set according to the setting operation by the owner of the file.

The performance 1533 has set therein the performance requirement relating to a target file. In the present embodiment, the access performance required to the target file is set in performance 1533. For example, access performance "L1" (first performance) is set for a file requiring high performance when accessing the target file and "L2" (second performance) (L1>L2) is set for a file not requiring high performance when accessing the target file.

The present embodiment is described in the case where the access performance is settable as the performance requirement to either of the two levels of "L1" and "L2" but the levels of the access performance are not limited to the two. Three or more levels of access performance may be set. In addition, the performance requirement is not limited to the access performance, and may be another type of requirement such as hardware performance or communication speed.

Moreover, any one of the first server system 3a, the second server system 3b, the third server system 3c, the storage apparatus 10, and the management device 19 may automatically set the performance requirement (performance 1533) of a file according to the type or content of the file, such as the name and extension of the file, the content of the file entity, or the owner 2212 and access right 2213 of the file for example. Further, the performance requirement may be set according to the setting operation by the owner of the file.

FIG. 16 shows an exemplary storage area management table 334. The storage area management table 334 is used to manage information relating to the LDEVs 172 present in each of the storage apparatuses 10 (the first storage apparatus 10a, the second storage apparatus 10b, and the third storage apparatus 10c). The contents of the storage area management table 334 are set by, for example a user using the maintenance device 18 or the management device 19 or by the first server system 3a.

As shown in FIG. 16, the storage area management table 334 includes records each including items of LDEV_ID 161, apparatus property 162 (apparatus ID 1621, confidentiality 1622 and performance 1623), RAID level 163, and storage capacity 164 (capacity in use 1641, threshold 1642 and total capacity 1643).

The LDEV_ID 161 has set therein an LDEV_ID. The apparatus property 162 has set therein information relating to the storage apparatus 10 to which the target LDEV 172 belongs. The apparatus ID 1621 has set therein the apparatus ID of the storage apparatus 10 to which the target LDEV 172 belongs. The confidentiality 1622 has set therein information ("high" for high confidentiality and "low" for low confidentiality are set) indicating the confidentiality of the storage apparatus 10 to which the target LDEV 172 belongs. The performance 1623 has set therein information (L1 or L2) indicating the performance (file access performance) achievable by the storage apparatus 10 to which the target LDEV 172 belongs.

The RAID level 163 has set therein information (RAID1, 5, 6 or the like) indicating the RAID level of the target LDEV 172 (the RAID level of the RAID group including the target LDEV 172).

The storage capacity 164 has set therein information on the storage capacity of the target LDEV 172. The capacity in use 1641 has set therein the capacity currently in use (use amount) of the target LDEV 172. The threshold 1642 has set therein a threshold to be referred to for determination as to whether the target LDEV 172 has a sufficient free capacity or not. The total capacity 1643 has set therein the total capacity of the target LDEV 172.

Figure 17:
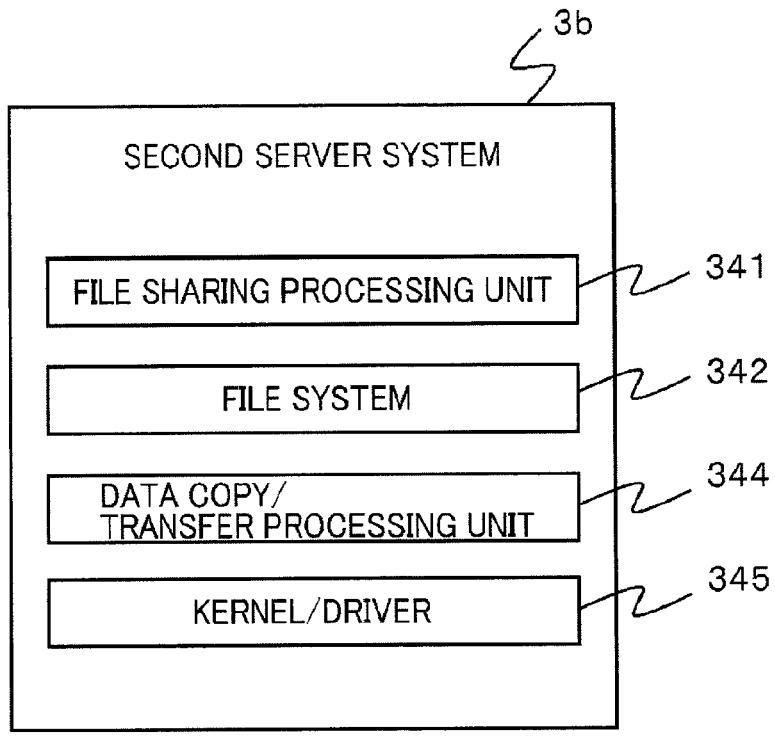
FIG. 17 shows primary functions of second server system 3b.

FIG. 17 shows the primary functions of the second server system 3b. As shown in FIG. 17, the second server system 3b includes functions of a file sharing processing unit 341, a file system 342, a data copy/transfer processing unit 344 and a kernel/deriver 345. The function of the data copy/transfer processing unit 344 may be implemented as a function of the file system 342 or may be implemented as a function independent of the file system 342.

The file sharing processing unit 341 provides a file sharing environment for file sharing with the first server system 3a. The file sharing processing unit 341 is implemented, for example, according to protocol such as NFS, CIFS or AFS.

The file system 342 uses the logical volumes (LUs) provided by the second storage apparatus 10b and provides the first server system 3a with an I/O function to the logical volumes (LU or virtual LU) in units of files or units of directories. The file system 342 is of FAT, NTFS, HFS, ext2,ext3, ext4,UDF, HPFS, JFS, UFS, VTOC or XFS, for example.

The data copy/transfer processing unit 344 performs processing relating to transfer or copying of data to and from the first server system 3a and the second storage apparatus 10b.

The kernel/driver 345 is implemented by executing a kernel module and a driver module included in software of an operating system. The kernel module includes programs for implementing basic functions of the operating system such as process management, process scheduling, storage area management, handling of an interruption request from hardware, for software executed by the second server system 3b. The driver module includes programs for allowing the kernel module to communicate with the hardware of the second server system 3b or peripheral devices used by being coupled to the second server system 3b.

Figure 18:
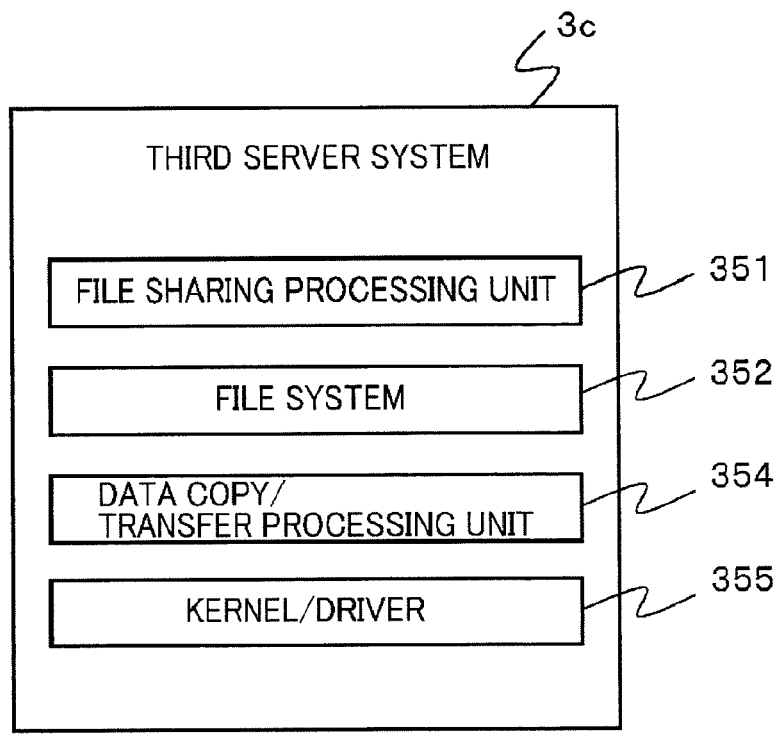
FIG. 18 shows primary functions of third server system 3c.

FIG. 18 shows the primary functions of the third server system 3c. As shown in FIG. 18, the third server system 3c includes functions of a file sharing processing unit 351, a file system 352, a data copy/transfer processing unit 354 and a kernel/driver 355. The function of the data copy/transfer processing unit 354 may be implemented as a function of the file system 352 or may be implemented as a function independent of the file system 352.

The file sharing processing unit 351 provides a file sharing environment for file sharing with the first server system 3a. The file sharing processing unit 351 is implemented, for example, according to protocol such as NFS, CIFS or AFS.

The file system 352 uses the logical volumes (LUs) provided by the third storage apparatus 10c and provides the first server system 3a with an I/O function to the logical volumes (LU or virtual LU) in units of files or units of directories. The file system 352 is of FAT, NTFS, HFS, ext2,ext3,ext4,UDF, HPFS, JFS, UFS, VTOC or XFS, for example.

The data copy/transfer processing unit 354 performs processing for transfer and copying of data to and from the first server system 3a and the third storage apparatus 10c.

The kernel/driver 355 is implemented by executing a kernel module and a driver module included in software of an operating system. The kernel module includes programs for implementing basic functions of the operating system such as process management, process scheduling, storage area management, handling of an interruption request from hardware, for software executed by the third server system 3c. The driver module includes programs for allowing the kernel module to communicate with the hardware of the third server system 3c or peripheral devices used by being coupled to the third server system 3c.

<File System>

Next, the configuration of the file system 312 of the first server system 3a is described below in detail. The file system 342 of the second server system 3b and the file system 352 of the third server system 3c have the same or similar configurations to the file system 312 of the first server system 3a.

Figure 19:
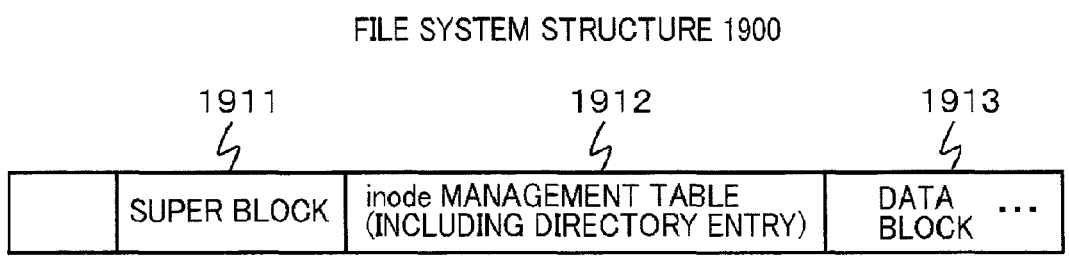
FIG. 19 is a diagram explaining file system structure 1900.

FIG. 19 shows an exemplary data structure (hereinafter, referred to as "file system structure 1900") which the file system 312 manages in the logical volume (LU or virtual LU). As shown in FIG. 19, the file system structure 1900 includes storage areas for super block 1911, mode management table 1912 and data block 1913 in which the entity (data) of a file is stored.

The super block 1911 stores therein information relating to the file system 312 (capacity, capacity in use and free area in each storage area handled by the file system). The super block 1911 is normally set in each disk partition (partition set on the logical volume (LU or virtual LU)). Specific examples of such information stored in the super block 1911 include the number of data blocks in the segment, a size of data block, the number of free blocks, the number of free Modes, the number of mounts in the segment, and elapsed time after the last consistency check.

Figure 20:
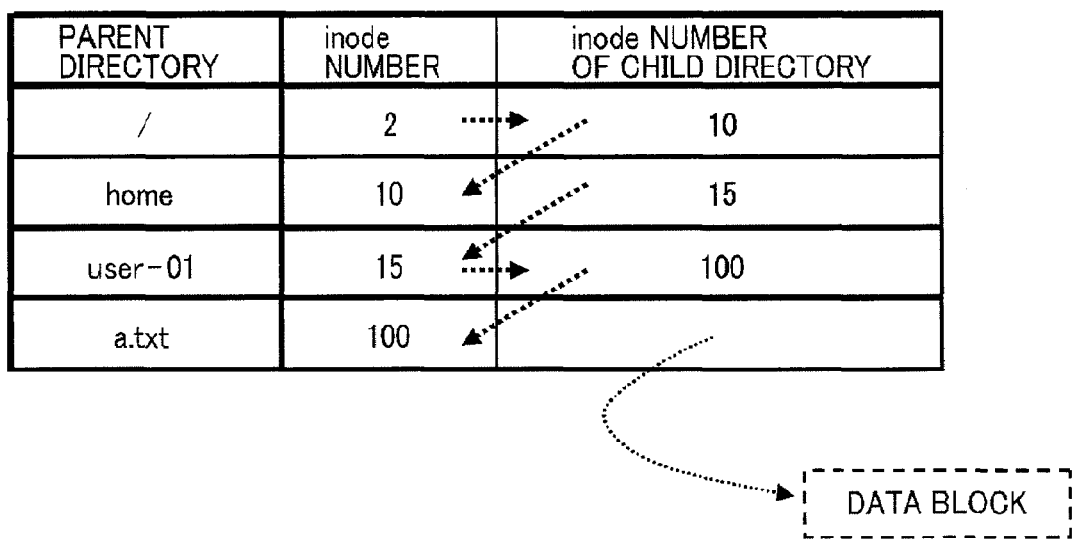
FIG. 20 is a diagram for explaining a concept of inode.

The inode management table 1912 stores therein management information (hereinafter, referred to as "inode") of files (or directories) stored in the logical volumes (LU or virtual LU). The file system 312 manages a single file (or directory) in association with a single mode. An inode including only directory information is called "directory entry". When there is an access to a file, the data block of the access target file is accessed by referring to the directory entries. For example, in the case of accessing the file at "/home/user-01/a.txt," the data block of the access target file is accessed by tracing the inode numbers and the directory entries in the order shown by arrows in FIG. 20 (2->10->15->100).

Figure 21:
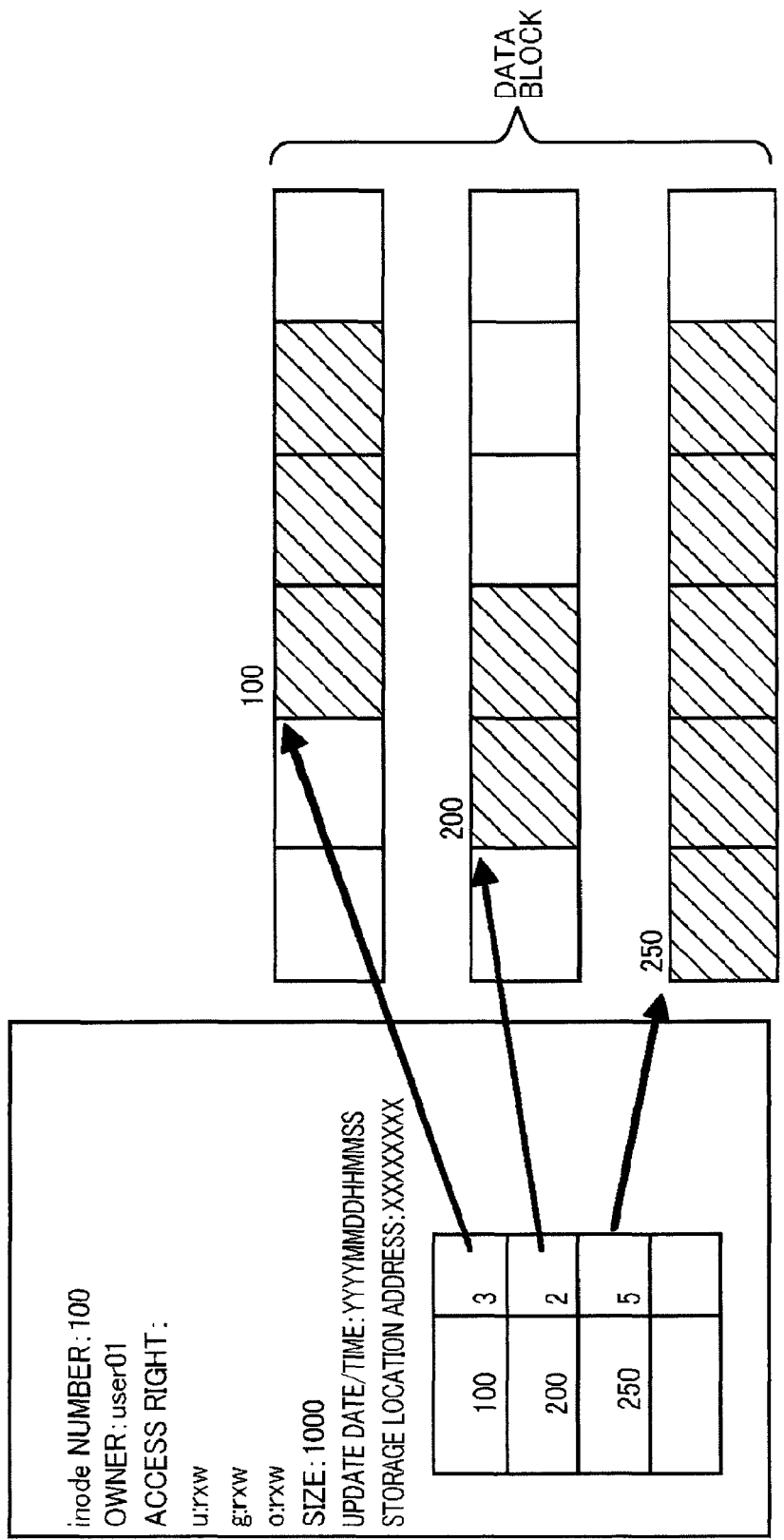
FIG. 21 is a diagram for explaining inode management table 1912.
Figure 22:
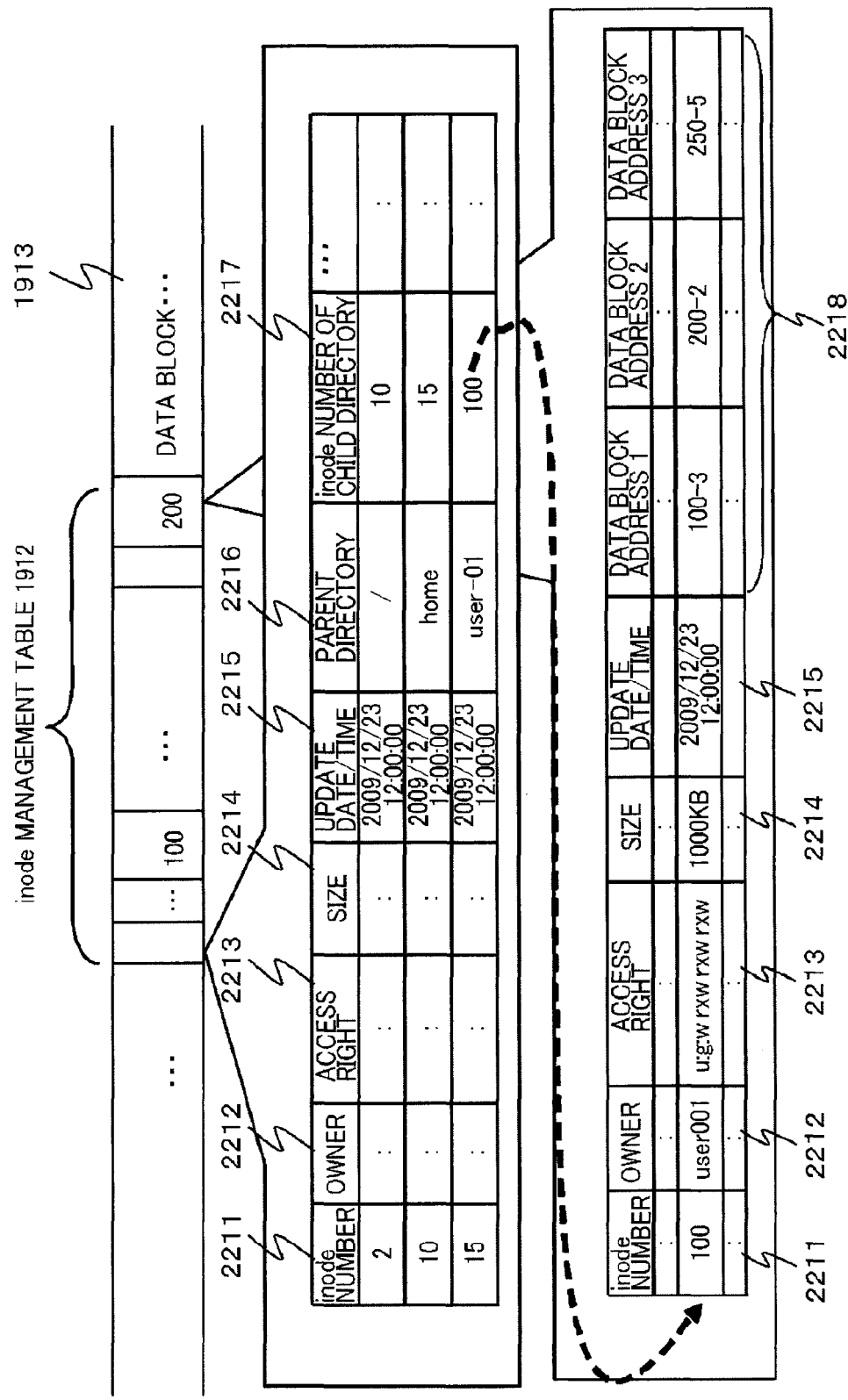
FIG. 22 shows an exemplary inode management table 1912.

FIG. 21 shows a concept of an inode in a general file system (e.g., file system included in a UNIX (Registered Trademark) type operating system). FIG. 22 shows an exemplary inode management table 1912.

As shown in FIGS. 21 and 22, the inode includes pieces of information such as inode number 2211 for identifying each inode, owner 2212 of the target file (or directory), access right 2213 set for the target file (or directory), file size 2214 of the target file (or directory), latest update date/time 2215 of the target file (or directory), parent directory 2216 of the directory that is set when the inode is a directory entry, child directory 2217 of the directory that is set when the inode is a directory entry, and information for specifying data blocks in which the entity of the data of the target file is stored (hereinafter, referred to as "data block address 2218").

Figure 23:
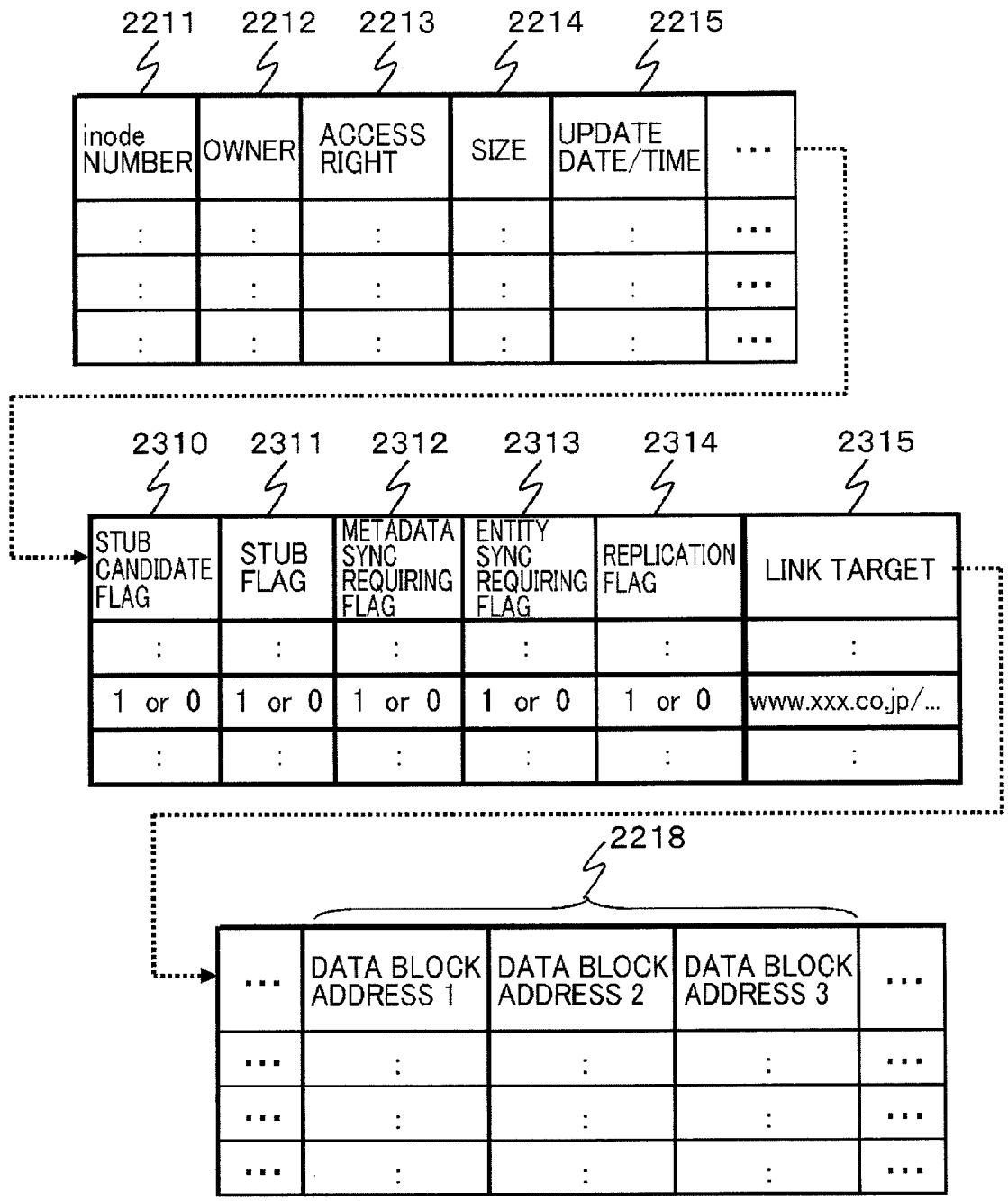
FIG. 23 shows an exemplary inode management table 1912.

As shown in FIG. 23, in addition to the contents of the inode management table 1912 in the general file system shown in FIG. 22, the file system 312 further manages a stub flag 2311, metadata sync requiring flag 2312, entity sync requiring flag 2313, replication flag 2314, and link target 2315, as information attached to the inode management table 1912.

When a copy of the metadata of a file stored in the first storage apparatus 10a (metadata including the various kinds of attached information shown in FIG. 23) is stored in the second storage apparatus 10b (i.e., the metadata is replicated), by replication-based management method or stubbing-based management method, a notification of an update of the metadata in one of the apparatuses is sent to the other apparatus through the synchronization processing S3400 described later. In this way, the contents of the metadata of the first storage apparatus 10a matching with the metadata of the second storage apparatus 10b are secured on an almost real-time basis.

In FIG. 23, the stub candidate flag 2310 has set therein information indicating whether a file corresponding to the inode (or directory) is a candidate to be stubbed. The stub candidate flag 2310 is set at "1" if the file (or directory) corresponding to the inode is a candidate to be stubbed; or the stub candidate flag 2310 is set at "0" if the file is not a candidate to be stubbed.

The stub flag 2311 has set therein information indicating whether the file (or directory) corresponding to the inode is stubbed or not. The stub flag 2311 is set at "1" if the file (or directory) corresponding to the inode is stubbed; or the stub flag 2311 is set at "0" if the file is not stubbed.

The metadata sync requiring flag 2312 has set therein information indicating whether the metadata of the file (or directory) stored in the first storage apparatus 10a as a copy source needs to be synchronized with the metadata of the file (or directory) stored in the second storage apparatus 10b as a copy destination (whether the contents thereof need to be matched with each other). The metadata sync requiring flag 2312 is set at "1" when the synchronization of the metadata is necessary; or the metadata sync requiring flag 2312 is set at "0" when the synchronization is not necessary.

The entity sync requiring flag 2313 has set therein information indicating whether the entity of the file data in the first storage apparatus 10a as the copy source needs to be synchronized with the entity of the file data of the second storage apparatus 10b as the copy destination (whether the contents thereof need to be matched with each other). The entity sync requiring flag 2313 is set at "1" when the synchronization of the entities of file data is necessary; or the entity sync requiring flag 2313 is set at "0" when the synchronization is not necessary.

The metadata sync requiring flag 2312 and the entity sync requiring flag 2313 are referred to whenever necessary in the synchronization processing S3400 described later. When the metadata sync requiring flag 2312 or the entity sync requiring flag 2313 is set at "1", the metadata or entity of the first storage apparatus 10a is automatically synchronized with the metadata or entity of the second storage apparatus 10b, being a copy of the metadata or entity of the first storage apparatus 10a.

The replication flag 2314 has set therein information indicating whether or not the file (or directory) corresponding to the inode is currently a target of management by the replication-based management method described later. The replication flag 2314 is set at "1" when the file corresponding to the inode is currently a target of management by the replication-based management method; or the replication flag 2314 is set at "0" when the file is not a target of management bys the replication-based management method.

The link location 2315 has set therein information indicating a copy destination (e.g., path name, identifier of a RAID group, block address, URL (Uniform Resource Locator), LUN and the like to specify the storage location) of the file corresponding to the inode when the file is managed with the replication-based management method described later.

=Explanation of Processing=

The processing performed in the information system 1 having the above-mentioned configuration is described below. To begin with, the following describes the processing performed between the first server system 3a (gateway apparatus or file storage apparatus) at edge 50 and the second server system 3b (archive apparatus) at core 51.

<Replication Start Processing>

Figure 24:
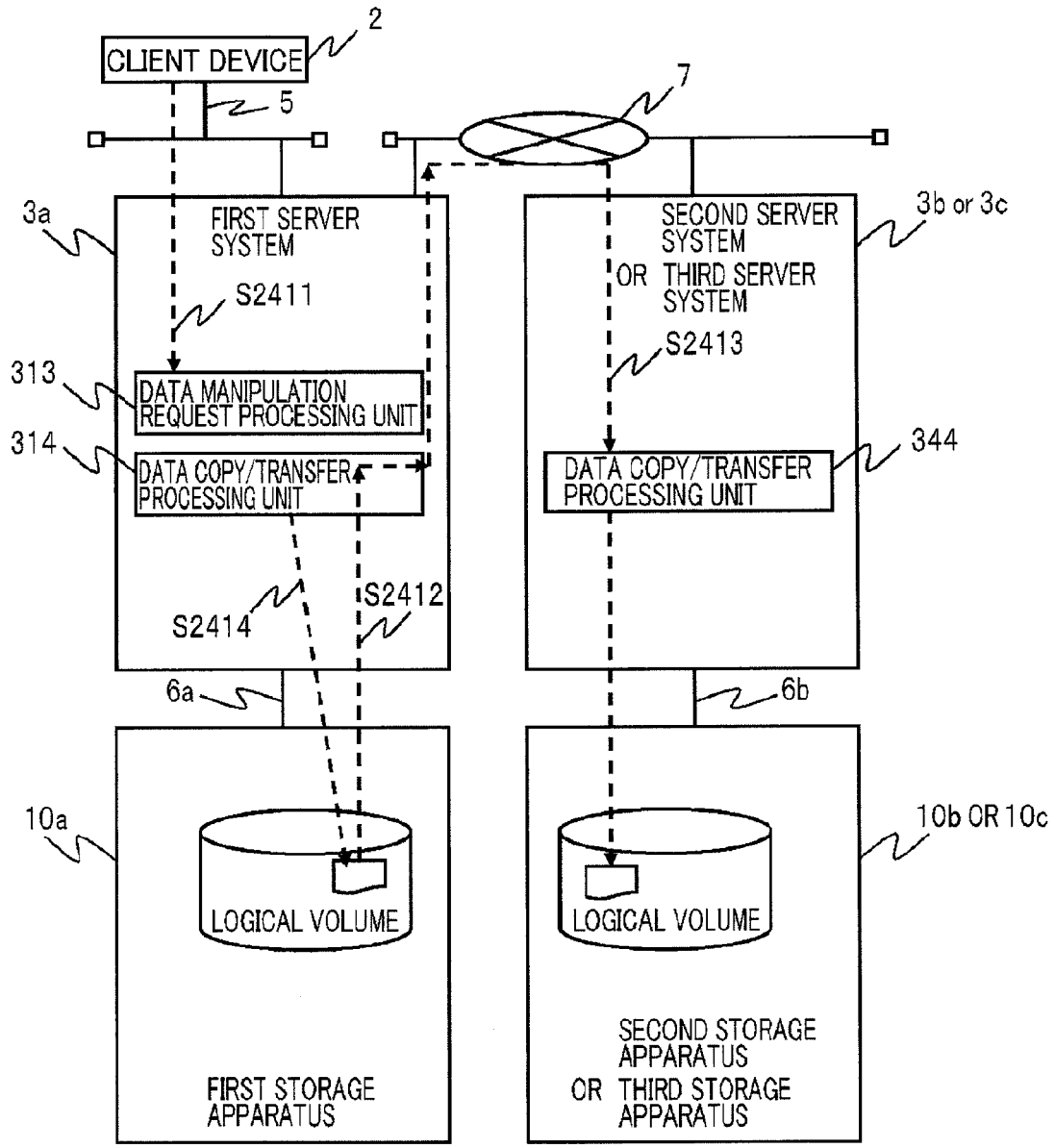
FIG. 24 is a diagram explaining replication start processing S2400.
Figure 25:
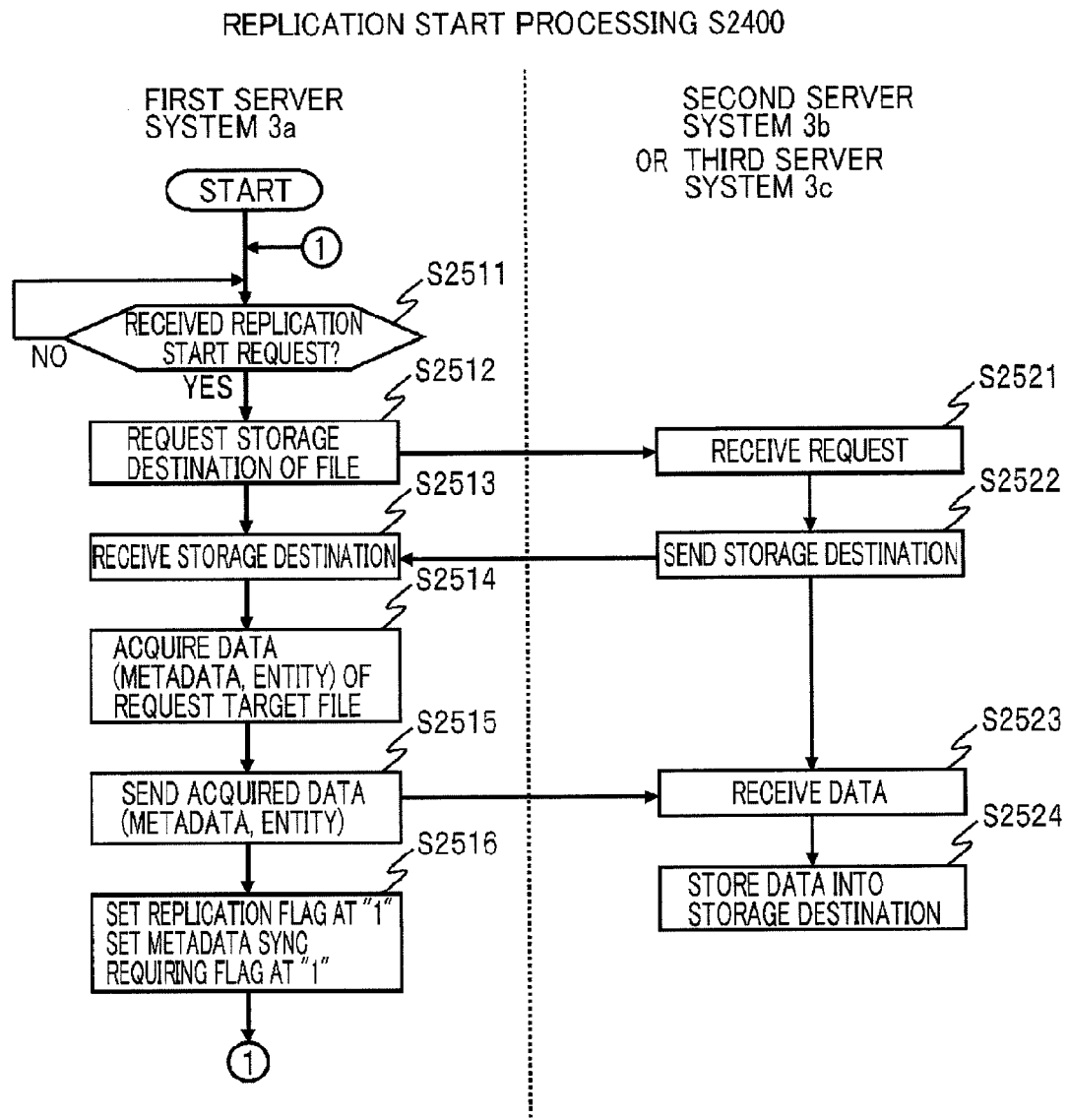
FIG. 25 shows a flowchart explaining replication start processing S2400.

FIG. 24 is a diagram showing processing (hereinafter, referred to as "replication start processing S2400") performed in the information system 1 in the case where the first server system 3a receives a request (hereinafter, referred to as "replication start request") to start replication (copying) of the file stored in the first storage apparatus 10a. FIG. 25 shows a flowchart to explain the details of the replication start processing S2400 in FIG. 24. Description is provided with reference to FIGS. 24 and 25.

Upon receiving the replication start request from the client device 2, the first server system 3a starts to manage the file specified as a target by the request according to the replication-based management method. Other than the reception of the replication start request from the client device 2 via the first communication network 5, the first server system 3a also receives, for example, a replication start request internally generated in the first server system 3a.

The replication-based management method is a method of managing the file data (metadata or entity) both in the first storage apparatus 10a and the second storage apparatus 10b (or the third storage apparatus 10c). Under the replication-based management method, when the entity or metadata of a file stored in the first storage apparatus 10a is updated, the metadata or entity of the file in the second storage apparatus 10b side (or the third storage apparatus 10c side), which is managed as the copy (or archive file) of the file, is updated in a synchronous or asynchronous manner. With the replication-based management method, the consistency between the file data (metadata or entity) stored in the first storage apparatus 10a and the file data (metadata or entity) stored as the copy in the second storage apparatus 10b (or the third storage apparatus 10c) is secured (guaranteed) in a synchronous or asynchronous manner.

The metadata of the file (archive file) of the second storage apparatus 10b side (or the third storage apparatus 10c side) may be managed as a file (as a file entity). In this way, the operation using replication-based management method can be implemented even when the file system 312 of the first server system 3a is different in specifications from the file system 342 of the second server system 3b (or the file system 352 of the third server system 3c).

As shown in FIG. 25, the first server system 3a monitors on a real time basis whether a replication start request has been received from the client device 2 (S2511). When the first server system 3a receives a replication start request from the client device 2 (S2411) (S2511: YES), the first server system 3a sends an inquiry to the second server system 3b (or the third server system 3c) for a storage destination (the identifier of a RAID group, the block address and the like) where to store the data (metadata or entity) of the file specified by the received replication start request (S2512).

Upon receiving the above-mentioned inquiry (S2521), the second server system 3a (or the third server system 3c) determines the storage destination where to store the file (the data of the file) by searching free areas of the second storage apparatus 10b (or the third storage apparatus 10c) and sends a notification of the determined storage destination to the first server system 3a (S2522).

Upon receiving the notification (S2513), the first server system 3b reads the data (metadata and entity) of the file specified by the received replication start request from the first storage apparatus 10a (S2412) (S2514) and sends the read data of the file and the storage destination notified in the S2522 together to the second server system 3b (or the third server system 3c) (S2413) (S2515).

In addition, the first server system 3a sets "1" both in the replication flag 2314 and the metadata sync requiring flag 2312 of the metadata of the file (the metadata of the file stored in the first storage apparatus 10a) (S2414) (S2516).

By setting "1" in the metadata sync requiring flag 2312, the consistency between the metadata of the file stored in the first storage apparatus 10a and the metadata of the file stored as a copy thereof in the second storage apparatus 10b is secured (guaranteed) in the synchronous or asynchronous manner by the synchronization processing S3400 described later.

Meanwhile, upon receiving the data of the file from the first server system 3a (S2523), the second server system 3b (or the third server system 3c) stores the received data of the file in the storage area in the second storage apparatus 10b (or the third server system 3c) specified by the storage location that is received together with the file (S2524).

<Replication File Reference Processing>

Figure 26:
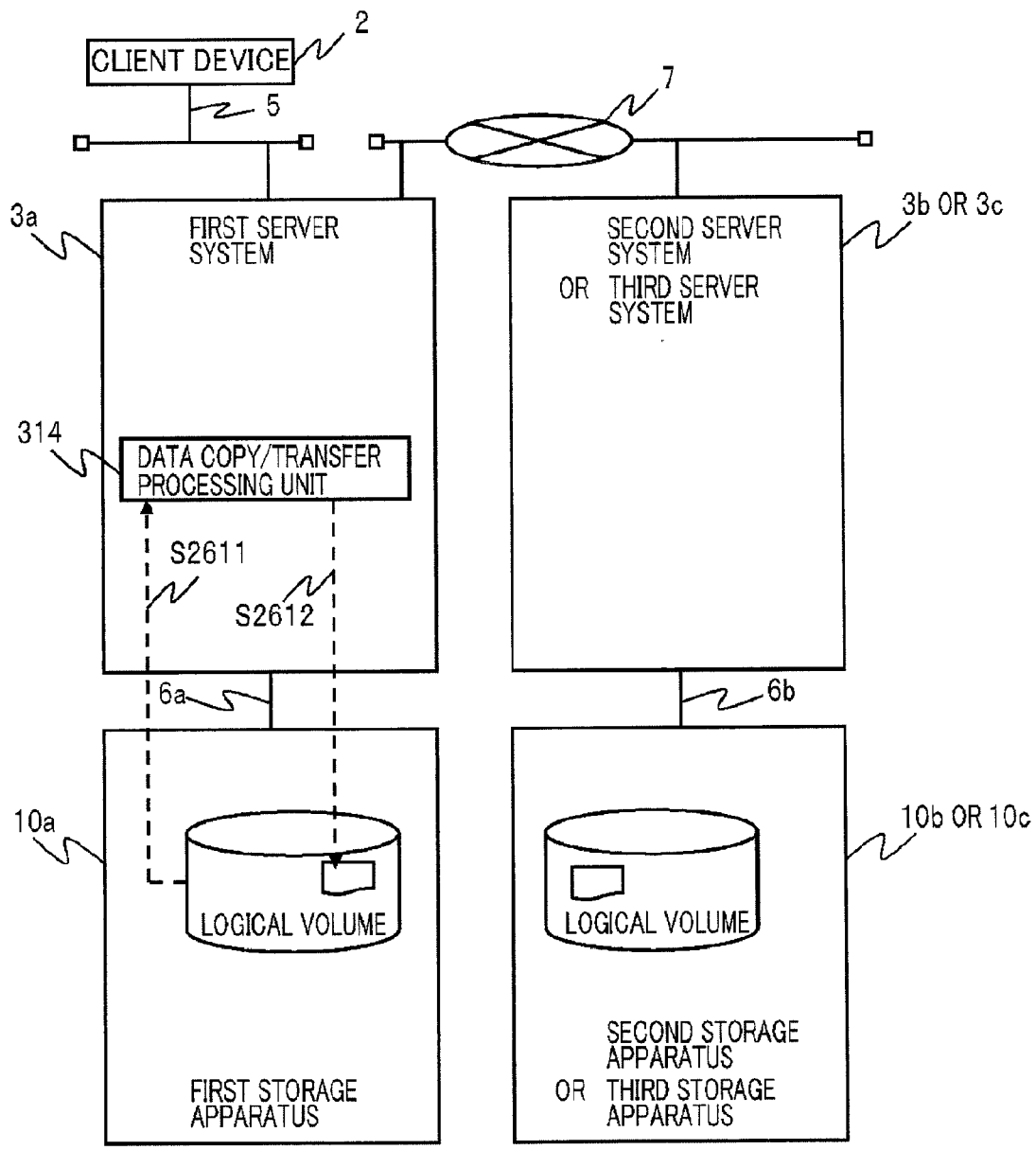
FIG. 26 is a diagram explaining stub candidate selection processing S2600.
Figure 27:
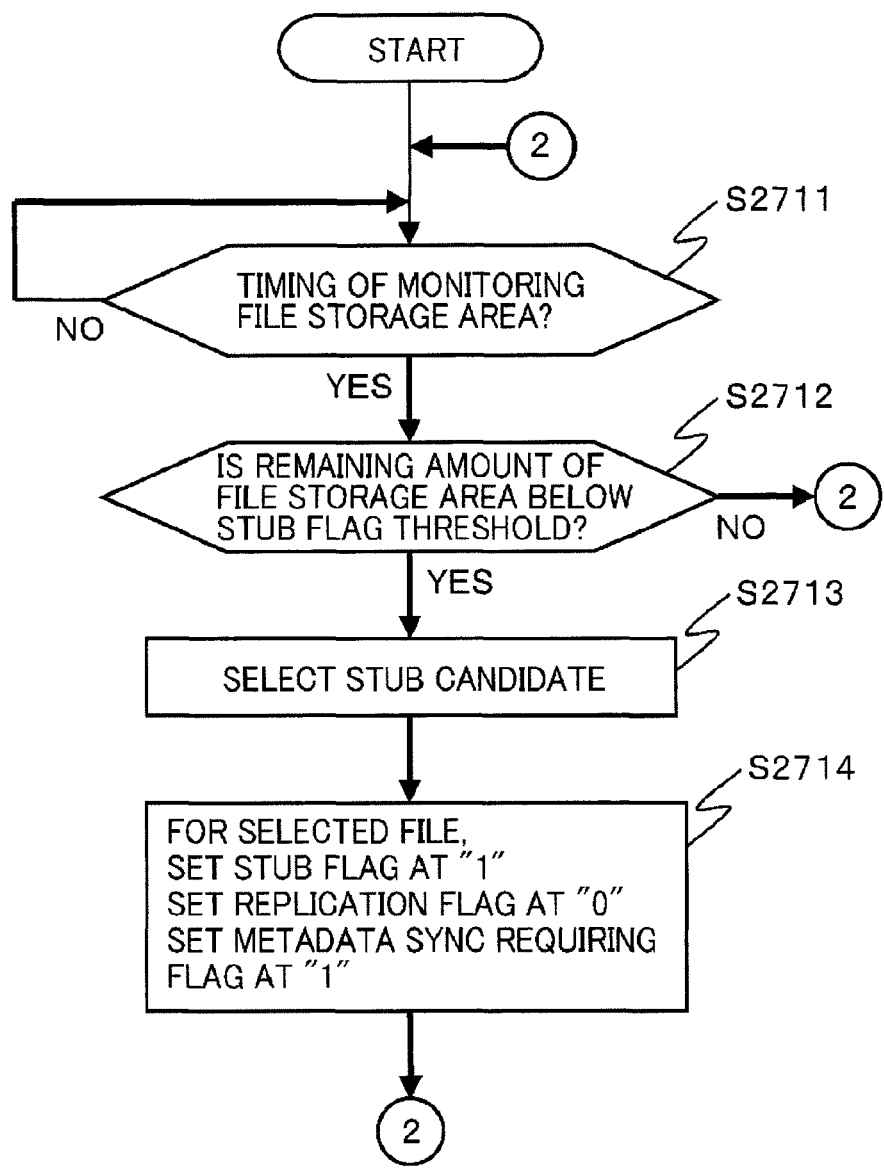
FIG. 27 shows a flowchart explaining stub candidate selection processing S2600.

FIG. 26 is a diagram showing processing performed by the information system 1 in the case where the file system 312 of the first server system 3a receives from the client device 2 a reference request for a replication file stored in the file storage area of the first storage apparatus 10a (hereinafter, referred to as "replication file reference processing S2600"). FIG. 27 shows a flowchart of details of the replication file reference processing S2600. The replication file reference processing S2600 is described below with reference FIGS. 26 and 27.

The first server system 3a monitors on a real time basis whether a reference request for a replication file has been received from the client device 2 or not (S2611). Upon receiving a reference request of a replication file (S2611) (S2711: YES), the file system 312 of the first server system 3a reads the data (metadata or entity) of the replication file from the first storage apparatus 10a (S2612) (S2712), generates information as a response to the client device 2 on the basis of the read data, and sends the generated response information to the client device 2 (S2613) (S2713).

<Replication File Update Processing>

Figure 28:
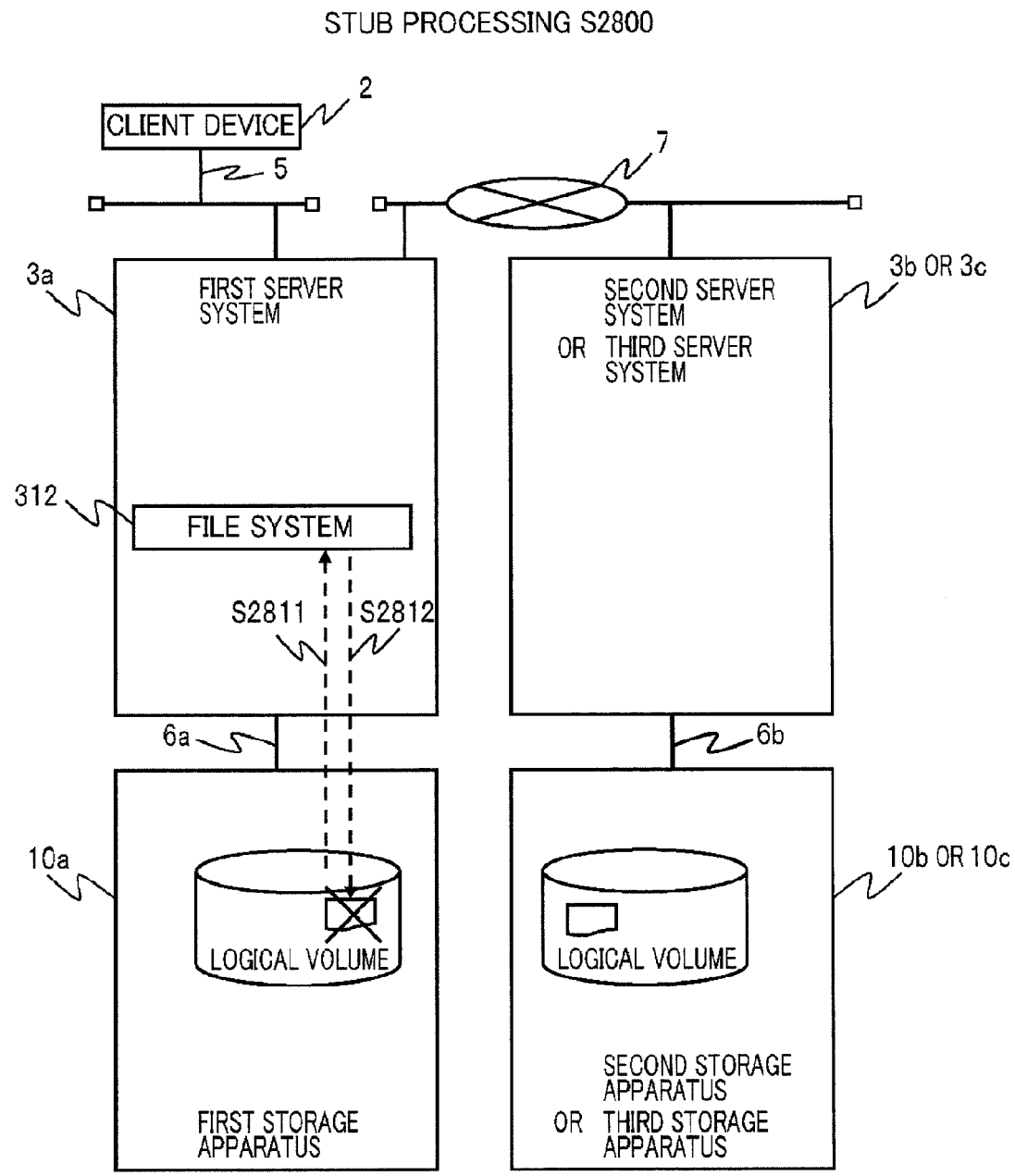
FIG. 28 is a diagram explaining stub processing S2800.
Figure 29:
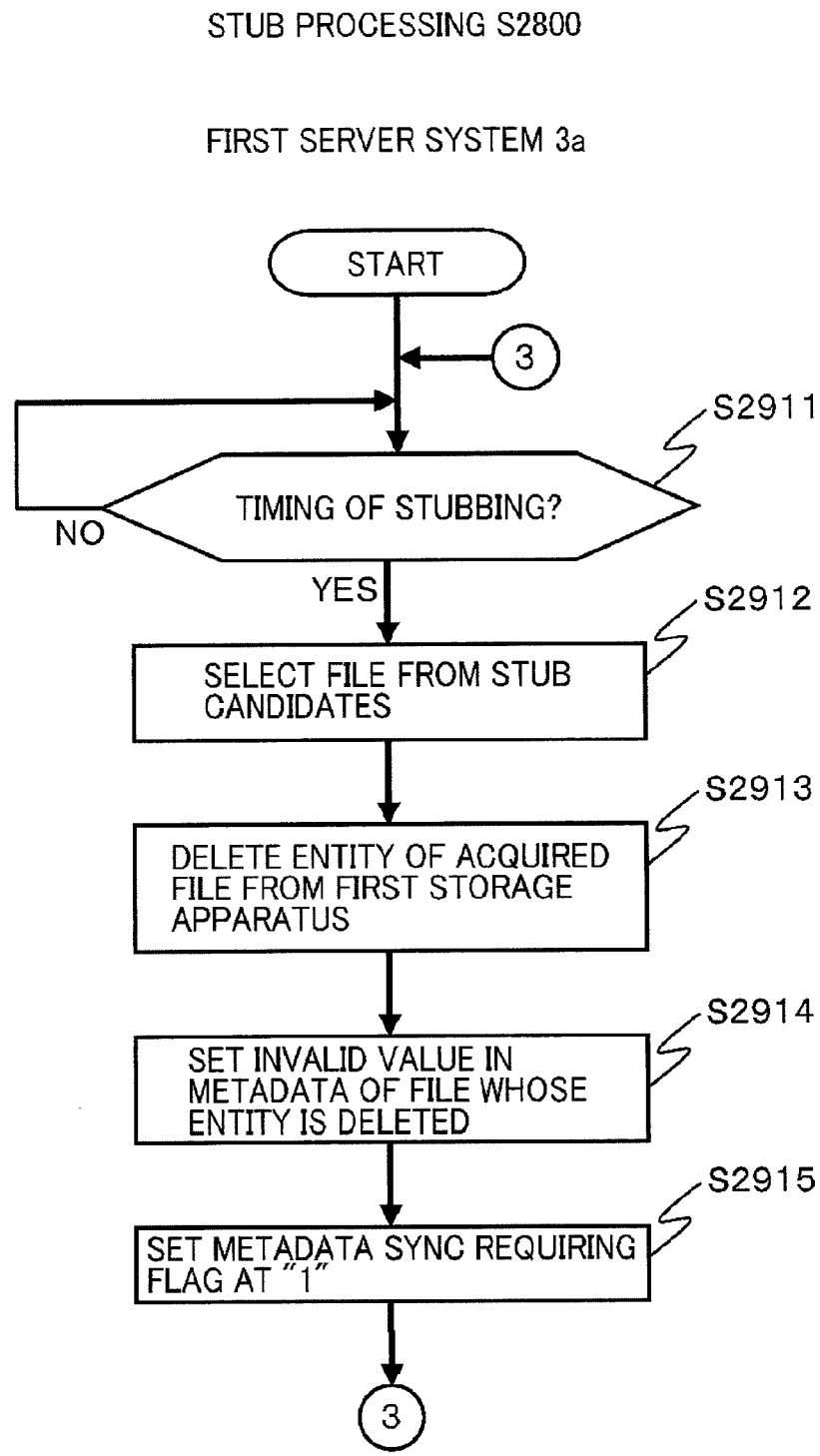
FIG. 29 shows a flowchart explaining stub processing S2800.

FIG. 28 shows processing performed by the information system 1 in the case where an update request for a replication file stored in the file storage area of the first storage apparatus 10a is received from the client device 2 (hereinafter, referred to as "replication file update processing S2800"). FIG. 29 shows a flowchart of details of the replication file update processing S2800. The replication file update processing S2800 is described below with reference to FIGS. 28 and 29.

The first server system 3a monitors on a real time basis whether an update request for a replication file is received from the client device 2 (S2811). When the first server system 3a receives an update request for a replication file (S2811) (S2911: YES), the first server system 3a updates the data (metadata, entity) of the replication file, stored in the first storage apparatus 10a, specified by the received update request, in accordance with the received update request (S2812) (S2912).

Then, the first server system 3a sets "1" in the metadata sync requiring flag 2312 of the replication file when the metadata is updated, and sets "1" in the entity sync requiring flag 2313 of the replication file when the entity of the replication file is updated (S2813) (S2913, S2914).

<Stub Candidate Selection Process>

Figure 30:
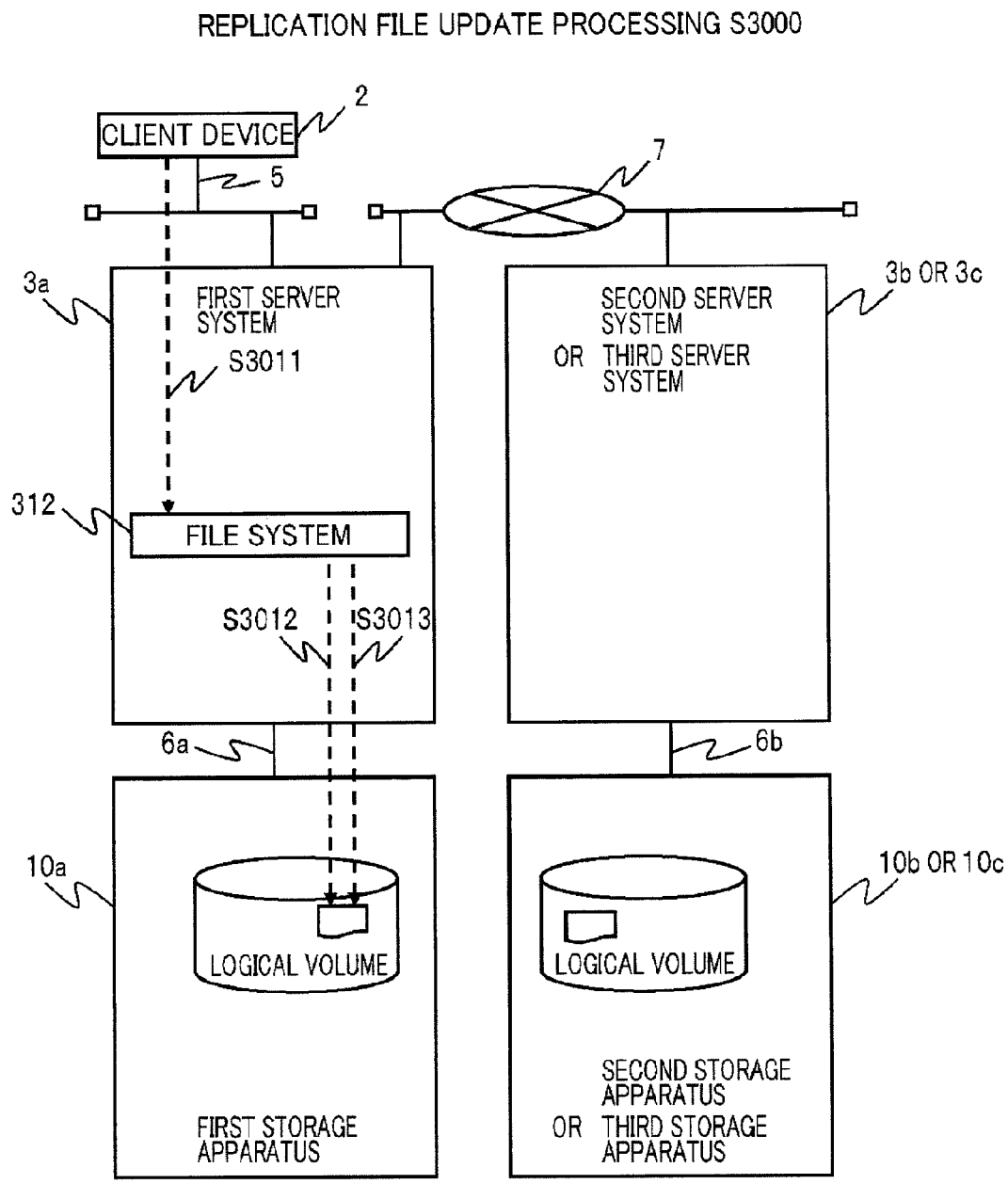
FIG. 30 is a diagram explaining replication file update processing S3000.
Figure 31:
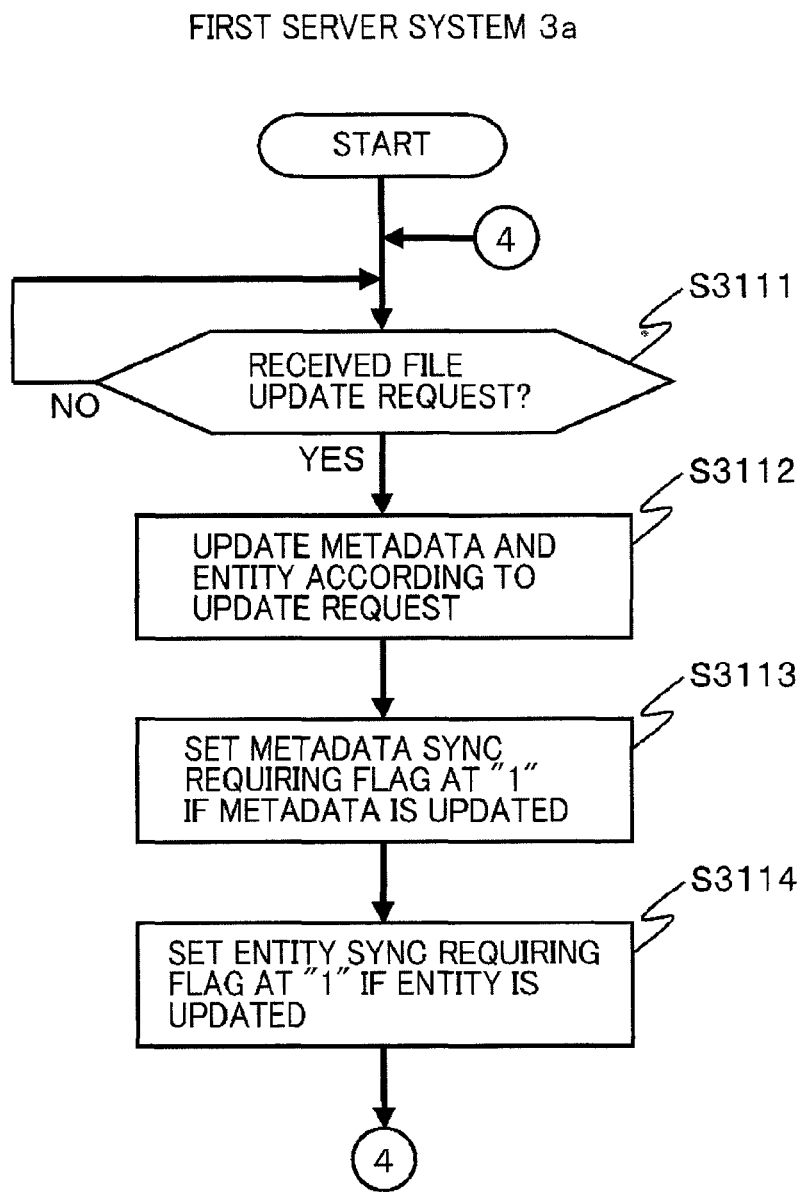
FIG. 31 shows a flowchart explaining replication file update processing S3000.

FIG. 30 is a diagram showing processing performed by the information system 1 in order to set, as candidates for the aforementioned stubbing, files managed with the replication-based management method (file having the replication flag 2314 set at "1", hereinafter, referred to as "replication file"), among the files stored in the first storage apparatus 10a, (hereinafter, referred to as "stub candidate selection processing S3000"). FIG. 31 shows a flowchart of details of the stub candidate selection processing S3000. The following is described with reference to FIGS. 30 and 31.

As shown in FIG. 30, the first server system 3a monitors the remaining capacity of the storage areas in the first storage apparatus 10a allocated to the file system 312 as the storage area (hereinafter, referred to as "file storage area") of a file, whenever necessary (real time, regular intervals, predetermined timings, etc.) (S3011). Note that, the first server system 3a acquires the remaining capacity of the file storage area from, for example, information managed by the file system 312. When the remaining capacity of the storage areas falls below a predetermined stub threshold 3311 (S3112:YES), the first server system 3a selects candidates for stubbing from the replication files stored in the first storage apparatus 10a on the basis of a predetermined selection criterion (S3011) (S3113). The predetermined selection criterion (predetermined conditions) may be, for example, the chronological order of the latest update date/time or the ascending order of access frequency (e.g., the access frequency acquired from the file access log 332).

After the selection of the candidates for stubbing, the first server system 3a sets each of the selected replication files to have "1" in the stub candidate flag 2310, "0" in the replication flag 2314, and "1" in the metadata sync requiring flag 2312 (S3012) (S3114).

<Stubbing Processing>

Figure 32:
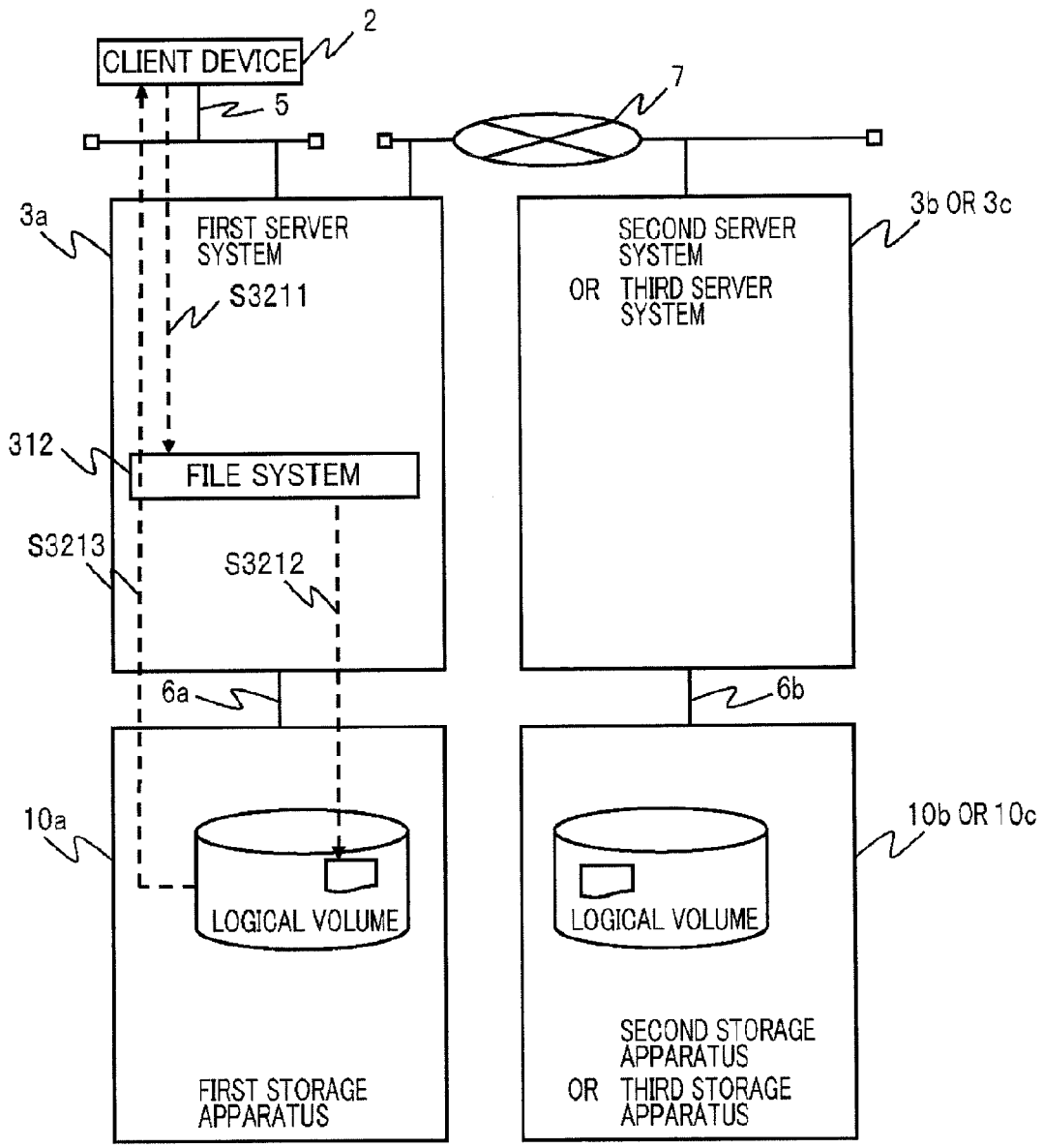
FIG. 32 is a diagram explaining replication file reference processing S3200.
Figure 33:
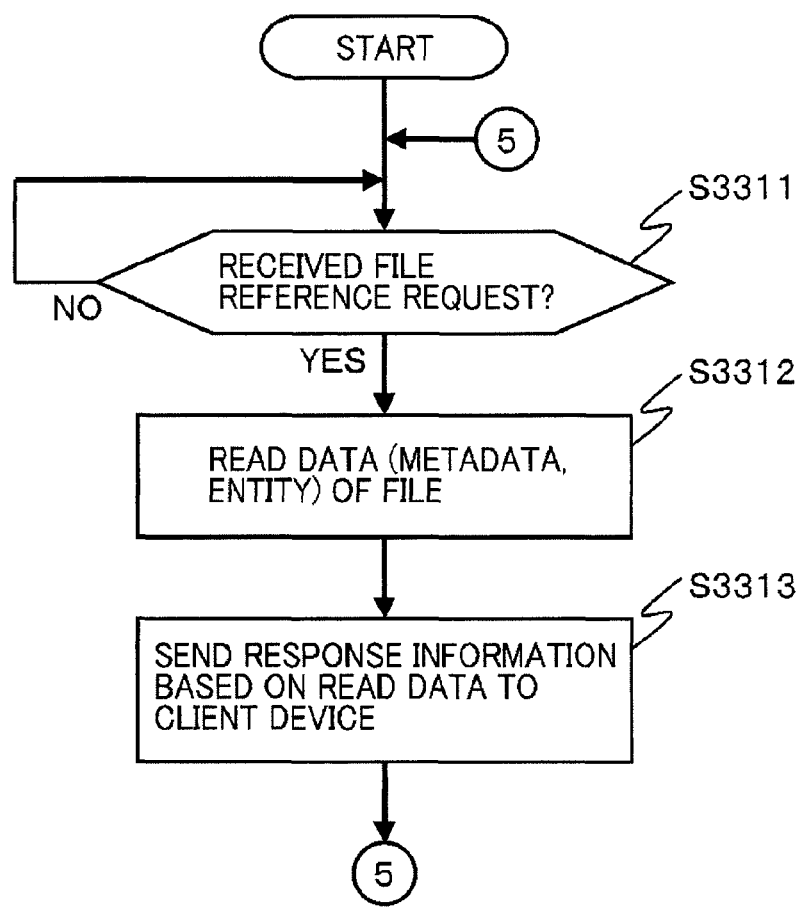
FIG. 33 shows a flowchart explaining replication file reference processing S3200.

FIG. 32 is a diagram showing processing performed by the information system 1 when actually stubbing the files selected as the stub candidates in the stub candidate selection processing S3000 (hereinafter, referred to as "stub processing S2800") (first migration). FIG. 33 shows a flowchart of details of the stub processing S3200. The stub processing S3200 is, for example, performed at predetermined timings (for example, subsequent to the stub candidate selection processing S3000). However, the start timing of the stub processing S3200 is not limited to the above. The stub processing S3200 is described below with reference to FIGS. 32 and 33.

The first server system 3a extracts one or more files that are selected as stub candidates (files having the stub candidate flag 2310 set at "1"), among the files stored in the file storage area of the first storage apparatus 10a (S3211) (S3311, S3312).

Then the first server system 3a deletes the entities of the extracted files from the first storage apparatus 10a (S3313), and sets an invalid value in the information, in the metadata of the extracted file, indicating the storage destination where the file used to be stored in the first storage apparatus 10a (for example, NULL or zero is set in the field of the metadata for setting the storage destination (e.g., the setting field of the data block address 2218) (S3314)). Then, the first server system 3a actually stubs the files selected as the stub candidates (S3212). At the same time, the first server system 3a sets "0" in the stub candidate flag 2310 and "1" in the stub flag 2311 (S3315).

<Synchronization Processing>

Figure 34:
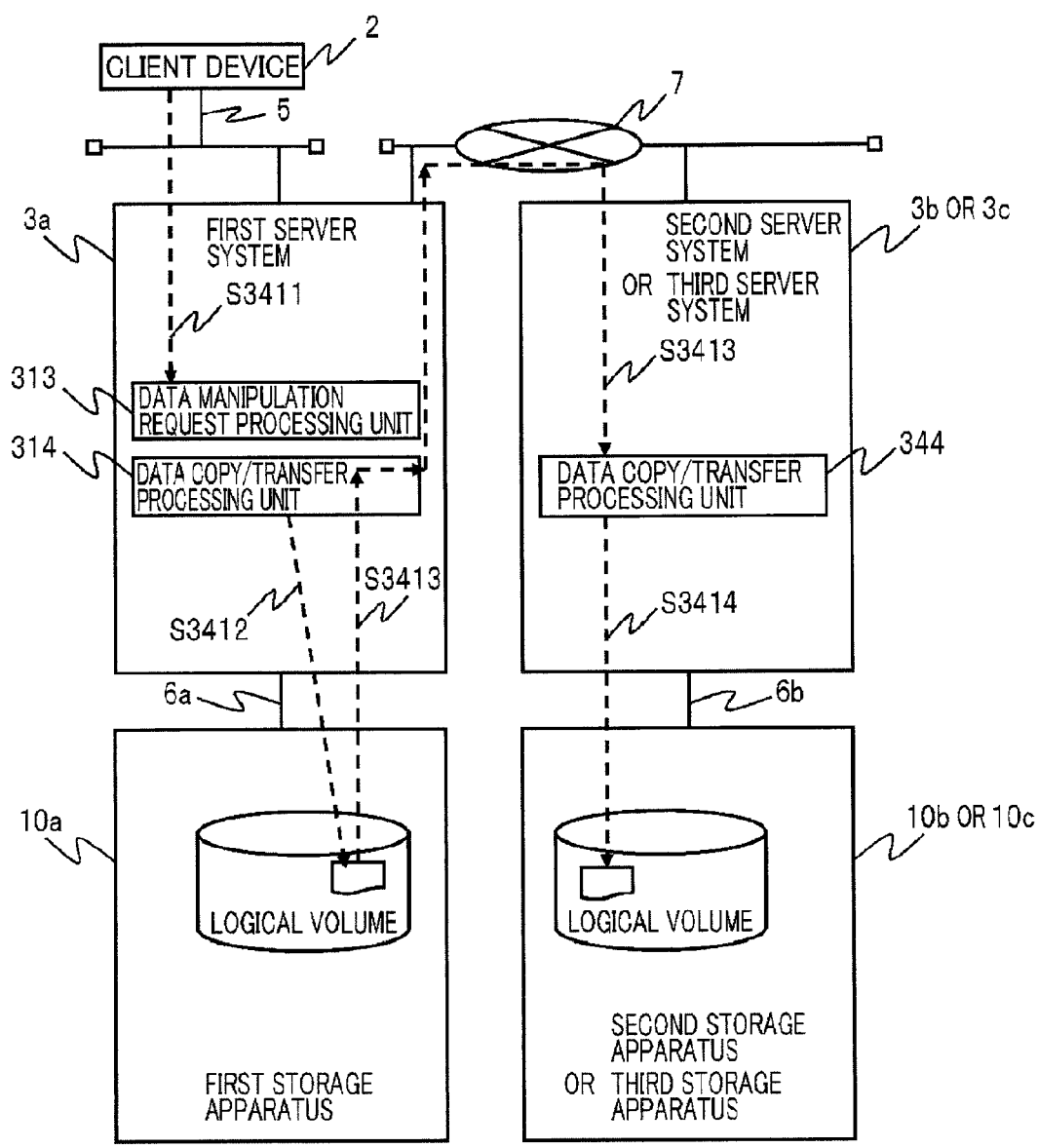
FIG. 34 is a diagram explaining synchronization processing S3400.
Figure 35:
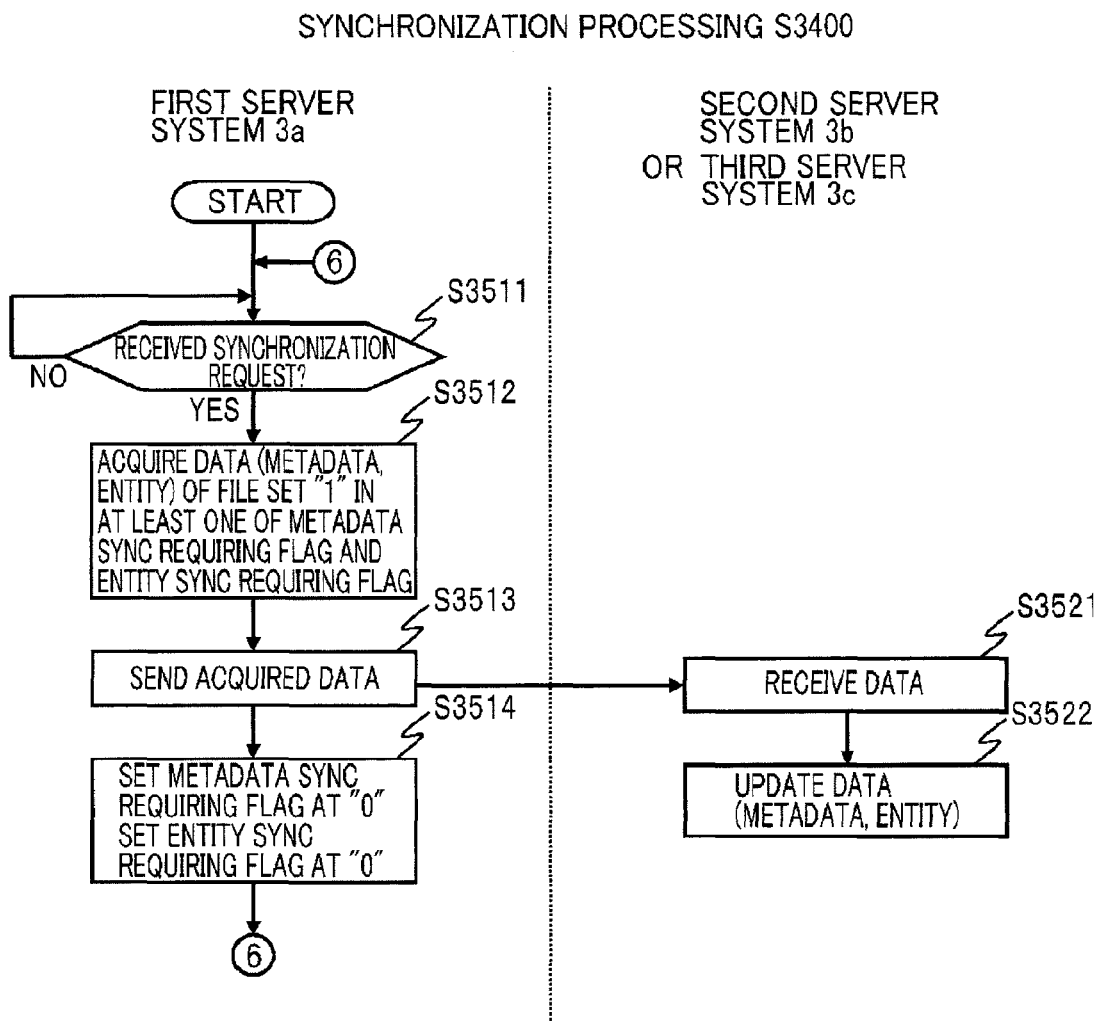
FIG. 35 shows a flowchart explaining synchronization processing S3400.

FIG. 34 is a diagram showing processing performed by the information system 1 in the case where the first server system 3a receives from the client device 2 a request (hereinafter, referred to as "synchronization request") to match the content of the replication file stored in the first storage apparatus 10a and the content of the second storage apparatus 10b side (or the third storage apparatus 10c side) with each other (hereinafter, referred to as "synchronization processing S3400"). FIG. 35 shows a flowchart of details of the synchronization processing S3400. The synchronization processing S3400 is described below with reference to FIGS. 34 and 35.

The synchronization processing S3400 may be started at any timing other than the timing of a reception of a synchronization request from the client device 2. For example, the synchronization processing S3400 may be started by the first server system 3a on its own initiative upon arrival of at predetermined timing (on a real time basis, on a regular interval basis, or the like).

The first server system 3a monitors on a real time basis whether a synchronization request for replication file has been received from the client device 2 or not (S3511). When the first server system 3a receives a synchronization request for replication file from the client device 2 (S3411) (S3511: YES), the first server system 3a acquires files that has at least one of the metadata sync requiring flag 2312 or the entity sync requiring flag 2313 set at "1," from among the replication files stored in the file storage area of the first storage apparatus 10a (S3412) (S3512).

The first server system 3a sends the metadata or entity of the acquired file to the second server system 3b (or the third server system 3c) (S3513) and sets "0" in the metadata sync requiring flag 2312 or the entity sync requiring flag 2313 (S3413) (S3514).

Upon receiving the metadata or entity (S3413) (S3521), the second server system 3b (or the third server system 3c) updates the metadata or the entity of the file stored in the second storage apparatus 10b (or the third storage apparatus 10c) corresponding to the received metadata or the entity, on the basis of the received metadata or entity (S3414) (S3522). The entire metadata or entity may not be necessarily sent from the first server system 3a to the second server system 3b (or the third server system 3c), and only the differential data from the last synchronization may be sent.

Through the execution of the synchronization processing S3400 described above, the data (metadata or entity) of the file stored in the first storage apparatus 10a is synchronized with the data (metadata or entity) of the file stored in the second storage apparatus 10*b* (or the third storage apparatus 10*c*).

<Meta Data Access Processing>

Figure 36:
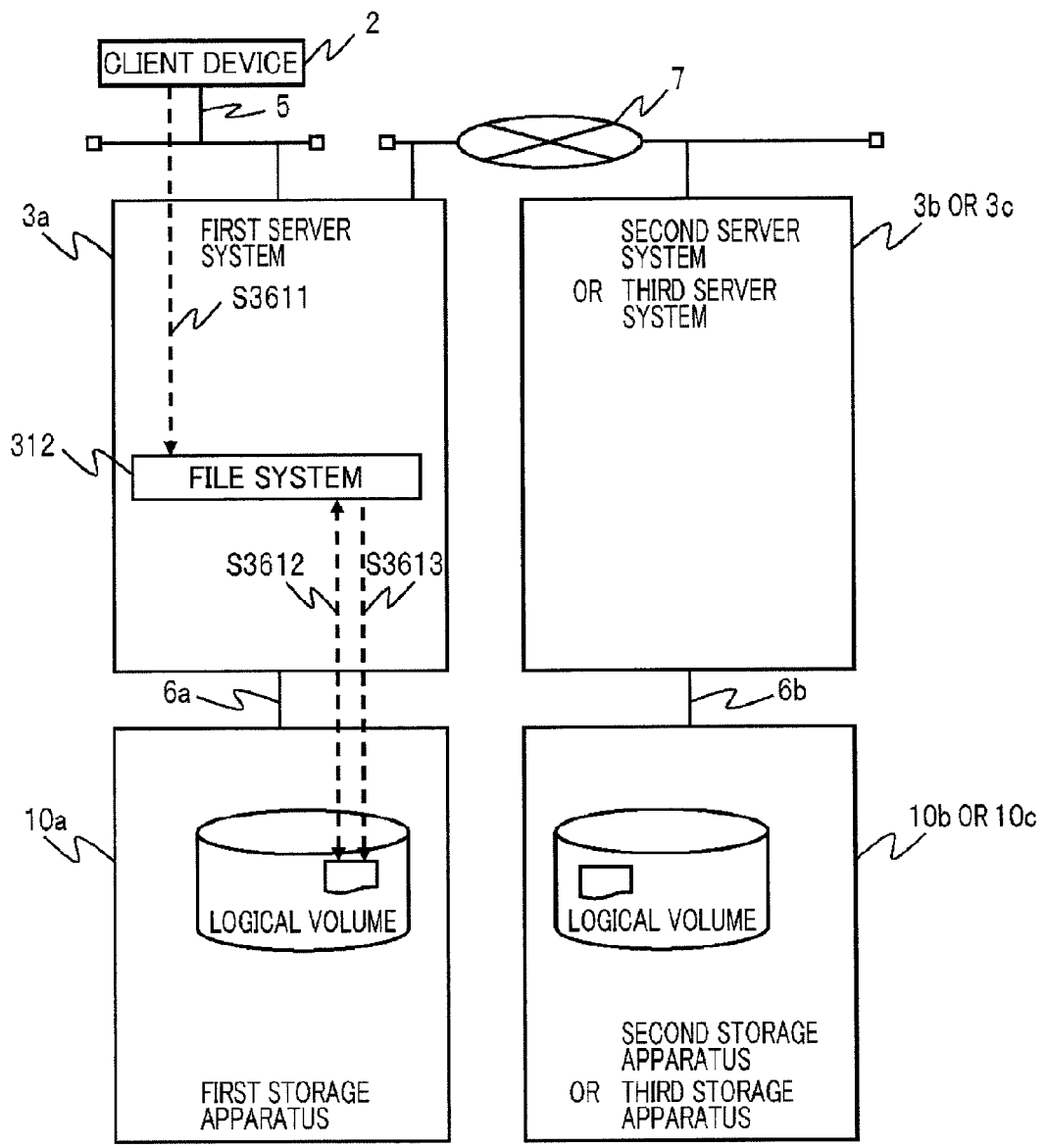
FIG. 36 is a diagram explaining metadata access processing S3600.
Figure 37:
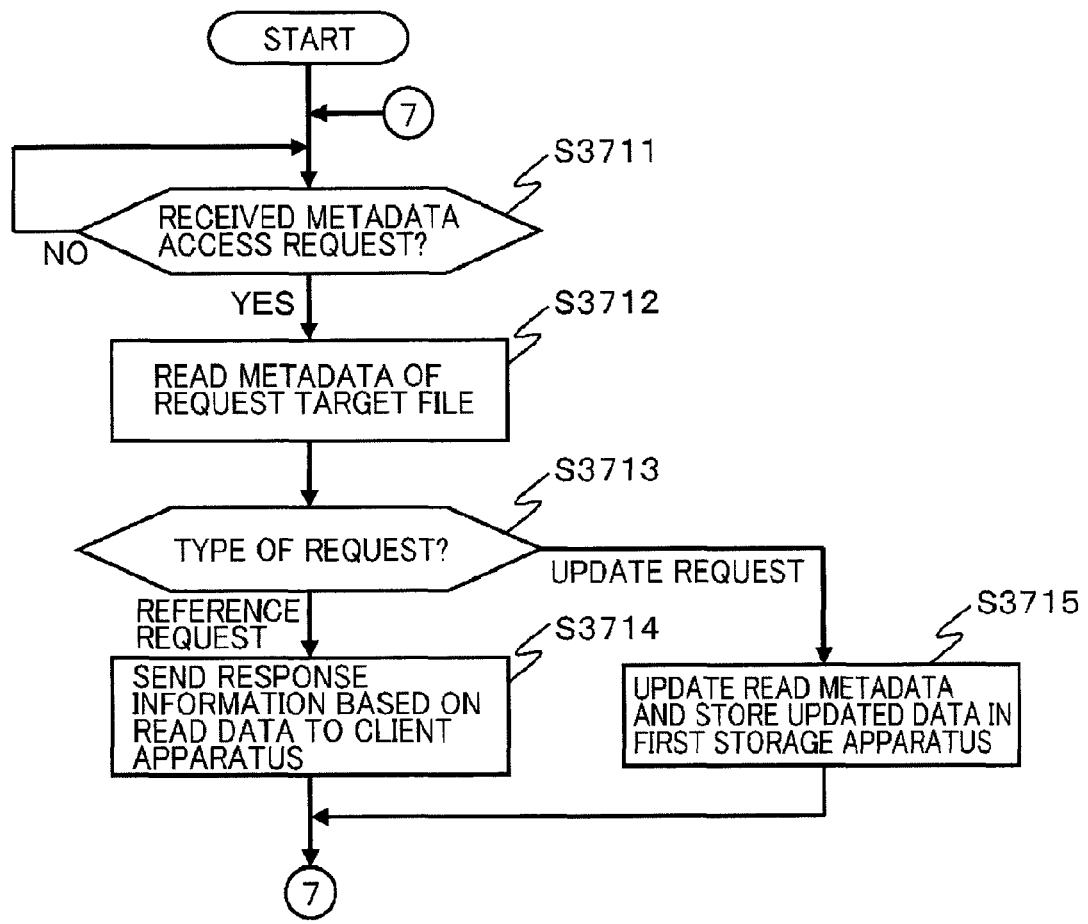
FIG. 37 shows a flowchart explaining metadata access processing S3600.

FIG. 36 is a diagram showing processing performed by the information system 1 in the case where the file system 312 of the first server system 3*a* receives an access request (reference request or update request) to the metadata of a stubbed file (a file having the stub flag 2311 set at "1") from the client device 2 or the like (hereinafter, referred to as "metadata access processing S3600"). FIG. 37 shows a flowchart of details of the metadata access processing S3600. The metadata access processing S3600 is described below with reference to FIGS. 36 and 37.

The first server system 3*a* monitors on a real time basis whether an access request (reference request or update request) to the metadata of a stubbed file has been received from the client device 2 (S3711). Upon receiving an access request to the metadata of a stubbed file (S3611) (S3711: YES), the first server system 3*a* acquires the metadata targeted by the received access request (S3712). According to the received access request (S3713), the first server system 3*a* refers to the metadata (sends the client device 2 response information formed based on the read metadata) (S3714) or updates the metadata (S3612) (S3715). If the content of the metadata is updated (S3715), the first server system 3*a* sets "1" in the metadata sync requiring flag 2312 of the file (S3613).

As described, when an access request to a stubbed file is issued targeting only the metadata of the file, the first server system 3*a* handles the access request using the metadata stored in the first storage apparatus 10*a*. In this way, a response can be quickly made to the client device 2 in the case where the access request targets only the metadata of the file.

<Stub File Entity Reference Processing>

Figure 38:
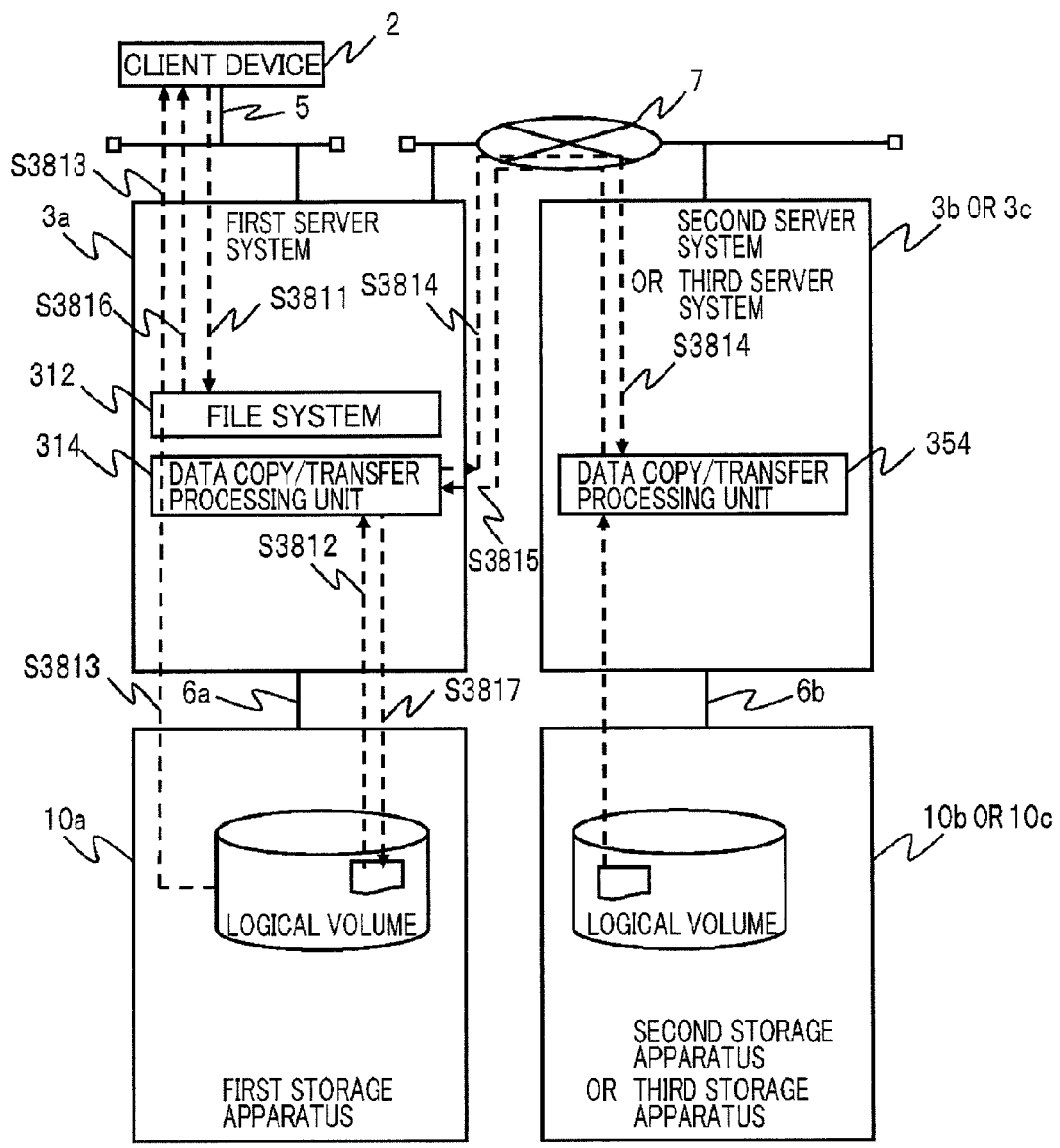
FIG. 38 is a diagram explaining stub file entity reference processing S3800
Figure 39:
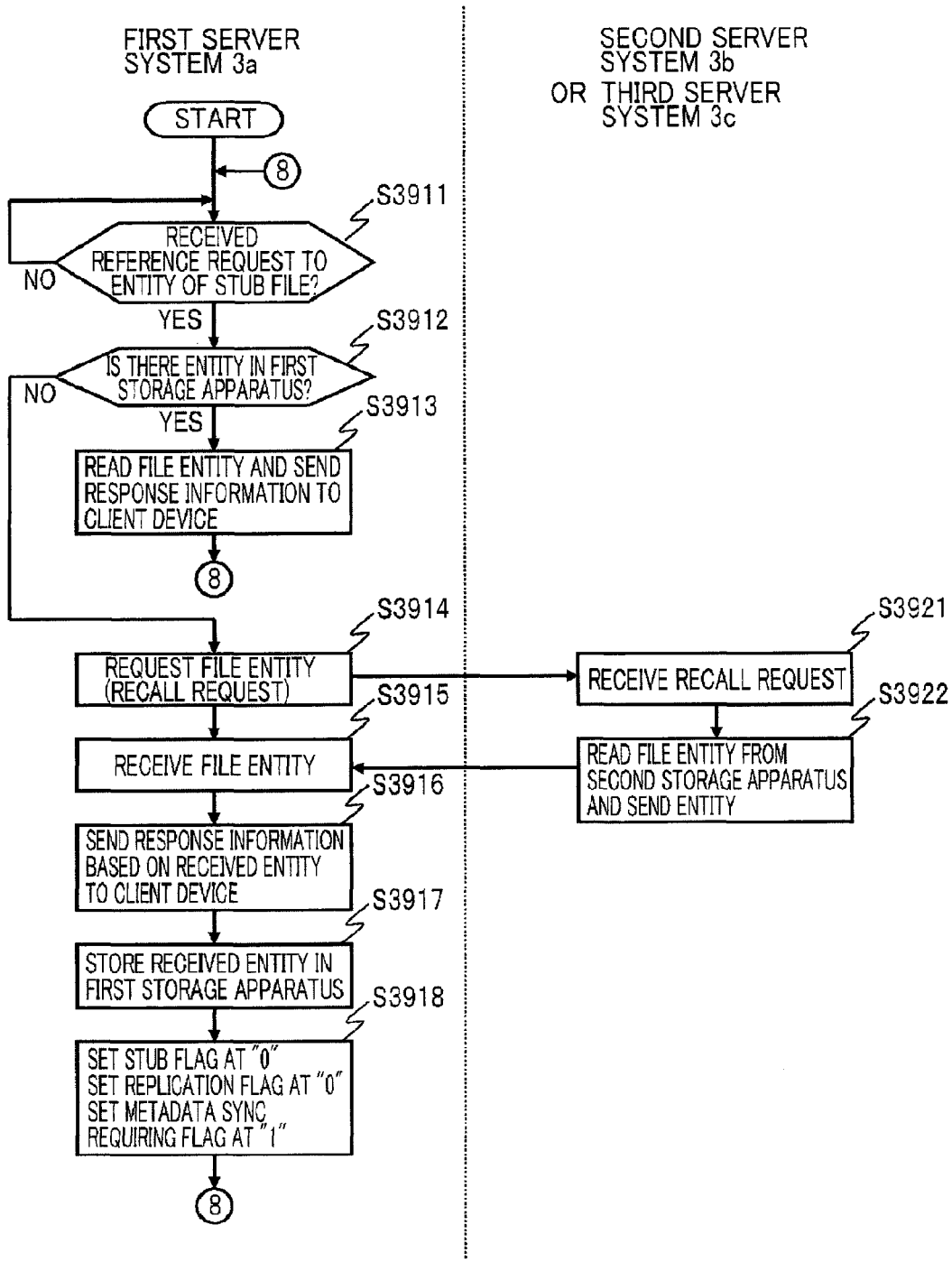
FIG. 39 shows a flowchart explaining stub file entity reference processing S3800.

FIG. 38 is a diagram showing processing (hereinafter, referred to as "stub file entity reference processing S3800") performed by the information system 1 in the case where the first server system 3*a* receives from the client device 2 a reference request to the entity of a stubbed file (a file having the stub flag 2311 set at "1", and hereinafter referred to as "stub file"). FIG. 39 shows a flowchart of details of the stub file entity reference processing S3800. The stub file entity reference processing S3800 is described below with reference to FIGS. 38 and 39.

Upon receiving from the client device 2 a reference request to the entity of a stub file (S3811) (S3911: YES), the first server system 3*a* determines whether the entity of the stub file is stored in the first storage apparatus 10*a* (S3812) (S3912). This determination is made based on, for example, whether or not the acquired metadata is set to have a valid value as information (e.g., the data block address 2218) indicating a storage destination of the entity of the stub file.

If the entity of the stub file is stored in the first storage apparatus 10*a* (S3912: YES), the first server system 3*a* reads the entity of the stub file from the first storage apparatus 10*a*, generates information as a response to the client device 2 on the basis of the read entity, and sends the generated response information to the client device 2 (S3813) (S3913).

On the other hand, when the entity of the stub file is not stored in the first storage apparatus 10*a* (S3912: NO), the first server system 3*a* sends a request for the entity of the stub file (hereinafter, referred to as "recall request") to the second server system 3*b* (or the third server system 3*c*) (S3814) (S3914). As for such acquisition request, a single acquisition request may not necessarily be made to request the entire entity, but multiple acquisition requests each requesting only a part of the entity may be made.

The second server system 3*b* (or the third server system 3*c*) reads the entity of the stub file from the second storage apparatus 10*b* (or the third storage apparatus 10*e*) in response to the acquisition request, and sends the read entity of the stub file to the first server system 3*a* (S3922). Upon receiving the entity of the stub file sent from the second server apparatus 3*b* (or the third server system 3*c*) in response to the acquisition request (S3815) (S3915), the first server system 3*a* generates response information based on the received entity and sends the generated response information to the client device 2 (S3816) (S3916).

In addition, the first server system 3*a* stores the entity received from the second server system 3*b* (or the third server system 3*c*) in the first storage apparatus 10*a*, and sets the metadata of the stub file to have, as information indicating the storage destination (for example, data block address 2218) of the entity of the stub file, contents indicating the storage destination of the file in the first storage apparatus 10*a* (S3917).

The first server system 3*a* sets "0" in the stub flag 2311, "0" in the replication flag 2314, and "1" in the metadata sync requiring flag 2312 of the file (S3817) (S3918).

The reason for setting "1" in the metadata sync requiring flag 2312 is that the values set in the stub flag 2311 and the replication flag 2314 of the stub file are automatically synchronized later between the first storage apparatus 10*a* and the second storage apparatus 10*b* (or the third storage apparatus 10*c*).

<Stub File Entity Update Processing>

Figure 40:
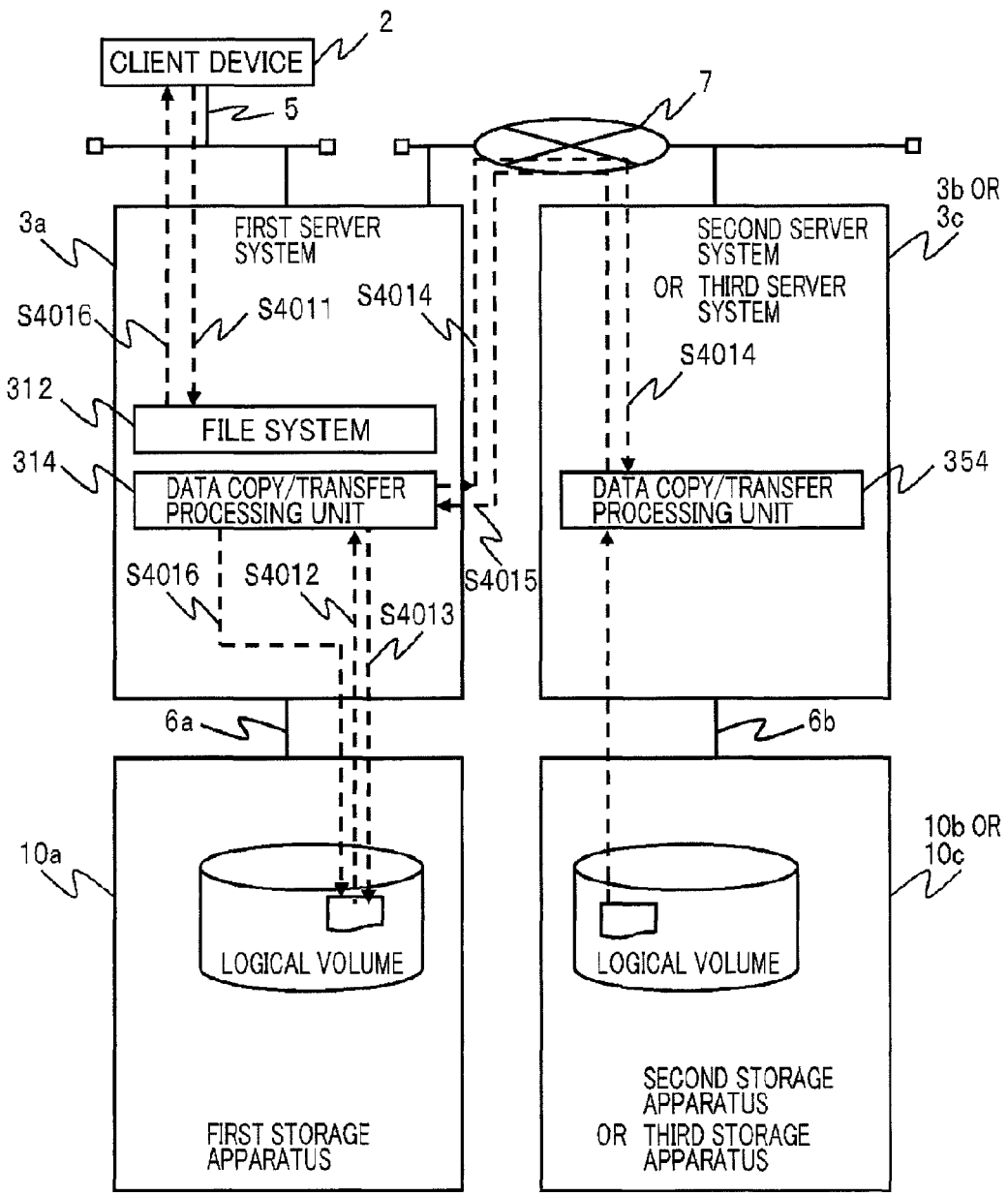
FIG. 40 is a diagram explaining stub file entity update processing S4000.
Figure 41:
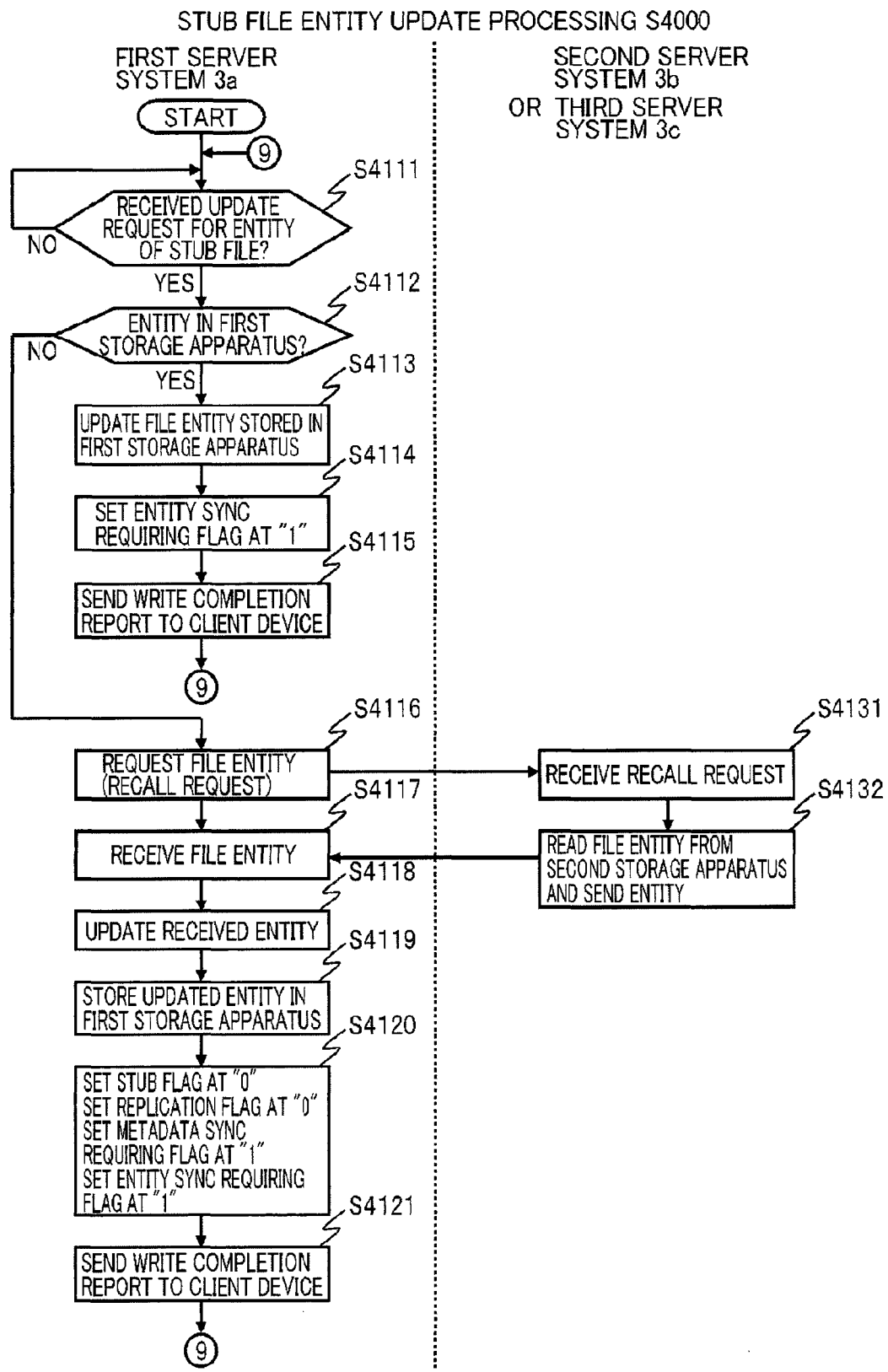
FIG. 41 shows a flowchart explaining stub file entity update processing 54000.

FIG. 40 is a diagram showing processing performed in the information system 1 in the case where the first server system 3*a* receives from the client device 2 an update request for the entity of a stub file (hereinafter, referred to as "stub file entity update processing S4000"). Furthermore, FIG. 41 shows a flowchart of details of the stub file entity update processing S4000. The stub file entity update processing S4000 is described below with reference to FIGS. 40 and 41.

Upon receiving an update request for the entity of a stub file from the client device 2 (S4011) (S4111: YES), the first server system 3*a* determines whether the entity of the stub file is stored in the first storage apparatus 10*a* (S4012) (S4112). The determination method is the same as in the stub file entity reference processing S3800.

When the entity of the stub file is stored in the first storage apparatus 10*a* (S4112: YES), the first server system 3*a* updates the entity of the stub file stored in the first storage apparatus 10*a* in accordance with the contents of the update request (S4113) and sets "1" in the entity sync requiring flag 2313 of the stub file (S4013) (S4114). After updating the entity of the stub file (S4113), the first server system 3*a* sends a notification of the update (write completion report) to the client device 2 (S4115).

On the other hand, if the entity of the stub file is not stored in the first storage apparatus 10*a* as a result of the determination above (S4112: NO), the first server system 3*a* sends an acquisition request (recall request) for the entity of the stub file to the second server system 3*b* (or the third server system 3*c*) (S4014) (S4116).

The second server system 3*b* (or the third server system 3*c*) reads the entity of the stub file from the second storage apparatus 10*b* (or the third storage apparatus 10*c*) in response to the acquisition request, and sends the read entity of the stub file to the first server system 3*a* (S4015) (S4132). Upon receiving the entity of the file sent from the second server system 3*b* (or the third server system 3*c*) in response to the request (S4015) (S4117), the first server system 3*a* updates the content of the received entity in accordance with the content of the update request (S4118), and stores the updated entity in the first storage apparatus 10*a* as the entity of the stub file (S4016) (S4119). After updating the entity of the stub file (S4118), the first server system 3*a* sends a notification of the update (write completion report) to the client device 2 (S4121).

Then, the first server system 3*a* sets "0" in the stub flag 2311, "0" in the replication flag 2314, "1" in the metadata sync requiring flag 2312, and "1" in the entity sync requiring flag 2313 of the stub file (S4119).

=Reallocation of Entity of File=

In the aforementioned information system 1, the storage destination of the entity of each file stored in the storage apparatus 10 (the first storage apparatus 10*a*, the second storage apparatus 10*b*, or the third storage apparatus 10*c*) is changed as needed on the basis of the requirements (the confidentiality requirement, the reliability requirement and the performance requirement) currently set for the file and the current configuration of the information system 1 (hereinafter this processing is referred to as "reallocation").

Reallocation is triggered by, for example, an event where any of the contents of the file management table 333 is changed (not only a change of content of any item in the record, but also an addition or deletion of a record), an event where any of the contents of the storage area management table 334 is changed (not only a change of content of any item in the record, but also an addition or deletion of a record). Additionally, the relocation is triggered upon arrival of pre-scheduled timing, in response to a relocation start instruction issued by a user operating the management device 19, or the like.

For the relocation, the placement destination of the entity of each of files stored in the storage apparatus 10 is determined on the basis of the contents of the file management table 333 and the storage area management table 334, and then the transfer of the entity of the file and the resetting of the inode management table 1912 of the file are performed so that the entity of the file can be stored in the determined placement destination. If free capacity sufficient to store the entity of the file cannot be secured in the determined placement destination, an attempt is made to secure sufficient free capacity in the determined placement destination.

In the information system 1, the reallocation of files is performed when needed on the basis of the requirements (the confidentiality requirement, the reliability requirement and the performance requirement) currently set for the respective files, and the current configuration of the information system 1. Thus, the entities of the files stored in the storage apparatuses 10 can be stored and managed at appropriate locations in accordance with the requirements currently set for the respective files. Moreover, since the placement destination of the entity of each file for reallocation is determined on the basis of the current configuration of the information system 1, the entity of the file can be managed appropriately on the basis of the latest configuration of the information system 1 even when the configuration of the information system 1 is changed.

<Relocation Processing>

Figure 42:
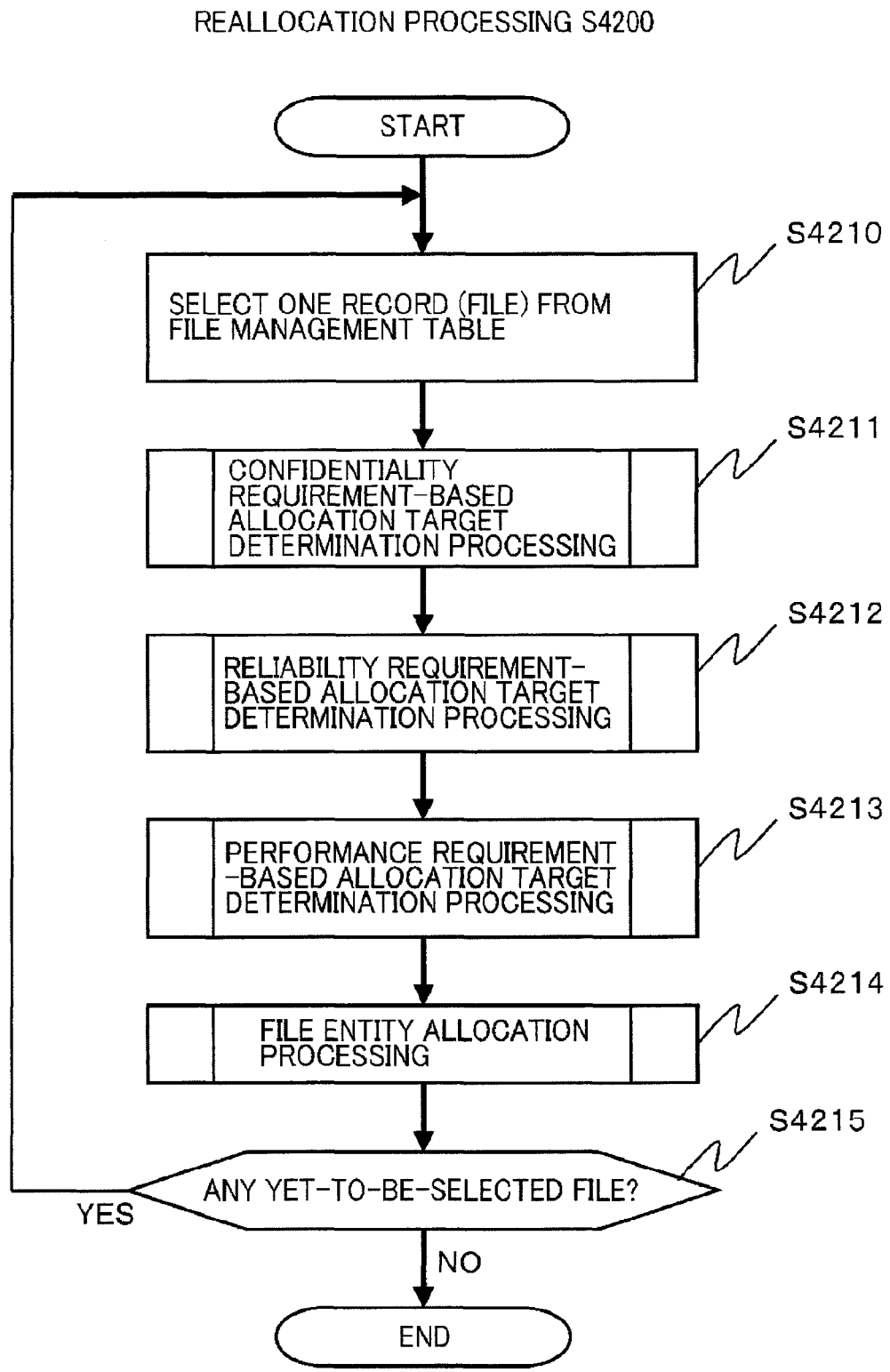
FIG. 42 shows a flowchart explaining reallocation processing S4200.

FIG. 42 shows a flowchart of processing for reallocation, in which the first server system 3*a* determines the placement destination of the entity of each file stored in the storage apparatuses 10, on the basis of the contents of the file management table 333 and the storage area management table 334, and stores the entity of the file in the determined placement destination (hereinafter, referred to as "reallocation processing S4200"). In the following, description is provided with reference to FIG. 42.

As shown in FIG. 42, the first server system 3*a* firstly selects one record (file) from the file management table 333 (S4210).

Then, the first server system 3*a* performs confidentiality requirement-based allocation target determination processing S4211, reliability requirement-based allocation target determination processing S4212, and performance requirement-based allocation target determination processing S4213 in this order for the file selected in S4210 (hereinafter, referred to as "selected file"), and thereby determines the allocation target of the entity of the selected file (the LDEV 172 where the entity of the selected file is to be located).

Subsequently, the first server system 3*a* executes file entity allocation processing S4214, and stores the entity of the selected file in the allocation target determined in processing S4211 to S4213.

The first server system 3*a* determines whether or not there is a record (file) yet to be selected in S4210 (S4215). If there is a record (file) yet to be selected exists in file management table 333 (S4215: YES), the first server system 3*a* returns to S4210, selects the record (file) yet to be selected, and executes processing S4211 to S4214. If there is no record (file) yet to be selected (S4215: NO), the processing is terminated.

Note that only one or two processings may be executed among the confidentiality requirement-based allocation target determination processing S4211, the reliability requirement-based allocation target determination processing S4212, and the performance requirement-based allocation target determination processing S4213. In the case of executing only two processings, the two processings are executed in the order shown in FIG. 42. The allocation target for the entity of the file for the reallocation is determined with higher priority given to the confidentiality requirement over the reliability requirement and the performance requirement. In addition, the allocation target for the entity of the file for the reallocation is determined with higher priority given to the reliability requirement given over the performance requirement.

As described above, the allocation target for the entity of a file for reallocation is determined based on the confidentiality requirement of the file. Thus, for example, the entity of a file requiring high confidentiality can be allocated in a highly confidential storage area (LDEV 172). Thereby, risk of information leakage can be avoided.

Moreover, the allocation target for the entity of a file for reallocation is determined based on the reliability requirement of the file. Thus, for example, the entity of a file requiring high reliability can be allocated in a highly reliable storage area (LDEV 172). Thereby, risk of data loss and the like can be reduced.

Further, the allocation target for the entity of a file for reallocation is determined based on the performance requirement of the file. Thus, for example, the entity of a file requiring high performance (access performance or the like) can be allocated in a storage area (LDEV 172) with high performance. Thereby, the storage apparatuses 10 according the needs of users can be effectively utilized.

In the foregoing way, files can be allocated in storage areas in the storage apparatuses 10 included in the information system 1 effectively and appropriately according to the requirements of the files.

<Confidentiality Requirement-Based Allocation Target Determination Processing>

Figure 43:
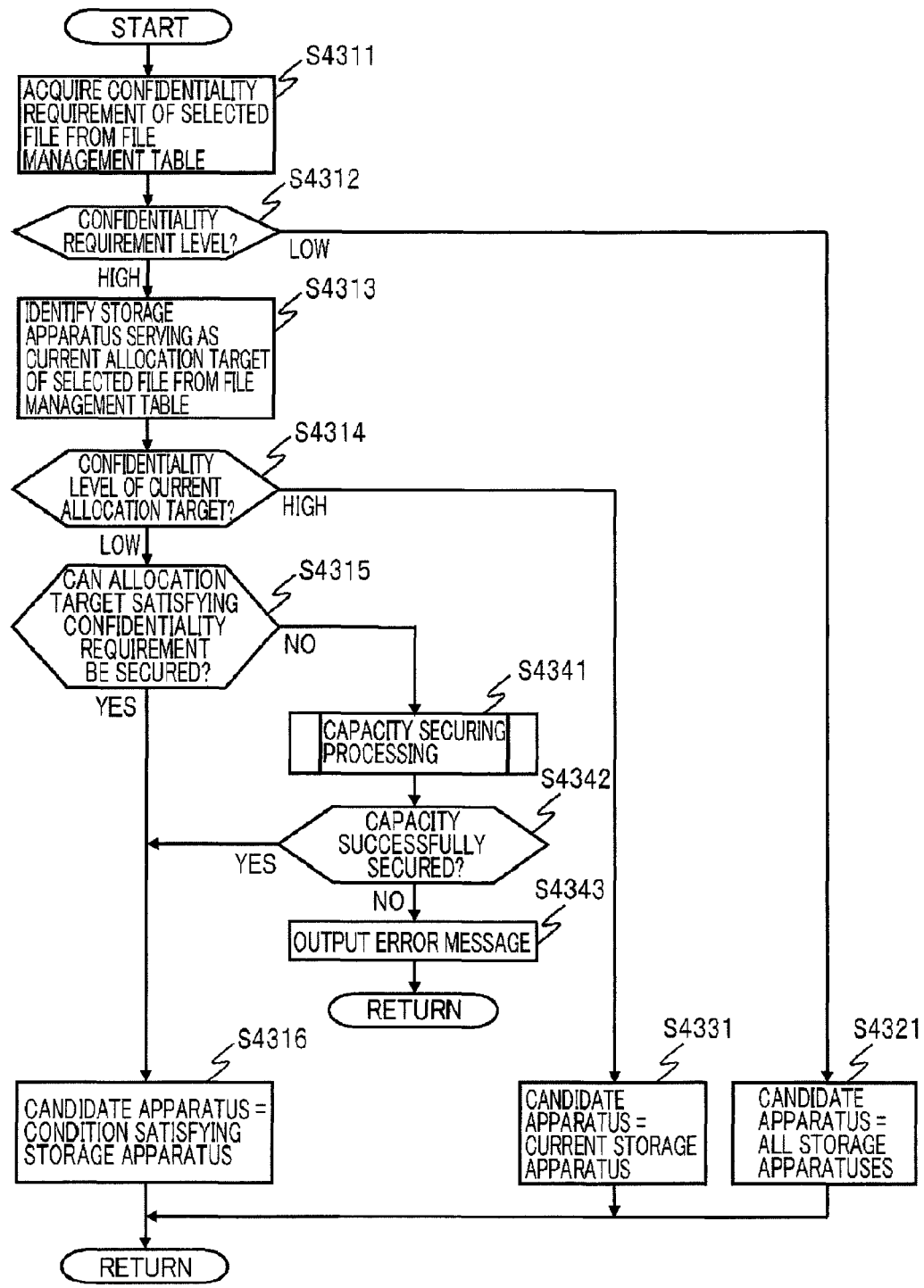
FIG. 43 shows a flowchart explaining details of the confidentiality requirement-based allocation target determination processing S4211.

FIG. 43 shows a flowchart of details of the confidentiality requirement-based allocation target determination processing S4211 in FIG. 42. The confidentiality requirement-based allocation target determination processing S4211 is described below with reference to FIG. 42.

As shown in FIG. 43, the first server system 3a firstly acquires the confidentiality requirement (the content in the confidentiality 1531) set for the selected file from the file management table 333 (S4311), and judges the content (S4312). The processing advances to S4313 if the confidentiality requirement of the selected file is set at "high" (S4312: high), whereas the processing advances to S4321 if the confidentiality requirement of the selected file is set at "low" (S4312: low).

In S4313, the first server system 3a acquires the apparatus ID 1521 of the storage apparatus 10 where the selected file is currently allocated from the file management table 333 (S4313). Then, the first server system 3a acquires the confidentiality of the storage apparatus 10 where the selected file is currently allocated (the content of the confidentiality 162 corresponding to the acquired apparatus ID (apparatus ID 1621)), and judges the content (S4314).

The processing advances to S4315 if the confidentiality of the storage apparatus 10 where the selected file is currently allocated is "low" (S4314: low), whereas the processing advances to S4331 if the confidentiality of the storage apparatus 10 where the selected file is currently allocated is "high" (S4314: high).

In S4315, referring to the storage area management table 334, the first server system 3a determines whether or not the allocation target satisfying the confidentiality requirement set for the selected file can be secured or not. To be more specific, the first server system 3a makes the above determination by checking whether or not the storage apparatuses 10 with "high" confidentiality includes a storage apparatus 10 having free capacity equal to or larger than the file size of the entity of the selected file.

The processing advances to S4316 if the allocation target satisfying the confidentiality requirement can be secured (S4315: YES), whereas the processing advances to S4341 if the allocation target satisfying the confidentiality requirement cannot be secured (S4315: NO).

In S4341, the first server system 3a executes processing for securing a storage area satisfying the confidentiality requirement (hereinafter, referred to as "capacity securing processing S4700"). After the execution of the capacity securing processing S4700, the first server system 3a determines whether or not the allocation target satisfying the confidentiality requirement set for the selected file can be successfully secured (in the same determination manner as in S4315) with reference to the storage area management table 334 (S4342). The processing advances to S4316 if the allocation target is successfully secured (S4342: YES), whereas the processing advances to S4343 if the allocation target fails to be secured (S4342: NO).

In S4343, the first server system 3a outputs an error message to the maintenance device 18 to inform that the selected file fails to be located in the allocation target satisfying the confidentiality requirement of the file. Then, the processing advances to S4215 in the reallocation processing S4200. Here, the maintenance device 18 provides the information of this error message to the management device 19 whenever necessary. In this way, the user can know through the management device 19 that the selected file fails to be located in the allocation target satisfying the confidentiality requirement of the file.

In S4316, the first server system 3a sets, in a processing variable "candidate apparatus," the apparatus ID of the storage apparatus 10 determined as an area where the selected file is allocatable in S4315 or S4342. Here, the processing variable "candidate apparatus" has set therein information specifying the storage apparatus 10 as a candidate for the allocation target (hereinafter, referred to as "candidate apparatus"). If there are two or more storage apparatuses 10 each determined as an area where the selected file is allocatable, the apparatus IDs of all the storage apparatuses 10 are set in the processing variable "candidate apparatus." Thereafter, the processing advances to S4212 in reallocation processing S4200.

In S4331, the first server system 3a sets, in the processing variable "candidate apparatus," the apparatus ID of the storage apparatus 10 where the selected file is currently allocated. Thereafter, the processing advances to S4212 in reallocation processing S4200.

In S4321, the first server system 3a sets "all the storage apparatuses" in the processing variable "candidate apparatus." Thereafter, the processing advances to S4212 in reallocation processing S4200.

As described above, if the confidentiality requirement of the selected file is low, the first server system 3a sets all the storage apparatuses 10 in the information system 1 as the candidate apparatuses. If the selected file has high confidentiality requirement and is already allocated in the storage apparatus 10 satisfying the confidentiality requirement of the selected file, the first server system 3a sets in the candidate apparatus the storage apparatus 10 where the selected file is currently allocated. If the selected file has high confidentiality requirement and is allocated in the storage apparatus 10 not satisfying the confidentiality requirement of the selected file, the first server system 3a sets in the candidate apparatus the storage apparatus 10 satisfying the confidentiality requirement of the selected file.

<Reliability Requirement-Based Allocation Target Determination Processing>

Figure 44:
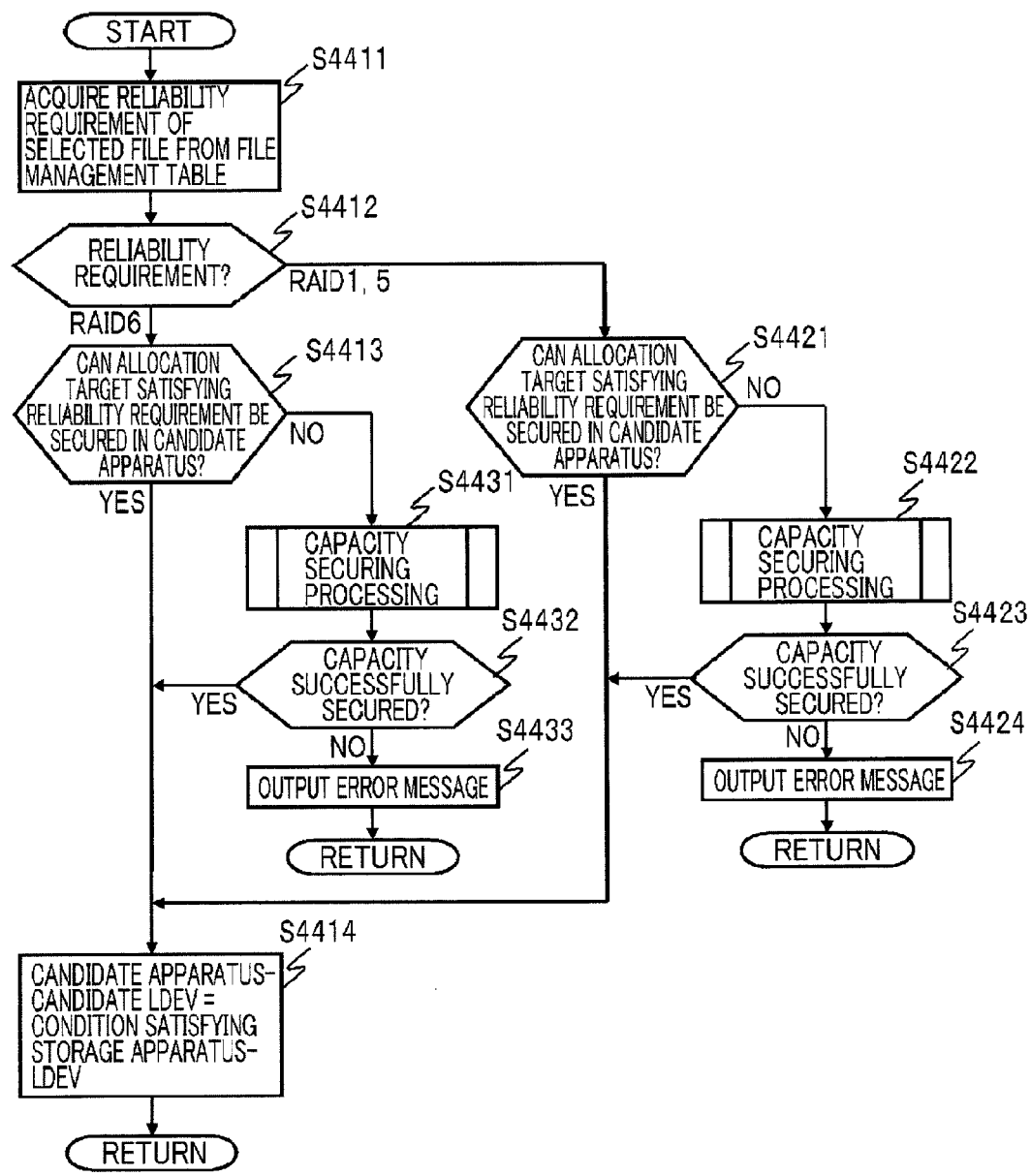
FIG. 44 shows a flowchart explaining details of the reliability requirement-based allocation target determination processing S4212.

FIG. 44 shows a flowchart of details of the reliability requirement-based allocation target determination processing S4212 in FIG. 42. The reliability requirement-based allocation target determination processing S4212 is described below with reference to FIG. 44.

As shown in FIG. 44, the first server system 3a firstly acquires the reliability requirement (the content in the reliability 1532) set for the selected file from the file management table 333 (S4411), and judges the content (S4412). The processing advances to S4413 if the reliability requirement of the selected file is set at "RAID6" (S4412: RAID6), whereas the processing advances to S4421 if the reliability requirement of the selected file is set at "RAID1, 5" (S4412: RAID1, 5).

In S4413, referring to the storage area management table 334, the first server system 3a determines whether or not a allocation target satisfying the reliability requirement set for the selected file can be secured in the storage apparatus 10 (candidate apparatus) set in the processing variable "candidate apparatus". To be more specific, the first server system 3a makes the above determination by checking whether or not the LDEVs 172 included in the candidate apparatus includes an LDEV 172 having "RAID6" set in RAID level 163 and having free capacity equal to or larger than the file size of the selected file.

The processing advances to S4414 if the allocation target satisfying the reliability requirement can be secured (S4413: YES), whereas the processing advances to S4341 if the allocation target satisfying the reliability requirement cannot be secured (S4413: NO).

In S4431, the first server system 3a executes the capacity securing processing S4700.

After the execution of the capacity securing processing S4700, the first server system 3a determines whether or not the allocation target satisfying the reliability requirement set for the selected file can be successfully secured (in the same determination manner as in S4413) with reference to the storage area management table 334 (S4342). The processing advances to S4414 if the allocation target is successfully secured (S4432: YES), whereas the processing advances to S4433 if the allocation target fails to be secured (S4432: NO).

In S4433, the first server system 3a outputs an error message to the maintenance device 18 to inform that the selected file fails to be allocated in the allocation target satisfying the reliability requirement "RAID6" of the file. Then, the processing advances to S4215 in reallocation processing S4200. Here, the maintenance device 18 provides the information of this error message to the management device 19 whenever necessary. In this way, the user can know through the management device 19 that the selected file fails to be allocated in the allocation target satisfying the reliability requirement "RAID6" of the file.

On the other hand, in S4421, referring to the storage area management table 334, the first server system 3a determines whether or not a allocation target satisfying the reliability requirement set for the selected file can be secured in the storage apparatus 10 (candidate apparatus) set in the processing variable "candidate apparatus." To be more specific, the first server system 3a makes the above determination by checking whether or not the LDEVs 172 included in the candidate apparatus includes an LDEV 172 having the RAID level 163 set at reliability equal to "RAID 1, 5" or more and having free capacity equal to or larger than the file size of the entity of the selected file.

The processing advances to S4414 if the allocation target satisfying the reliability requirement can be secured (S4421: YES), whereas the processing advances to S4422 if the allocation target satisfying the reliability requirement cannot be secured (S4421: NO).

In S4422, the first server system 3a executes the capacity securing processing S4700.

After the execution of the capacity securing processing S4700, the first server system 3a determines whether or not the allocation target satisfying the reliability requirement set for the selected file is successfully secured (in the same determination manner as in S4421) with reference to the storage area management table 334 (S4423). The processing advances to S4414 if the allocation target is successfully secured (S4423: YES), whereas the processing advances to S4424 if the allocation target fails to be secured (S4423: NO).

In S4424, the first server system 3a outputs an error message to the maintenance device 18 to inform that the selected file fails to be located in the allocation target corresponding to the reliability requirement "RAID1, 5" of the file, and terminates the processing (the processing advances to S4215 in reallocation processing S4200). Here, the maintenance device 18 provides the information of this error message to the management device 19. In this way, the user can know through the management device 19 that the selected file fails to be located in the allocation target satisfying the reliability requirement of the file.

In S4414, the first server system 3a sets, in a processing variable "candidate apparatus-candidate LDEV", the apparatus ID in the processing variable "candidate apparatus" and the LDEV_ID of the LDEV 172 determined as a storage area where the selected file is locatable in S4413, S4432, S4421 or S4423 (hereinafter, referred to as "candidate LDEV"). When there are two or more LDEVs 172 each determined as a storage area where the selected file is locatable, the LDEV_IDs of all the LDEVs 172 are set in the processing variable "candidate apparatus-candidate LDEV." Thereafter, the processing advances to S4213 in reallocation processing S4200.

In this way, the first server system 3a determines, as the candidate LDEV, an LDEV 172 satisfying the reliability requirement for the selected file from among the LDEVs 172 existing in the candidate apparatus.

<Performance Requirement-Based Allocation Target Determination Processing>

Figure 45:
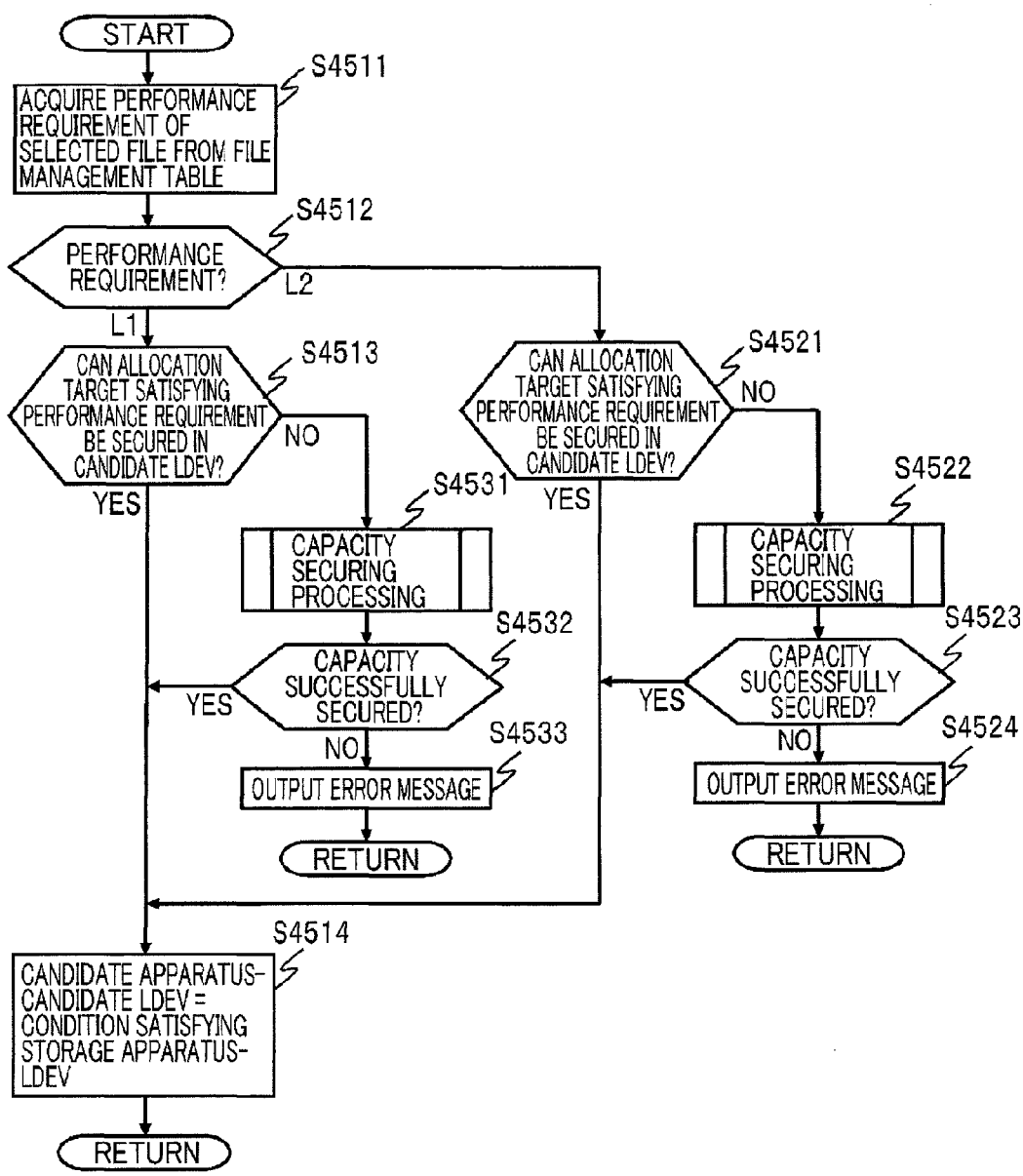
FIG. 45 shows a flowchart explaining details of the performance requirement-based allocation target determination processing S4213.

FIG. 45 shows a flowchart of details of the performance requirement-based allocation target determination processing S4213 in FIG. 42. The performance requirement-based allocation target determination processing S4213 is described below with reference to FIG. 45.

As shown in FIG. 45, the first server system 3a firstly acquires the performance requirement (the content in the performance 1533) set for the selected file from the file management table 333 (S4511), and judges the content (S4512). The processing advances to S4513 if the performance requirement of the selected file is set at "L1" (S4512: L1), whereas the processing advances to S4521 if the performance requirement of the selected file is set at "L2" (S4512: L2).

In S4513, referring to the storage area management table 334, the first server system 3a determines whether or not the allocation target satisfying the performance requirement set for the selected file can be secured in the LDEV 172 in the processing variable "candidate apparatus-candidate LDEV". To be more specific, the first server system 3a makes the above determination by checking whether or not the candidate LDEVs 172 determined in the reliability requirement-based allocation target determination processing S4212 includes an LDEV 172 having the performance 1623 set at "L1" and having free capacity equal to or larger than the file size of the selected file.

The processing advances to S4514 if the allocation target satisfying the performance requirement can be secured (S4513: YES), whereas the processing advances to S4531 if the allocation target satisfying the performance requirement cannot be secured (S4513: NO).

In S4531, the first server system 3a executes the capacity securing processing S4700.

After the execution of the capacity securing processing S4700, the first server system 3a determines whether or not the allocation target satisfying the performance requirement set for the selected file is successfully secured (in the same determination manner as in S4513) with reference to the storage area management table 334 (S4532).

The processing advances to S4514 if the allocation target is successfully secured (S4532: YES), whereas the processing advances to S4533 if the allocation target fails to be secured (S4532: NO).

In S4533, the first server system 3a outputs an error message to the maintenance device 18 to inform that the selected file fails to be located in the allocation target satisfying the performance requirement "L1" of the file. Then, the processing advances to S4215 in the reallocation processing S4200. Here, the maintenance device 18 provides the information of this error message to the management device 19 whenever necessary. In this way, the user can know through the management device 19 that the selected file fails to be located in the allocation target satisfying performance requirement "L1" of the file.

On the other hand, in S4521, referring to the storage area management table 334, the first server system 3a determines whether or not a allocation target satisfying the performance requirement set for the selected file can be secured in the LDEV 172 (hereinafter, referred to as "candidate LDEV") set in the processing variable "candidate apparatus-candidate LDEV". To be more specific, the first server system 3*a* makes the above determination by checking whether or not the candidate LDEVs 172 determined in the reliability requirement-based allocation target determination processing S4212 includes an LDEV 172 having the performance 1623 set at "L2" or over and having free capacity equal to or larger than the file size of the entity of the selected file.

The processing advances to S4514 if the allocation target satisfying the performance requirement can be secured (S4521: YES) whereas the processing advances to S4522 if the placement location satisfying the performance requirement cannot be reserved (S4521: NO).

In S4522, the first server system 3*a* executes the capacity securing processing S4700.

After the execution of the capacity securing processing S4700, the first server system 3*a* determines whether or not the allocation target satisfying the performance requirement set for the selected file is successfully secured (in the same determination manner as in S4521) with reference to the storage area management table 334 (S4523). The processing advances to S4514 if the allocation target is successfully secured (S4523: YES), whereas the processing advances to S4524 if the allocation target fails to be secured (S4523: NO).

In S4524, the first server system 3*a* outputs an error message to the maintenance device 18 to inform that the selected file fails to be located in the allocation target satisfying the performance requirement "L2" of the file. Then, the processing advances to S4215 in the reallocation processing S4200. Here, the maintenance device 18 provides the information of this error message to the management device 19 whenever necessary. In this way, the user can know through the management device 19 that the selected file fails to be located in the allocation target satisfying the performance requirement "L2".

In S4514, the first server system 3*a* sets, in the processing variable "candidate apparatus-candidate LDEV", the apparatus ID in the processing variable "candidate apparatus" and the LDEV_ID of the LDEV 172 determined as a storage area where the selected file is allocatable in S4513, S4532, S4521 or S4523. If there are a plurality of LDEVs 172 each determined as a storage area where the selected file is allocatable, the LDEV_IDs of all the LDEVs 172 are set in the processing variable "candidate apparatus-candidate LDEV". Thereafter, the processing advances to S4214 in the reallocation processing S4200.

In this way, the first server system 3*a* determines, as a final candidate LDEV, the candidate LDEV satisfying the performance requirement for the selected file among the candidate LDEVs selected in the reliability requirement-based allocation target determination processing S4212.

<File Entity Allocation Processing>

Figure 46:
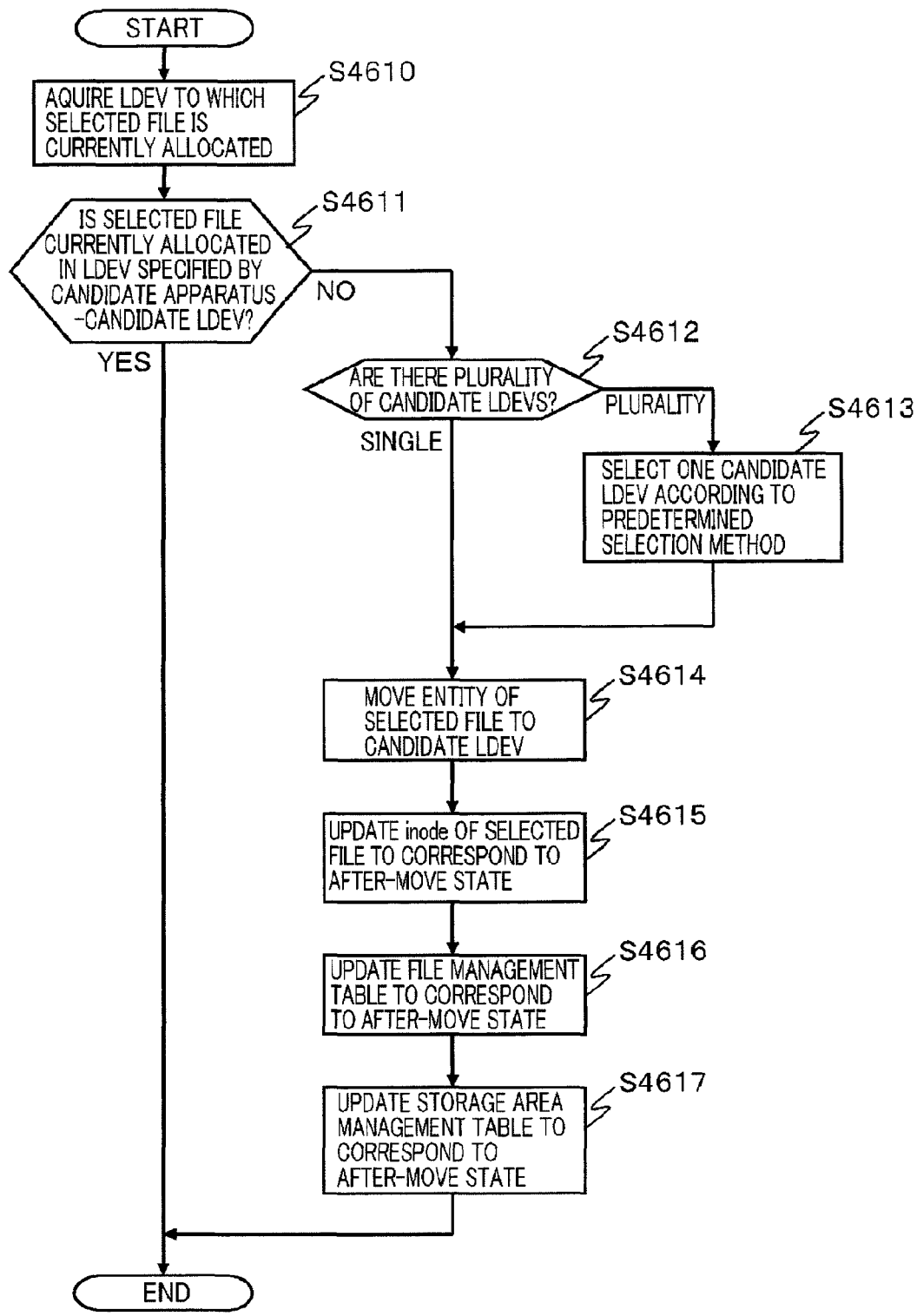
FIG. 46 shows a flowchart explaining details of the file entity allocation processing S4214.

FIG. 46 shows a flowchart of details of the file entity allocation processing S4214 in FIG. 42. The file entity allocation processing S4214 is described below with reference to FIG. 46.

As shown in FIG. 46, the first server system 3*a* firstly acquires the current allocation target 152 (apparatus ID 1521, LDEV_ID1522) of the selected file from the file management table 333 (S4610).

Next, the first server system 3*a* determines whether or not the selected file is currently allocated in the LDEV 172 specified by the candidate apparatus-candidate LDEV (S4611). If the selected file is currently allocated in the LDEV 172 specified by the candidate apparatus-candidate LDEV (S4611: YES), the entity of the selected file does not need to be transferred and the file entity allocation processing S4214 is terminated. If the selected file is not currently allocated therein (S4611: NO), the processing advances to S4612.

In S4612, the first server system 3*a* determines whether or not there are a plurality of candidate LDEVs (there are a plurality of candidate apparatus-candidate LDEVs determined in S4211 to S4213). The processing advances to S4613 if there are a plurality of candidate LDEVs (S4612: plurality), whereas the processing advances to S4614 if there is only a single candidate LDEV (S4612: single).

In S4613, the first server system 3*a* narrows down the candidate LDEVs to one (selects one candidate LDEV) according to a predetermined selection method.

Exemplary Predetermined Selection Methods for This Processing are as Follows.

(Selection Method 1) The free capacity of each of the candidate LDEVs is calculated ("threshold 1642—capacity in use 1641" or "total capacity 1643—capacity in use 1641") by using the storage area management table 334, and the candidate LDEV having a plenty of free capacity (for example, the candidate LDEV having the largest free capacity or the candidate LDEV having the largest ratio of the free capacity to the total capacity 1643) is selected.

(Selection Method 2)

If the candidate LDEVs include both an LDEV with high confidentiality and an LDEV with low confidentiality, the candidate LDEV with low confidentiality is preferentially selected for securing free capacity of the LDEV 172 with high confidentiality.

(Selection Method 3)

If the candidate LDEVs include both an LDEV with high re-liability (e.g., the LDEV 172 with "RAID6")and an LDEV with low reliability (e.g., the LDEV 172 with "RAID1, 5"), the candidate LDEV with low reliability is preferentially selected for securing the free capacity of the LDEV 172 with high reliability.

(Selection Method 4)

If the candidate LDEVs include both an LDEV with high performance (e.g., the LDEV 172 with the access performance "L1") and an LDEV with low performance (e.g., the LDEV 172 with the access performance "L2"), the candidate LDEV with low performance is preferentially selected for securing free capacity of the LDEV 172 with high performance.

Incidentally, these selection methods 1 to 4 may be employed independently or in combination of any two or more of them.

In S4614, the first server system 3*a* transfers the entity of the selected file to the candidate LDEV (the candidate LDEV if only a single candidate LDEV exists, or the candidate LDEV determined in S4613 if there are a plurality of candidate LDEVs).

The entity of the file is transferred through direct communication between the server system 3 (any of the first server system 3*a*, the second server system 3*b*, and the third server system 3*c*) coupled to the source storage apparatus 10 and another server system 3 connected to the destination storage apparatus 10.

In one example where the first storage apparatus 10*a* is the source and second storage apparatus 10*b* (or the third storage apparatus 10*c*) is the destination, the first server system 3*a* communicates with the second server system 3*b* (or the third server system 3*c*), and transfers the entity of the selected file from the source (the first storage apparatus 10*a*) to the destination (the second storage apparatus 10*b* (or the third storage apparatus 10*c*)).

In another example where the third storage apparatus 10c (or the second storage apparatus 10b) is the source and the second storage apparatus 10b (or the third storage apparatus 10c)is the destination, the first server system 3a sends both the third server system 3c and the second server system 3b an instruction to transfer the entity of the selected file. Upon receiving this instruction, the third server system 3c and the second server system 3b transfer the entity of the selected file from the source (the third storage apparatus 10c (or the second storage apparatus 10b)) to the destination (the second storage apparatus 10b (or the third storage apparatus 10c)).

Following the transfer, the server systems 3 (the first server system 3a, the second server system 3b and the third server system 3c) update the contents in the inode management table 1912 for the selected file to reflect the after-move state (S4615). In addition, the first server system 3a updates the data in the current allocation target 152 in the file management table 333 to reflect the after-move state (S4616) and updates the storage capacity 164 in the storage area management table 334 to reflect the after-move state (S4617).

As described above, in the information system 1 of the present embodiment, the storage destination of the entity of each file stored in the storage apparatuses 10 is changed whenever necessary on the basis of the requirements (the confidentiality requirement, the reliability requirement and the performance requirement) currently set for the file and the current configuration of the information system 1. Thus, the entity of the file managed in the information system 1 can be efficiently allocated (stored) in a storage area (LDEV 172) of the storage apparatuses 10 while satisfying the requirements of each file.

Additionally, when changes are made in the configuration (confidentiality, re-liability, performance) of the storage area in the storage apparatus 10 (first storage apparatus 10a, second storage apparatus 10b, third storage apparatus 10c), the entity of the file can be allocated to an appropriate location according to the requirement set to each file based on the latest configuration of the storage apparatus 10.

According to the information system 1 of the present embodiment, for example, the entity of a file requiring high confidentiality, for example, is prevented from being allocated in a storage apparatus 10 (second storage apparatus 10b) on the cloud service side. Additionally, the entity of the file requiring confidentiality is allocated to the storage apparatus with high confidentiality (first storage apparatus 10a) regardless of the access frequency to the file. Moreover, since the allocation target of the entity of the file is determined with priority to the assurance of confidentiality, the reliability and the performance required for the file are maintained to the maximum extent possible while the confidentiality of the entity of the file is ensured.

After the determination of the placement location of the entity of the file (S4211 to 4213), direct data transfer is performed between the source and the destination when the entity of the file is moved to the allocation target thus allowing efficient allocation of the entity of the file to the determined allocation target In the case where the information system 1 has the foregoing configuration (configuration shown in FIG. 1), conventional technology needs the entity of the file to be transferred from the second storage apparatus 10b to the third storage apparatus 10c via the first server system 3a and the first storage apparatus 10a. In this embodiment, however, the source and the destination perform direct data transfer and accordingly the entity of the file can be efficiently transferred with the load on the first server system 3a (first storage apparatus 10a) kept low. Therefore, effects on the services provided by the first server system 31 to the client device 2 can be suppressed.

<Storage Area Securing Processing>

Figure 47:
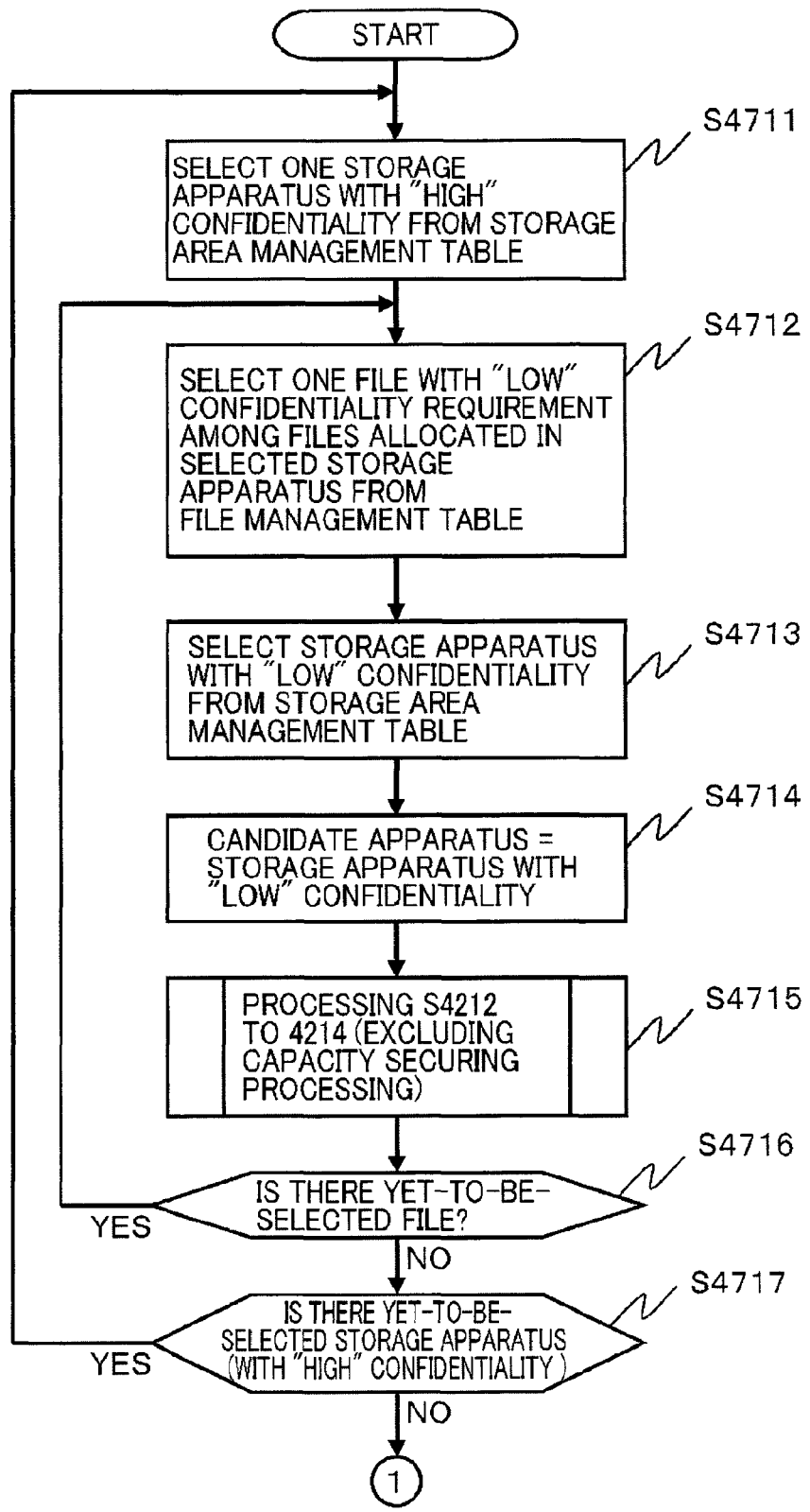
FIG. 47 shows a flowchart explaining details of the storage area securing processing S4700.
Figure 48:
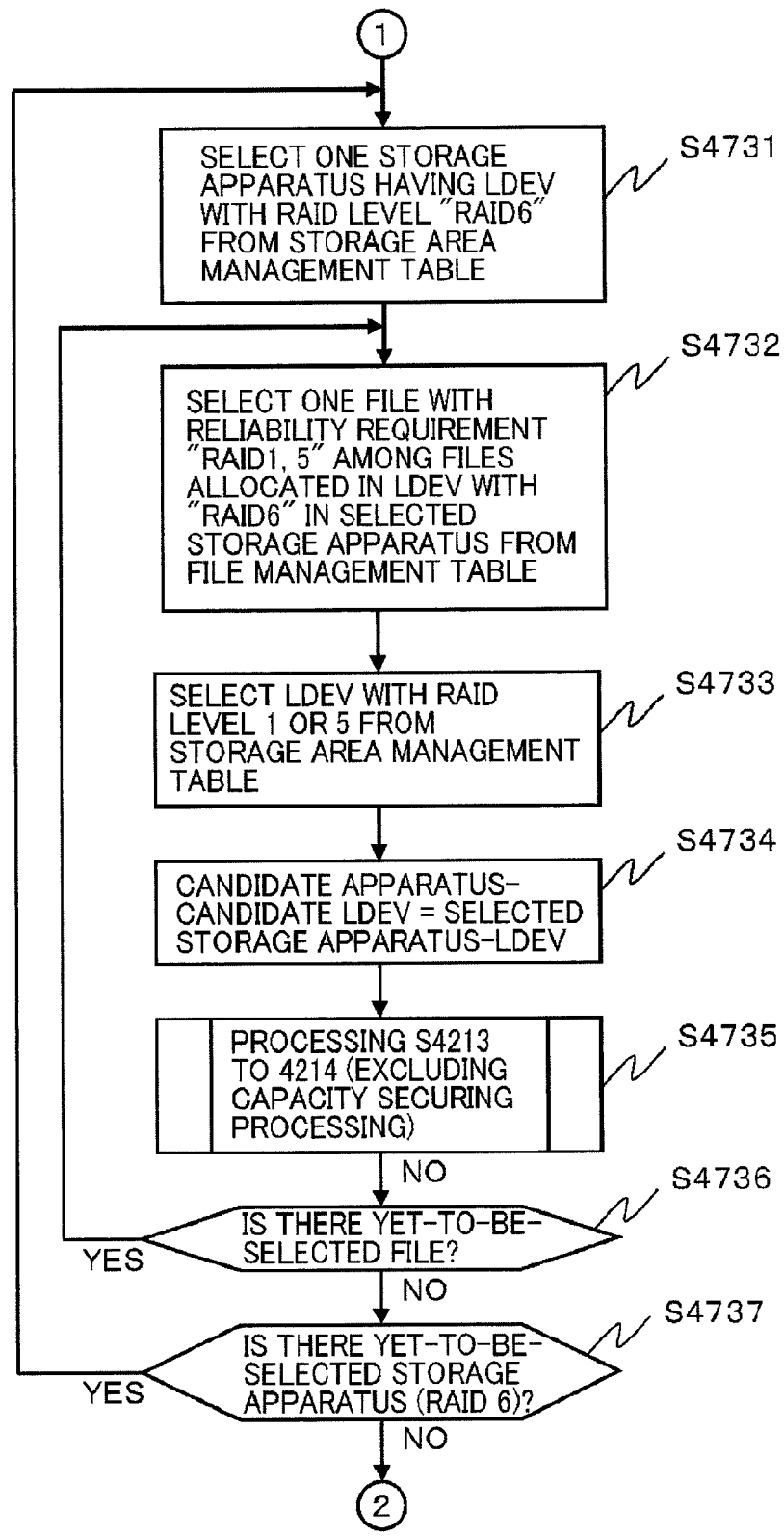
FIG. 48 shows a flowchart explaining details of the storage area securing processing S4700.
Figure 49:
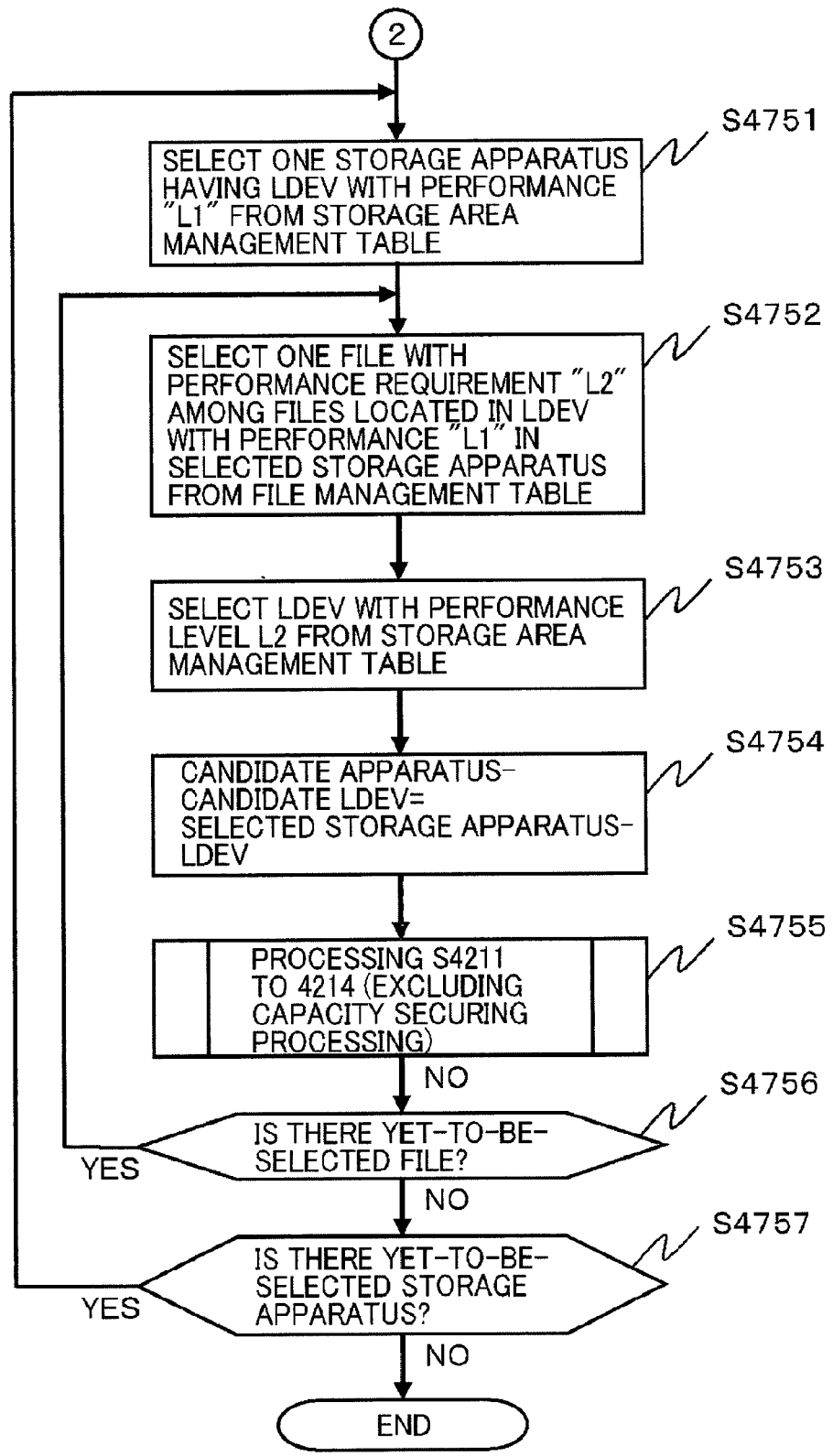
FIG. 49 shows a flowchart explaining details of the storage area securing processing S4700.

FIGS. 47 to 49 show a flowchart of details of the foregoing capacity securing processing S4700. The capacity securing processing S4700 is described below with reference to FIGS. 47 to 49.

In the first place, the first server system 3a attempts to secure capacity in a storage apparatus 10 with high confidentiality by aggressively expelling from the storage apparatus 10 with high confidentiality requirement to the entities of files with low confidentiality requirement (transferring to a storage apparatus 10 with low confidentiality).

As shown in FIG. 47, the first server system 3a firstly selects one storage apparatus 10 with high confidentiality (the storage apparatus 10 having the confidentiality 1622 set at "high") from the storage area management table 334 (S4711).

Then, from the file management table 333, the first server system 3a selects one file with low confidentiality requirement (a file has the confidentiality 1531 set at "low") among files allocated in the storage apparatus 10 selected in S4711 (S4712).

The first server system 3a acquires the apparatus ID 1621 of a storage apparatus 10 with low confidentiality (a storage apparatus 10 having the confidentiality 1622 set at "low") from the storage area management table 334 (S4713), and sets the acquired apparatus ID 1621 in the processing variable "candidate apparatus" (S4714).

The first server system 3a executes the reliability requirement-based allocation target determination processing S4212, the performance requirement-based allocation target determination processing S4213, and the file entity allocation processing S4214 shown in FIG. 42, in this order, by targeting the file selected in S4712 as the selected file (S4715). In the execution of these processing steps, the first server system 3a skips the processing for securing the storage capacity (S4431 to S4433, S4422 to S4424, S4531 to S4533, S4522 to S4524) when any of the result in S4413 and S4421 in FIGS. 44, and S4513 and S4521 in FIG. 45 is "NO". And processing S4715 is terminated at that point.

In S4716, the first server system 3a determines whether or not there is a file yet to be selected among files with "low" confidentiality requirement in S4712. The processing returns to S4712 if there is a file yet to be selected (S4716: YES), whereas the processing advances to S4717 if there is no file yet to be selected (S4716: NO). The processing S4712 to S4716 may be terminated upon completion of securing necessary storage capacity.

In S4718, the first server system 3a determines whether or not there is a storage apparatus 10 not selected yet from among the storage apparatuses 10 with "high" confidentiality in S4711. The processing returns to S4711 if there is a storage apparatus 10 not selected yet (S4717: YES), whereas the processing advances to S4731 in FIG. 48 if there is no file yet to be selected (S4717: NO). The processing S4711 to S4717 may be terminated upon completion of securing necessary storage capacity.

As described above, when the entity of a file with low confidentiality requirement is stored in the storage apparatuses 10 with high confidentiality, the first server system 3a sets the file as the selected file and a storage apparatus 10 with low confidentiality as the candidate apparatus, and executes the reliability requirement-based allocation target determination processing S4212, the performance requirement-based allocation target determination processing S4213, and the file entity allocation processing S4214 in FIG. 42, in this order, to expel the entity of the file with low confidentiality requirement from the storage apparatuses 10 with high confidentiality, and thereby is allowed to secure storage capacity in the storage apparatuses 10 with high confidentiality.

For expelling the entity of the file with low confidentiality requirement from the storage apparatuses 10 with high confidentiality, the reliability requirement-based allocation target determination processing S4212 and the performance requirement-based allocation target determination processing S4213 in FIG. 42 are executed to determine the allocation target. Accordingly, the storage capacity in the storage apparatuses 10 with high confidentiality can be secured while the reliability and the performance for the expelled file are secured to the maximum extent possible.

Subsequently, the first server system 3a attempts to secure capacity a in a LDEV 172 with high reliability by aggressively expelling a file with low reliability requirement from the LDEV 172 with high reliability (transferring to an LDEV 172 with low re-liability).

In S4731 in FIG. 48, from the storage area management table 334, the first server system 3a selects one storage apparatus 10 including an LDEV 172 with the RAID level "RAID6" (the storage apparatus 10 including an LDEV 172 having the RAID level 163 set at "RAID6").

The first server system 3a selects, from the file management table 333, one file having the reliability requirement "RAID1, 5" (a file having the reliability 1532 set at "RAID1, 5") from among files allocated in the LDEVs 172 with RAID level "RAID6" in the storage apparatus 10 selected in S4731 (S4732).

The first server system 3a acquires, from the storage area management table 334, the LDEV_ID of an LDEV 172 having the RAID level 163 set at "1" or "5" among the LDEVs 172 in the storage apparatus 10 selected in S4731 (S4733), and sets the apparatus ID of the storage apparatus 10 selected in S4731 and the LDEV_ID acquired in S4733 in the processing variable "candidate apparatus-candidate LDEV" (S4734).

The first server system 3a executes processing S4213 and S4214 (the performance requirement-based allocation target determination processing S4213 and the file entity allocation processing S4214) in FIG. 42, in this order, by targeting the file selected in S4732 as the selected file (S4735). In the execution of these processing steps, the first server system 3a skips the processing for securing capacity (S4531 to S4533, S4522 to S4524) when any of the result in S4513, S4521 in FIG. 45 is "NO". And processing S4735 is terminated at that point.

In S4736, the first server system 3a determines whether or not there is a file not selected yet from among files with reliability requirement "RAID1, 5" in processing S4732. The processing returns to S4732 if there is a file not selected yet (S4736: YES), whereas the processing advances to S4737 if there is no file yet to be selected (S4736: NO). The processing S4732 to S4736 may be terminated upon completion of securing necessary capacity.

In S4737, the first server system 3a determines whether or not there is a storage apparatus 10 not selected yet from among the storage apparatuses 10 each including an LDEV with the RAID level "RAID6" in S4731. The processing returns to S4731 if there is a storage apparatus 10 not selected yet (S4737: YES), whereas the processing advances to S4751 in FIG. 49 if there is no file yet to be selected (S4737: NO). The processing S4731 to S4737 may be terminated upon completion of securing necessary capacity.

As described above, if the entity of a file with low reliability requirement is stored in an LDEV 172 with high reliability, the first server system 3a sets the file as the selected file and an LDEV 172 with low reliability as the candidate LDEV, and executes the performance requirement-based allocation target determination processing S4213 and the file entity allocation processing S4214 in FIG. 42, in this order, to expel the entity of the file with low reliability requirement from the LDEV 172 with high reliability, and thereby allows to secure capacity in the LDEV 172 with high reliability.

For expelling the entity of the file with low reliability requirement from the LDEV 172 with high reliability, the performance requirement-based allocation target determination processing S4213 in FIG. 42 is executed to determine the allocation target. Accordingly, capacity in the LDEV 172 with high reliability is secured while the performance for the expelled file is secured to the maximum extent possible.

Subsequently, the first server system 3a attempts to secure capacity in an LDEV 172 with high performance by aggressively expelling a file with low performance requirement from an LDEV 172 with high performance (transferring to the LDEV 172 with low performance).

In S4751 in FIG. 49, from the storage area management table 334, the first server system 3a selects one storage apparatus 10 including an LDEV 172 with performance "L1" (the storage apparatus 10 including an LDEV 172 having performance 1623 set at "L1").

The first server system 3a selects one file having the performance requirement "L2" (a file having the performance 1533 set at "L2") among files allocated in the LDEVs 172 with performance "L1" in the storage apparatus 10 selected in S4751 (S4752).

Next, the first server system 3a acquires, from storage area management table 334, the apparatus ID and LDEV_ID of the LDEV 172 to which "L2" is set to performance 1632 (S4753), and sets in a processing variable "candidate apparatus-candidate LDEV", the apparatus ID of storage apparatus 10 and the LDEV_ID acquired in S4753 (S4754).

The first server system 3a executes the processing S4211 to S4214 (the confidentiality requirement-based allocation target determination processing S4211, the reliability requirement-based allocation target determination processing S4212, the performance requirement-based allocation target determination processing S4213 and the file entity allocation processing S4214) in FIG. 42, in this order, by targeting the file selected in S4752 as the selected file (S4755). In the execution of these processing steps, the first server system 3a skips the processing for securing capacity (S4341 to S4343, S4431 to S4433, S4422 to S4424, S4531 to S4533, S4522 to S4524) when any of the result in S4315 in FIGS. 43, S4413 and S4421 in FIGS. 44 and S4513 and S4521 in FIG. 45 is "NO". And processing S4755 is terminated at that point.

In S4756, the first server system 3a determines whether or not there is a file not selected yet from among files with performance requirement "L2" in the processing S4752. The processing returns to S4752 if there is a file not selected yet (S4756: YES), whereas the processing advances to S4757 if there is no file yet to be selected (S4756: NO). Here, the processing S4752 to 54756 may be terminated upon completion of securing necessary capacity.

In S4757, the first server system 3a determines whether or not there is a storage apparatus 10 not selected yet from among storage apparatuses 10 each having an LDEV with performance "L1" in the processing S4751. The processing returns to S4751 if there is a storage apparatus 10 not selected yet (S4757: YES), whereas the capacity securing processing S4700 is terminated if there is no file yet to be selected (S4757: NO). The processing S4751 to S4757 may be terminated upon completion securing necessary capacity.

As described above, if the entity of a file with low performance requirement is stored in an LDEV 172 with high performance, the first server system 3a sets the file as the selected file and an LDEV 172 with low performance as the candidate LDEV, and executes the confidentiality requirement-based allocation target determination processing S4211, the reliability requirement-based allocation target determination processing S4212, the performance requirement-based allocation target determination processing S4213 and the file entity allocation processing S4214 in FIG. 42, in this order, to expel the entity of the file with low performance requirement from the LDEV 172 with high performance, and thereby allows to secure capacity in the LDEV 172 with high performance.

For expelling the entity of the file with low performance requirement from the LDEV 172 with high performance, the confidentiality requirement-based allocation target determination processing S4211, the reliability requirement-based allocation target determination processing S4212 and the performance requirement-based allocation target determination processing S4213 in FIG. 42 are executed to determine the allocation target. Accordingly, the capacity in the LDEV 172 with high performance can be secured while the confidentiality, the reliability and the performance for the expelled file is secured to the maximum extent possible.

Although the present embodiment has been described hereinabove, the above-described embodiment is not intended to limit the interpretation of the present invention, but is only to facilitate the understanding of the present invention. The present invention can be changed and modified without departing from the scope of the invention, and includes its equivalents.

In one example, the above embodiment has been described for the case where the first server system 3a executes as the main body in the file relocation processing, but the main body to execute the file relocation processing is not necessarily limited to the first server system 3a. For instance, the maintenance device 18 or the management device 19 may execute as the main body the file reallocation processing. Instead, the second server system 3b or the third server system 3c may also execute as the main body in the file reallocation processing.

In another example, the foregoing capacity securing processing S4700 may be executed at any timing other than the aforementioned timing (when the determination result in S4315 is "NO," when the determination result in S4413 is "NO," when the determination result in S4421 is "NO," when the determination result in S4513 is "NO," and when the determination result in 54521 is "NO"). The capacity securing processing S4700 may be automatically executed at pre-scheduled timing, for example.

In addition, in the storage area reserve processing S4700, the processing S4711 to S4717 in FIG. 47, the processing S4731 to S4737 in FIG. 48 and the processing S4751 to S4756 in FIG. 49 may not necessarily be executed as a series of processing, but may be executed independently or in combination of any two of them.

The invention claimed is:

1. A first server system, in an information system configured to include
the first server system capable of receiving a data I/O request for a file from a client device and performing data I/O on a first storage apparatus,
a second server system that is communicatively coupled to the first server system and capable of performing data I/O on a second storage apparatus, and
a third server system that is communicatively coupled to the first server system and capable of performing data I/O on a third storage apparatus, wherein
the first server system
allocates an entity of the file in any one of the first storage apparatus, the second storage apparatus and the third storage apparatus, and allocates metadata of the file in the first storage apparatus;
upon reception, from the client device, of the data I/O request not needing access to the entity of the file, responds to the data I/O request using the metadata of the file;
upon reception, from the client device, of the data I/O request needing access to the entity of the file, when an entity corresponding to the metadata of the file exists in the first storage apparatus, responds to the data I/O request using the entity, and when an entity corresponding to the metadata of the file exists in the second storage apparatus or the third storage apparatus, acquires an entity corresponding to the metadata of the file from any one of the second storage apparatus and the third storage apparatus, and responds to the data I/O request using the acquired entity;
stores a requirement set for a file stored in at least any one of the first storage apparatus, the second storage apparatus and the third storage apparatus;
stores information relating to configurations of at least two of the first storage apparatus, the second storage apparatus and the third storage apparatus;
determines an allocation target of the entity of the file on the basis of the requirement and the information on the configurations; and
executes processing for allocating the entity of the file in the determined allocation target;
wherein
the requirement set for the file is at least any one of a requirement relating to confidentiality placed on the file, a requirement relating to reliability placed on the file and a requirement relating to performance placed on the file, and
the information relating to the configurations includes at least any one piece of information indicating confidentiality of each of storage areas provided by each of the first storage apparatus, the second storage apparatus and the third storage apparatus, information indicating reliability of each of the storage areas, and information indicating performance of each of the storage areas;
the first server system
identifies, as a candidate apparatus, a storage apparatus providing the storage area satisfying the requirement relating to the confidentiality placed on the file on basis of the information relating to the configurations,
identifies, as a candidate storage area, a storage area satisfying the requirement relating to reliability placed on the file from among the storage areas provided by the candidate apparatus on basis of the information relating to the configurations, and
determines, as the allocation target, a candidate storage area satisfying the requirement relating to performance placed on the file from among the candidate storage areas on basis of the information relating to the configurations;
wherein
the requirement set for the file is at least any one of a confidentiality requirement placed on the file, a reliability requirement placed on the file and a performance requirement placed on the file, and the information relating to the configurations includes at least any one piece of information indicating confidentiality of each of storage areas provided by each of the first storage apparatus, the second storage apparatus and the third storage apparatus, information indicating reliability of each of the storage areas, and information indicating performance of each of the storage areas, wherein the first server system identifies, as a candidate apparatus, a storage apparatus providing the storage area satisfying the requirement relating to the confidentiality placed on the file on the basis of the information relating to the configurations, identifies, as a candidate storage area, a storage area satisfying the requirement relating to reliability placed on the file from among the storage areas provided by the candidate apparatus on the basis of the information relating to the configurations, determines, as the allocation target, a candidate storage area satisfying the requirement relating to performance placed on the file from among the candidate storage areas on the basis of the information relating to the configurations, identifies a storage apparatus having a first confidentiality from among storage apparatuses included in the information system on the basis of the information relating to the configurations, acquires the requirement relating to confidentiality placed on each of files currently allocated in the identified storage apparatus, moves the entity of the having file placed thereto a second confidentiality that is lower than the first confidentiality, as requirement relating to the confidentiality, from the identified storage apparatus to another storage apparatus having lower confidentiality than the first confidentiality, identifies the storage area having first reliability from among the storage areas provided by storage apparatuses included in the information system, on the basis of the information relating to the configurations, acquires the requirement relating to reliability placed on each of files currently allocated to the identified storage area, moves the entity of the file having placed thereto a second reliability that is lower than the first reliability, as requirement relating to reliability, from the identified storage area to another storage area having lower reliability than the first reliability, identifies the storage area having first performance from among the storage areas provided by storage apparatuses included in the information system, on the basis of the information relating to the configurations, acquires the requirement relating to performance placed on each of files currently allocated to the identified storage area, and moves the entity of the file having placed thereto a second performance, that is lower than the first performance as requirement relating to performance, from the identified storage area to another storage area having lower performance than the first performance, wherein the information relating to the configurations includes information indicating confidentiality of each of the storage areas, information indicating reliability of each of the storage areas, information indicating performance of each of the storage areas, and information indicating free capacity in each of the storage areas, and wherein the processing for allocating the entity of the file in the determined allocation target includes processing of initiating transfer of the entity of the file between any two storage apparatuses of the first storage apparatus, the second storage apparatus and the third storage apparatus.

2. The server system according to claim 1, wherein the server system identifies a storage apparatus having a first confidentiality from among storage apparatuses included in the information system on basis of the information relating to the configurations, acquires the requirement relating to confidentiality placed on each of files currently allocated to the identified storage apparatus, and moves the entity of the file having placed thereto a second confidentiality that is lower than the first confidentiality, as requirement relating to the confidentiality, from the identified storage apparatus to another storage apparatus having lower confidentiality than the first confidentiality.

3. The server system according to claim 1, wherein the server system identifies the storage area having first reliability from among the storage areas provided by storage apparatuses included in the information system, on the basis of the information relating to the configurations, acquires the requirement relating to reliability placed on each of files currently allocated to the identified storage area, and moves the entity of the file having placed thereto a second reliability that is lower than the first reliability, as requirement relating to reliability, from the identified storage area to another storage area having lower reliability than the first reliability.

4. The server system according to claim 1 wherein the server system identifies the storage area having first performance from among the storage areas provided by storage apparatuses included in the information system, on the basis of the information relating to the configurations, acquires the requirement relating to performance placed on each of files currently allocated to the identified storage area, and moves the entity of the file having placed thereto a second performance that is lower than the first performance, as requirement relating to performance, from the identified storage area to another storage area having lower performance than the first performance.

5. The server system according to claim 1, wherein the information relating to the configurations includes information indicating confidentiality of each of the storage areas, information indicating reliability of each of the storage areas, information indicating performance of each of the storage areas, and information indicating free capacity in each of the storage areas.

6. The server system according to claim 1, wherein the processing for allocating the entity of the file in the determined allocation target includes processing of initiating transfer of the entity of the file between any two storage apparatuses of the first storage apparatus, the second storage apparatus and the third storage apparatus.

7. A method for controlling an information system including a first server system capable of receiving a data I/O request for a file from a client device and performing data I/O on a first storage apparatus, a second server system communicatively coupled to the first server system and capable of performing data I/O on a second storage apparatus, and a third server system communicatively coupled to the first server system and capable of performing data I/O on a third storage apparatus, wherein an entity of the file is allocated in any one of the first storage apparatus, the second storage apparatus and the third storage apparatus and a metadata of the file is allocated in the first storage apparatus, the method comprising the steps, executed by the first server system, of:

upon reception, from the client device, of the data I/O request not needing access to the entity of the file, responding to the data I/O request using the metadata of the file;

upon reception, from the client device, of the data I/O data request needing access to the entity of the file, when an entity corresponding to the metadata of the file exists in the first storage apparatus, responds to the data I/O request using the entity, and when an entity corresponding to the metadata of the file exists in the second storage apparatus or the third storage apparatus, acquiring an entity corresponding to the metadata of the file from any one of the second storage apparatus and the third storage apparatus, and responds to the data I/O request using the acquired entity;

storing a requirement set for a file stored in at least any one of the first storage apparatus, the second storage apparatus and the third storage apparatus;

storing information relating to configurations of at least two of the first storage apparatus, the second storage apparatus and the third storage apparatus;

determining an allocation target of the entity of the file on the basis of the requirement and the information on the configurations; and executing processing for allocating the entity of the file in the determined allocation target;

wherein the requirement set for the file is at least any one of a requirement relating to confidentiality placed on the file, a requirement relating to reliability placed on the file and a requirement relating to performance placed on the file, and the information relating to the configurations includes at least any one piece of information indicating confidentiality of each of storage areas provided by each of the first storage apparatus, the second storage apparatus and the third storage apparatus, information indicating reliability of each of the storage areas, and information indicating performance of each of the storage areas;

wherein the first server system identifies, as a candidate apparatus, a storage apparatus providing the storage area satisfying the requirement relating to the confidentiality placed on the file on basis of the information relating to the configurations, identifies, as a candidate storage area, a storage area satisfying the requirement relating to reliability placed on the file from among the storage areas provided by the candidate apparatus on basis of the information relating to the configurations, and determines, as the allocation target, a candidate storage area satisfying the requirement relating to performance placed on the file from among the candidate storage areas on basis of the information relating to the configurations;

wherein the first server system identifies a storage apparatus having a first confidentiality from among storage apparatuses included in the information system on basis of the information relating to the configurations, acquires the requirement relating to confidentiality placed on each of files currently allocated to the identified storage apparatus, and moves the entity of the file having placed thereto a, second confidentiality that is lower than the first confidentiality, as requirement relating to the confidentiality, from the identified storage apparatus to another storage apparatus having lower confidentiality than the first confidentiality;

wherein the first server system identifies the storage area having first reliability from among the storage areas provided by storage apparatuses included in the information system, on the basis of the information relating to the configurations, acquires the requirement relating to reliability placed on each of files currently allocated to the identified storage area, and moves the entity of the file having placed thereto a second reliability that is lower than the first reliability, as requirement relating to reliability, from the identified storage area to another storage area having lower reliability than the first reliability;

wherein the first server system identifies the storage area having first performance from among the storage areas provided by storage apparatuses included in the information system, on the basis of the information relating to the configurations, acquires the requirement relating to performance placed on each of files currently allocated to the identified storage area, and moves the entity of the file having placed thereto a second performance that is lower than the first performance, as requirement relating to performance, from the identified storage area to another storage area having lower performance than the first performance.

* * * * *